(12) United States Patent
Roy et al.

(10) Patent No.: US 11,765,126 B2
(45) Date of Patent: Sep. 19, 2023

(54) METHODS, APPARATUS, AND SYSTEM FOR EDGE RESOLUTION FUNCTION

(71) Applicant: InterDigital Patent Holdings, Inc., Wilmington, DE (US)

(72) Inventors: Michel Roy, Candiac (CA); Debashish Purkayastha, Collegeville, PA (US); Robert Gazda, Spring City, PA (US); Ulises Olvera-Hernandez, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/638,058

(22) PCT Filed: Aug. 26, 2020

(86) PCT No.: PCT/US2020/047887
§ 371 (c)(1),
(2) Date: Feb. 24, 2022

(87) PCT Pub. No.: WO2021/041467
PCT Pub. Date: Mar. 4, 2021

(65) Prior Publication Data
US 2022/0278955 A1    Sep. 1, 2022

Related U.S. Application Data

(60) Provisional application No. 62/991,242, filed on Mar. 18, 2020, provisional application No. 62/947,252, (Continued)

(51) Int. Cl.
*H04L 61/4511*    (2022.01)
*H04L 61/4541*    (2022.01)

(52) U.S. Cl.
CPC ...... *H04L 61/4541* (2022.05); *H04L 61/4511* (2022.05)

(58) Field of Classification Search
CPC ............. H04L 61/4541; H04L 61/4557; H04L 61/4552; H04L 61/5007; H04L 61/5084
(Continued)

(56) References Cited

U.S. PATENT DOCUMENTS 8,626,716 B1 * 1/2014 Katzer .................. G06F 16/27
707/646
2008/0120129 A1 * 5/2008 Seubert ................ G06Q 40/125
705/305
(Continued)

FOREIGN PATENT DOCUMENTS

CA    3004097 A1 * 11/2018 ............. G06F 16/00
CN    109451081 A    3/2019
(Continued)

OTHER PUBLICATIONS

3rd Generation Partnership Project (3GPP), S6-191956, "Pseudo-CR on Solution to Edge Application Server discover and update", Huawei, Hisilicon, 3GPP TSG-SA WG6 Meeting #33, Sophia Antipolis, France, Sep. 2-6, 5 Pages.
(Continued)

*Primary Examiner* — Khanh Q Dinh
(74) *Attorney, Agent, or Firm* — Flaster Greenberg, P.C.

(57) ABSTRACT

Methods, apparatus, systems, architectures and interfaces for a wireless transmit receive unit (WTRU) performing a client-side edge resolution function (cERF) are provided. A method may include any of: determining a fully qualified domain name (FQDN) associated with a domain name server (DNS) request of an application associated with the WTRU; if the FQDN is associated with a valid edge instance (EI) record, selecting an EI for resolving the FQDN to an IP
(Continued)

address; if the FQDN is not associated with a valid EI record: (1) transmitting a DNS query to a DNS server, (2) receiving an IP address associated with a selected EI to which the FQDN is resolved, and (3) updating the EI record with the IP address and the FQDN; and generating a traffic steering rule to re-direct uplink traffic associated with the application to the selected EI.

15 Claims, 34 Drawing Sheets

Related U.S. Application Data filed on Dec. 12, 2019, provisional application No. 62/893,544, filed on Aug. 29, 2019.

(58) Field of Classification Search
USPC ............... 709/206, 219, 220, 224, 226, 228
See application file for complete search history.

(56) References Cited

U.S. PATENT DOCUMENTS

| | | | | |
|---|---|---|---|---|
| 2013/0063432 | A1* | 3/2013 | Kaps | G06T 13/40 |
| | | | | 345/419 |
| 2013/0091252 | A1* | 4/2013 | Pizzorni | H04L 69/329 |
| | | | | 709/219 |
| 2013/0225309 | A1* | 8/2013 | Bentley | A63B 69/36 |
| | | | | 473/266 |
| 2014/0368601 | A1* | 12/2014 | deCharms | H04N 7/148 |
| | | | | 348/14.02 |
| 2014/0378194 | A1* | 12/2014 | Bentley | A63F 13/573 |
| | | | | 463/3 |
| 2018/0350180 | A1* | 12/2018 | Onischuk | G07C 13/00 |
| 2021/0315031 | A1* | 10/2021 | Wu | A61N 1/37252 |

FOREIGN PATENT DOCUMENTS

| | | |
|---|---|---|
| CN | 109788078 A | 5/2019 |
| JP | 2019121975 A | 7/2019 |

OTHER PUBLICATIONS

3rd Generation Partnership Project (3GPP), "Discussion on SA2 Edge computing study", Huawei, Intel, S2-1901832, Discussion on Enhancement of Support for EC in 5GC V1.5, Sophia Antipolis, France, Feb. 19, 2019, 13 Pages.
European Telecommunications Standard Institute (ETSI), "Multi-access Edge Computing (MEC); MEC 5G Integration", Draft ETSI GR MEC 031 V2.0.6, DGR/MEC-0031 MEC, 5G, Sophia Antipolis, France, Aug. 7, 2019, 32 Pages.
European Telecommunications Standard Institute (ETSI), "Multi-access Edge Computing (MEC); Framework and Reference Architecture", Draft ETSI GS MEC 003 V2.1.2, RGS/MEC-0003v221Arch, architecture, MEC, Sophia Antipolis, France, Jul. 5, 2019, 21 Pages.
European Telecommunications Standard Institute (ETSI), "MEC0031_KI#9_input_for_editor_note_evaluation_section", InterDigital, Inc., MEC#162-Tech, Apr. 20, 2020, 2 Pages.

* cited by examiner

| Field Name | Description | Scope |
|---|---|---|
| Client ID | Client Identifier | cERF/nERF |
| Network ID | Edge Network Identifier | cERF only |
| FQDN | Fully Qualified Domain Name | cERF/nERF |
| FQDN IP | IP Address of the FQDN | cERF/nERF |
| EI Data Array | Edge Instance Data | cERF/nERF |

Figure 19

| Field Name | Type | Description |
|---|---|---|
| EI IP | Mandatory | Edge Instance IP Address |
| TTL | Option | Time validity |
| GeoLocation | Option | Geolocation Validity |
| NetworkLocation | Option | Network Zonal Validity |
| Latency | Option | Edge Instance Latency |
| LinkSpeed | Option | Edge Instance Link-speed |
| CpuLoad | Option | Edge Instance CPU Load |
| GpuLoad | Option | Edge Instance GPU Load |
| StorageSize | Option | Edge Storage Size |
| EI Port | Option | Port Number at which EI Listens |

Figure 20

METHODS, APPARATUS, AND SYSTEM FOR EDGE RESOLUTION FUNCTION

CROSS-REFERENCE TO RELATED APPLICATIONS

This application is the 371 National Stage of International Application No. PCT/US2020/047887, filed Aug. 26, 2020, which claims priority to U.S. Provisional Application No. 62/893,544, filed Aug. 29, 2019, U.S. Provisional Application No. 62/947,252, filed Dec. 12, 2019, and U.S. Provisional Application No. 62/991,242 filed Mar. 18, 2020, the disclosures of which are incorporated herein by reference in their entireties.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as fifth (e.g., $5^{th}$) generation (5G), may provide edge computing, which may also be referred to as fog networking and/or ubiquitous computing, and may make edge computing a necessity. For example, use cases such as automation of vehicles, such as cars and drones, real-time Augmented Reality (AR), immersive gaming, etc. represent only a few technologically advanced use cases that may need edge computing, for example, for low latency support. Although implementation of such use cases has been attempted using conventional network capabilities and technologies, such implementations remain scarce and available with limited features, for example, in controlled environments and/or using specialized hardware.

While edge computing may have similarities with (e.g., conventional) cloud computing, edge computing has its own unique set of challenges. For example, in a case of (e.g., conventional) cloud computing networks, existing discovery and/or routing mechanisms operate assuming that services are centrally located, and such services provide equivalent performance and/or functionality. However, both assumptions are inexact in a case of edge computing because services are deployed in a de-centralized way and/or placed closer to the point of consumption. In such a case, depending on the service instance selected, such services may not provide an equivalent latency to the end-user. The European Telecommunications Standards Institute (ETSI)—Multi-access Edge Computing (MEC) and the $3^{rd}$ Generation Partnership Project (3GPP) 5G Edge Compute group are focused on characterizing and solving such edge computing problems. Such edge computing problems can be addressed, for example, in view of Domain Name System/Service/Server (DNS) technology. DNS is an essential component of the internet as it provides a worldwide distributed name directory service and is used in both public and private networks. DNS translates fully qualified domain names (FQDN), identifying an application or service, to the IP addresses needed for locating and identifying computer resources in the IP address space, where applications and services are available.

In a case of distributed (e.g., conventional) cloud services, a function of DNS is to optimize user distribution by providing different IP addresses for the same FQDN, for example, to direct users to proximal servers for low latency. Such DNS functions are provided using DNS communications having a message structure of 5 sections: (1) Header, (2) Question (e.g., a question for the DNS), (3) Answer, for example, resource records (RRs) answering the question for the DNS, (4) Authority (e.g., RRs pointing toward an authority), and (5) Additional (e.g., RRs holding additional information). In a case of (e.g., conventional) DNS, a header is present and specifies which of the remaining sections are present. The header includes a 16-bit identifier (ID) used in both the request and the responses, a series of bits describing the message, and four counters indicating the number of records in the other sections. A question contains fields that describe a question/query sent to a name server and is composed of query type (QTYPE), query class (QCLASS), and query domain name (QNAME) fields. The Answer, Authority, and Additional sections have the same format, each being a list of RRs, each of which may be empty. Further a DNS message format, as discussed herein, may be similar to that as described and/or defined by the Internet Engineering Task Force (IETF).

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 19 is a diagram illustrating an EI record, according to embodiments;

FIG. 20 is a diagram illustrating Edge Instance (EI) data, according to embodiments;

EXAMPLE NETWORKS FOR IMPLEMENTATION OF THE EMBODIMENTS

Figure 1A:
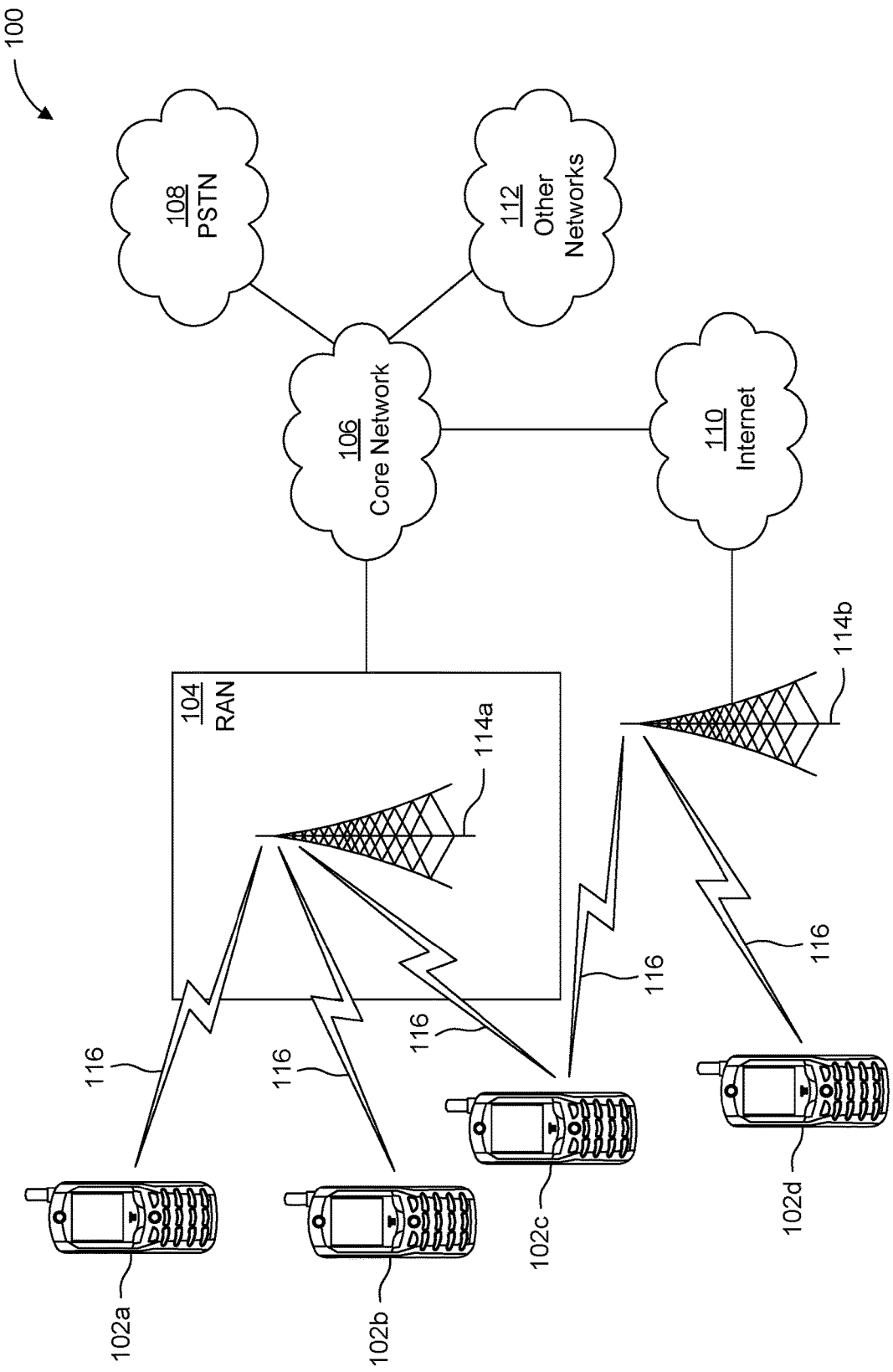
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
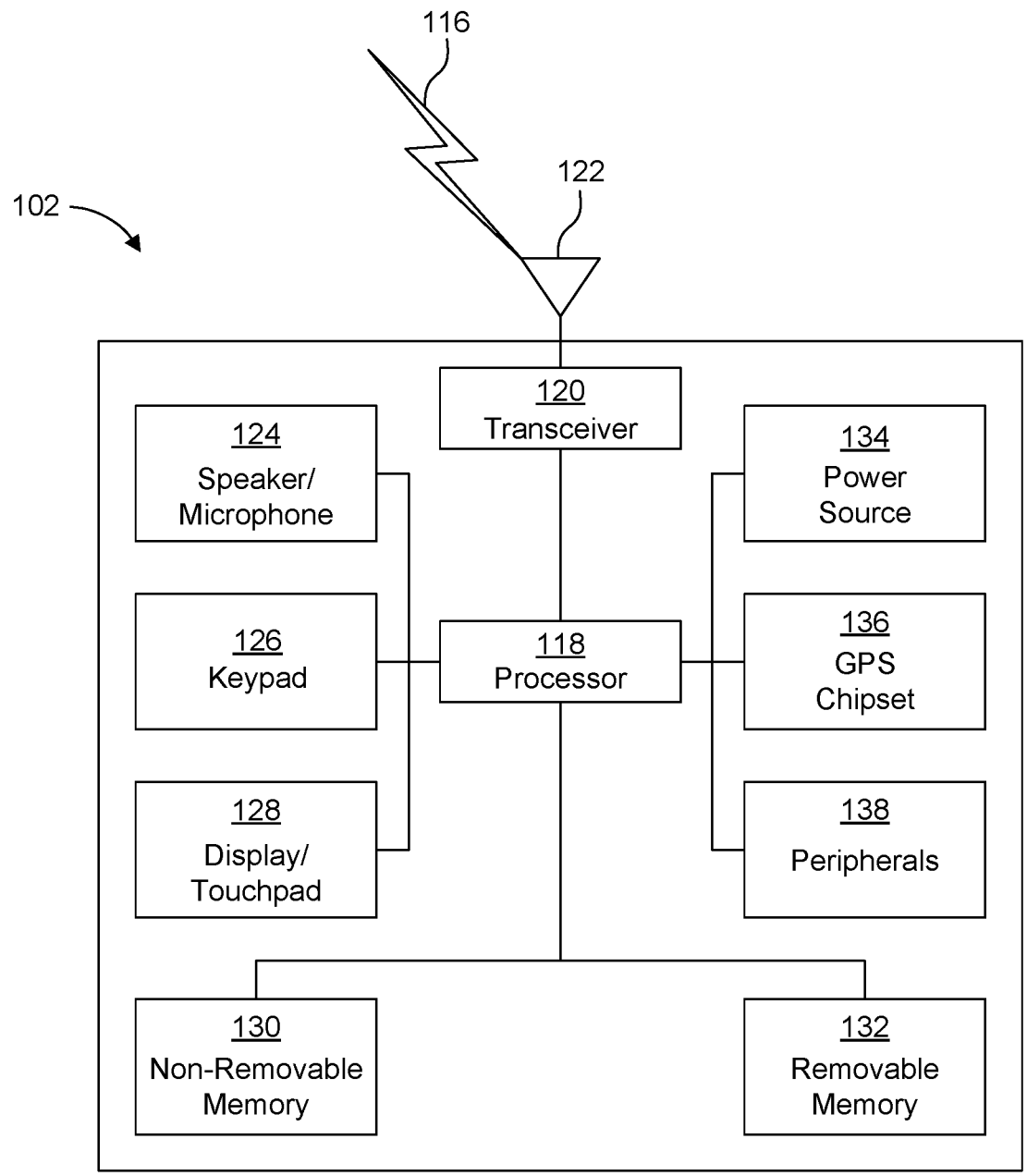
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
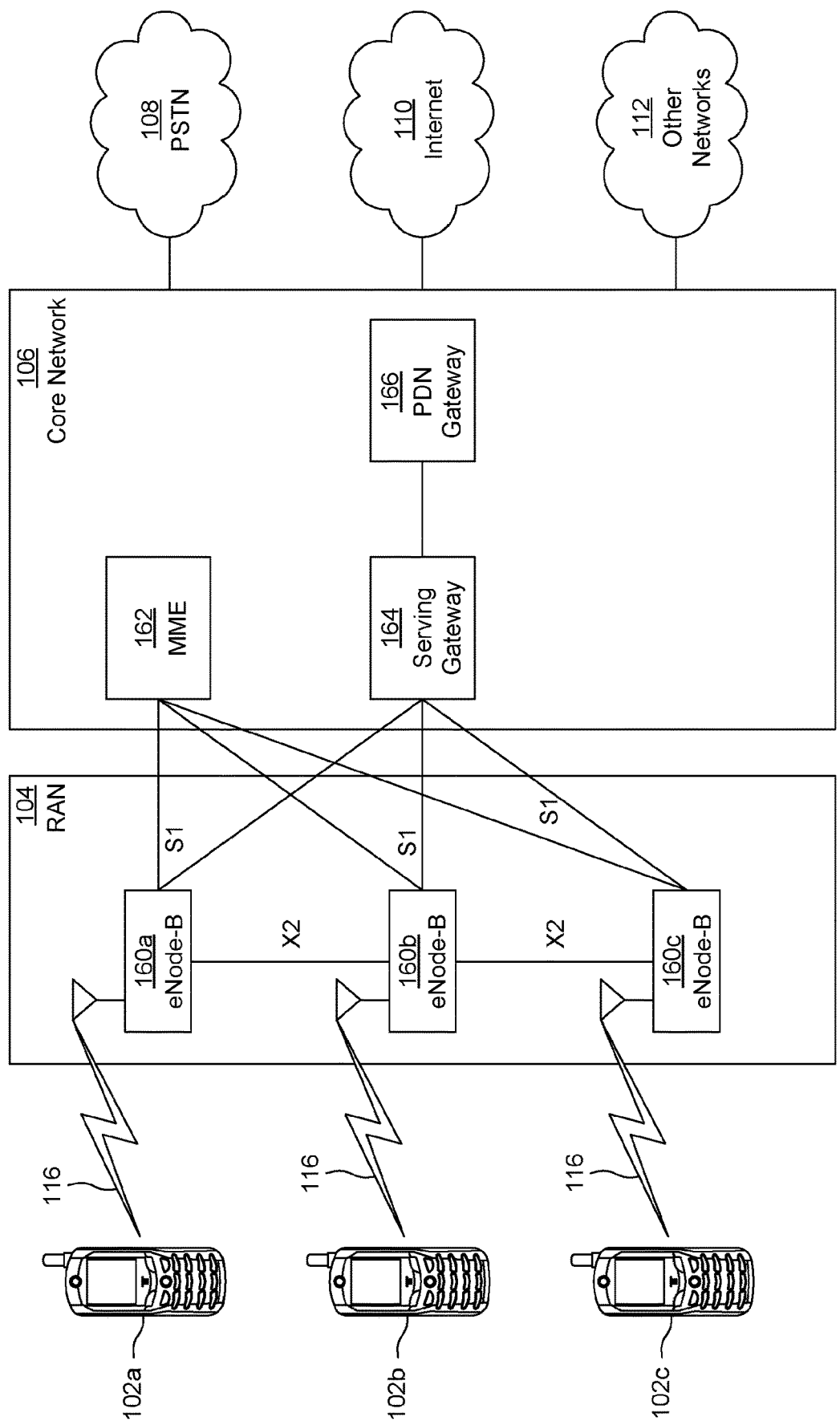
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
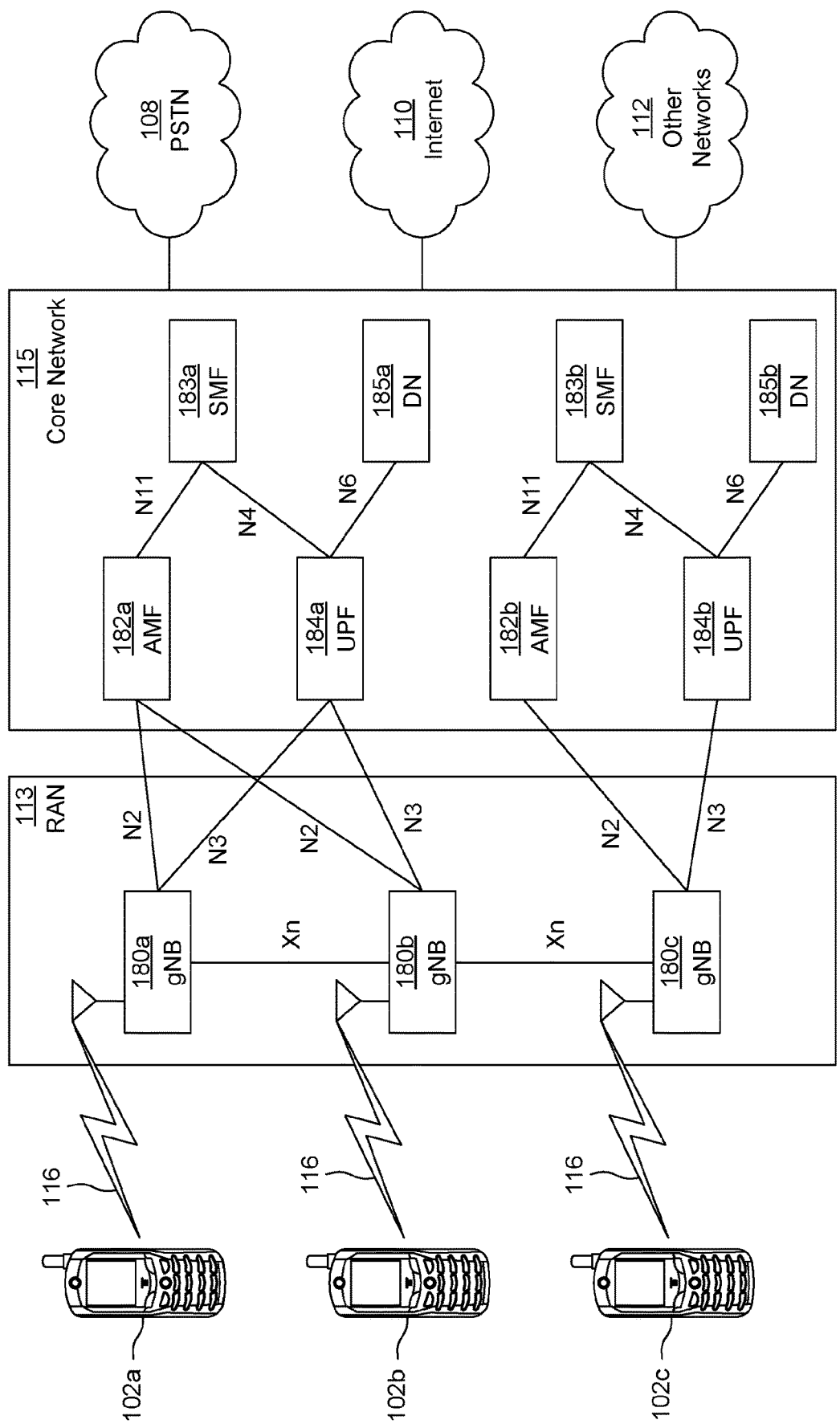
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Domain Name System/Service (DNS)

In view of DNS communications having a message structure including (e.g., sections for) a header, a question, an answer, an authority, and additional resource records (RRs), the DNS protocol may be considered to include two (e.g., main) parts: (1) a query/response protocol for querying against specific names, and (2) a protocol for name servers to exchange database records.

Figure 2:
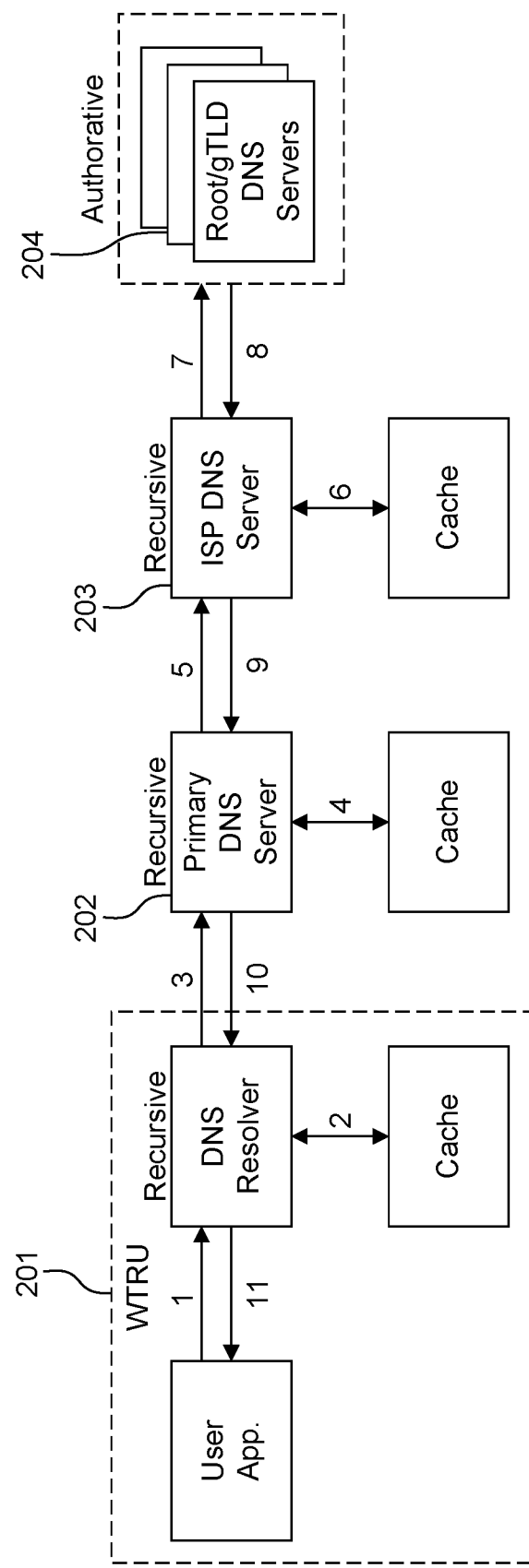
FIG. 2 is a diagram illustrating DNS Recursive Resolution Sequence.

FIG. 2 is a diagram illustrating DNS Recursive Resolution Sequence.

DNS resolution performs (e.g., is a process for) mapping a domain name to an IP address, for example, using the recursive query mechanism, which may be a recursive resolution sequence, shown in FIG. 2. Referring to FIG. 2, the sequence may start with (e.g., a user of) an application, for example, associated with WTRU 201, trying to resolve the name "http://example.com". The (e.g., user) application may first rely on a standard library and/or module supporting name resolution for the given application language. For example, in a case of the Java application language, a sequence may start with the Java module:

java.net.InetAddress:
//Fetch IP address
InetAddress ip=InetAddress.getByName(new URL ("http://example.com").getHost( );.

In a case where the requested name is not cached, then a sequence for client-side resolution processing may occur. Client-side resolution processing includes: (1) an (e.g., user, WTRU 201) application querying the local DNS Resolver through the name resolution library and/or module; and (2) a DNS resolver verifying/determining if the requested name is cached. In a case where the requested name is not cached, recursive resolution processing may occur. Recursive resolution processing includes: (1) the DNS Resolver queries a primary DNS server 202 using the DNS server IP address; (2) the primary DNS server 202 verifies/determines if the requested name is cached; (3) if the requested name is not cached, the primary DNS server 202 queries the internet service provider (ISP) DNS server 203; and (4) the ISP DNS server 203 verifies/determines if the requested name is cached. In a case of the primary DNS server 202 querying the ISP DNS server 203, for such a query, a WTRU 201 is (e.g., must be, previously) configured (e.g., provisioned) with a DNS IP address. Such provisioning (e.g., configuring) of a WTRU 201 may occur at network connection time, and the method used to provision the WTRU 201 with the DNS IP address may be network dependent. For example, a Wi-Fi network may use DHCP, and LTE networks may use a network access stratum (NAS) protocol (e.g., protocol configuration options in an active default bearer request), to provision the WTRU with the DNS IP address. Further, DNS server provisioning may be independent of the (e.g., requested name) resolution mechanism and should (e.g., must) happen prior to name resolution.

In a case of an ISP DNS server 203 determining that the requested name is not cached, authoritative resolution processing may occur. Authoritative resolution processing may include: (1) an ISP DNS server 203 queries one of a Root or a gTLD DNS server 204; (2) in a case where the queried Root/gTLD DNS server 204 does not resolve the requested name, the Root or the gTLD servers 204 indicate other servers to contact (e.g., the Root/gTLD servers are not recursive so they do not further process the request); (3) the ISP DNS server (e.g., eventually) queries the right Root/gTLD server and obtains a resolution for the requested name; (4) the DNS servers (e.g., the ISP DNS server, then the Primary DNS server) responds to the request and may cache the response for future requests; and (5) the DNS resolver is provided with the response to the name query and caches the IP address(es).

Further, the IP address is provided back to the (e.g., user) application. The DNS resolution procedure, as (e.g., in the case) described above, includes (e.g., overall) complexity and (e.g., induced) latency. For example, in such a case of resolution complexity and latency, DNS caching may be used (e.g., needed, necessary, etc.) to improve performance and reduce DNS server load. In a case where the resolution process is completed, the e.g., (user) application has the IP address and creates and open a TCP/UDP Socket to communicate with the service, for example, using a programming language module. For example, the application may create a socket using the Java module java.net.Socket:

//Create socket using resolved IP address
int portNumber=80
myClientSocket=new Socket(ip, portNumber);

The Socket provides an application programming interface (API) to the (e.g., user) application, for example, to communicate with the server. In the above example, the socket provides the send( ) & receive( ) API functions for UDP and the getInputStream( ) & getOutputStream( ) for TCP communication. In a case of a TCP connection, the connection to the server is (e.g., must be) established prior to using the socket. Calling the connect( ) API triggers the TCP connection establishment sequence (SYN/SYN-ACK/ACK), and a connection is kept alive until close( ) API is called or the connection gets broken by a change in connectivity (e.g., a server is unreachable).

Figure 3:
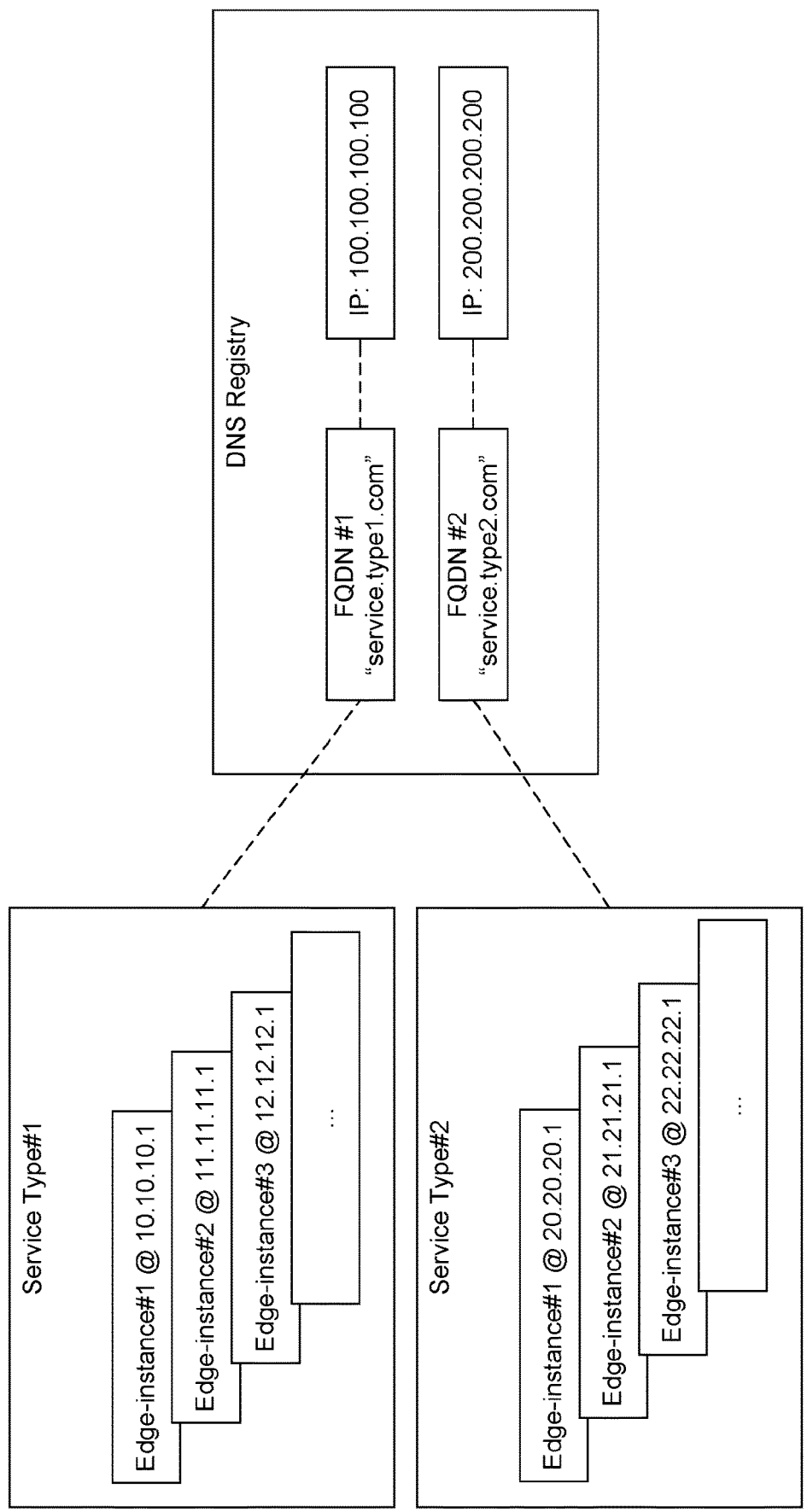
FIG. 3 is a diagram illustrating a relationship between an edge-service instance and a DNS registry, according to embodiments.

FIG. 3 is a diagram illustrating a relationship between an edge-service instance and a DNS registry, according to embodiments.

In a case of edge computing, an edge-service instance (e.g., see FIG. 3, edge-instance #1-#3, etc.) may have a relationship with a DNS registry. A DNS (e.g., conventionally) attempts to resolve a fully qualified domain name (FQDN) to any number of IP addresses where a specific service (e.g., see FIG. 3, service type #1, etc.) is available; when a FQDN points to multiple IP addresses, it is the privilege of the DNS resolver located on the mobile client to select any of these since they are all equivalent. Such conventional operation of a DNS server is not compatible (e.g., aligned, seamless, integrated, etc.) with (e.g., a reality of) edge computing, for example, where a FQDN may resolve to several different IP addresses that are not equivalent in terms proximity. That is, the relationship illustrated in FIG. 3 is not supported (e.g., compatible with, implemented by, integrated with, etc.) by (e.g., conventional, current, etc.) DNS systems. Hereinbelow, the relationship illustrated in FIG. 3 may be any of referred to, inferred, expected, relied upon, etc., and as noted, is a relationship that conventional (e.g., the current) DNS systems does not (e.g., is not capable of) handling properly. A relationship between edge-service instances, service types and DNS records as illustrated in FIG. 3 may be referred to (e.g., expected, relied upon, assumed, etc.) hereinbelow.

In a case of a service type to FQDN relationship, each service type has its own unique FQDN record in the DNS Registry, regardless of the instance(s) IP addresses and location(s). The FQDN is tied to at least one Address record (A-record) in the DNS registry. In (e.g., conventional, current, etc.) DNS deployments, the FQDN A-record contains the address of a network node (e.g., public or private) providing the service. According to embodiments discussed hereinbelow, a final resolution may be dissociated from a DNS Registry A-record. In such a case, the DNS registry A-record may be any IP address, for example, an address of any of a public cloud or private node, an edge-instance in particular, and an un-assigned IP address. According to embodiments, associating a service type with a single FQDN may facilitate WTRU side service discovery, for example, by using a single well-known FQDN; and, use of a single FQDN for a service is aligned with (e.g., current) best practices.

In a case of a service type to edge-instance relationship, each service type may have any number of (e.g., running) edge-instances. Edge-instances may be co-located in a (e.g., same) edge-node or distributed across a plurality of any of nodes and locations. Hereinbelow, it may be assumed that all edge-service instances (e.g., of a service type) provide a same service, but (e.g., possibly) in different locations. Conventional (e.g., current) DNS are not capable of (e.g., properly) handling such (e.g., service type to multiple edge-instances) relationships.

5GC Architecture

Figure 4:
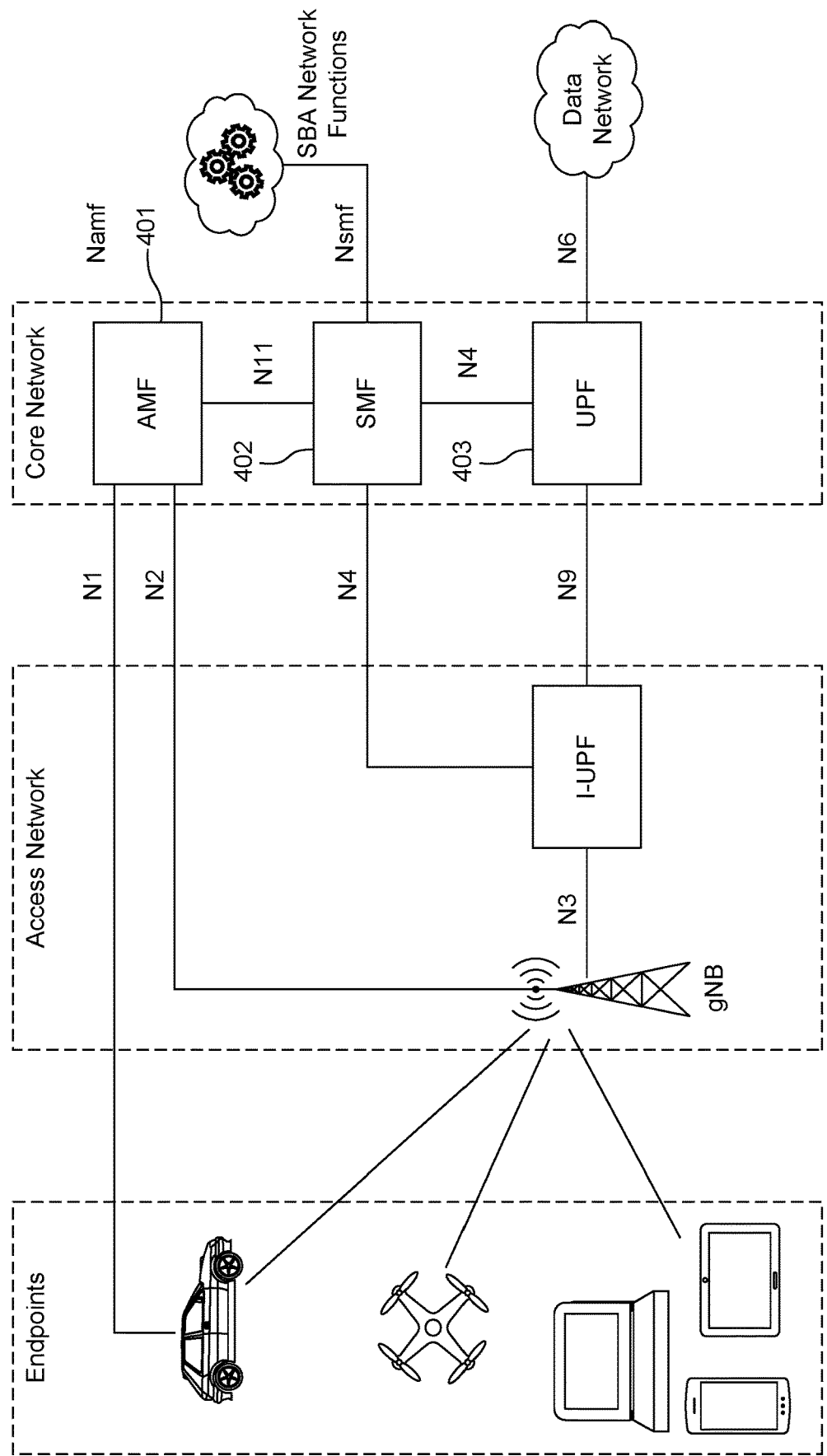
FIG. 4 is a diagram illustrating 5G core reference point architecture according to embodiments.

FIG. 4 is a diagram illustrating 5G core reference point architecture according to embodiments.

5G Core (5GC) has a different architecture than (and may be considered an evolution of the) 4th Generation (4G) Evolved Packet Core (EPC), and edge computing has a (e.g., significant) role in realizing (e.g., new) 5GC features. An overview of 5GC architecture and (e.g., fundamental) components is provided and may be referred to hereinbelow. Referring to FIG. 4, 5GC reference points and core components (e.g., modules) may include any of an Access and Mobility Management Function (AMF) 401, a Session Management Function (SMF) 402, and a User Plane Function (UPF) 403.

An AMF 401 handles requests from any of (e.g., reference points, interfaces, etc.) N1 and N2, for example, to handle requests related to connection and mobility management. The AMF 401 forwards session management requirements over (e.g., reference points, interfaces, etc.) N11 to an SMF 402. An SMF 402 interacts with a (e.g., decoupled) data plane, and receives session management requirements, via (e.g., over) N11 from the AMF 401. An SMF 401 creates, updates, removes, and manages Protocol Data Unit (PDU) sessions over (e.g., reference points, interfaces, etc.) N4 with the UPF 403. A UPF 403 is an interconnect point between a mobile infrastructure and a DN (Data Network), and as such, is a PDU session anchor point for providing mobility between radio access technologies (RATs). A UPF 403 performs packet routing and/or forwarding, for example, by including Uplink Classifiers (UL-CLs) based on traffic matching filters. A UPF performs application detection using any of Service Data Flow (SDF) traffic filters or 3-tuple (e.g., protocol, server-side IP, port) PFDs received from a SMF 402 via (e.g., over reference point, interface, etc.) N4. A UPF 403 also performs any of traffic usage reporting and Quality of Service (QoS) handling, including packet marking, rate limiting and reflective marking of downlink (DL) traffic.

An AMF receives (e.g., all) connection requests from any of a WTRU or a gNB via (e.g., over reference points, interfaces, etc.) N1 and/or N2, and is (e.g., only) responsible for handling connection and mobility management tasks. That is, an AMF may forward (e.g., all) session management tasks via (e.g., over reference point, interface, etc.) N11 to the SMF. A Globally Unique AMF Identifier (GUAMI) (e.g., uniquely) identifies any number of AMF instances, for example, that are included (e.g., instantiated, realized, etc.) in a mobile network. A GUAMI is indicated (e.g., identified, specified, notified, etc.) by WTRUs in a NAS message, which is routed to the correct AMF instance by the RAN. Such routing, for example, ensures that messages from a WTRU connected through different access networks (e.g., all) get routed to the same AMF.

Figure 5:
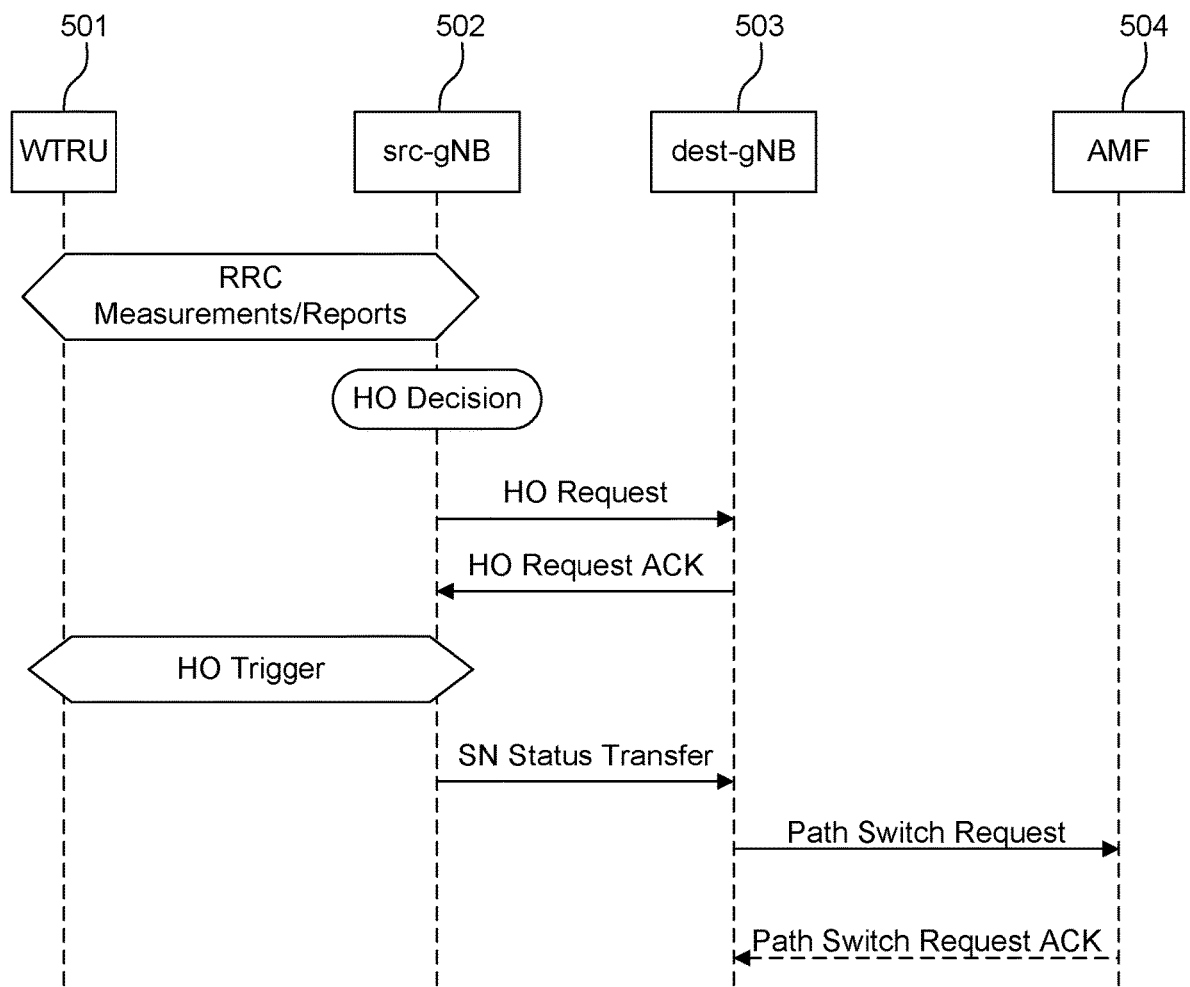
FIG. 5 is a diagram illustrating a WTRU handover in a 5GC architecture, according to embodiments.

FIG. 5 is a diagram illustrating a WTRU handover in a 5GC architecture, according to embodiments.

The (e.g., summarized) overview of a handover of a WTRU 501, as shown in FIG. 5, aligns with a WTRU handover as defined by 3GPP. Referring to FIG. 5, a WTRU 501 (e.g., at an initial state) is connected to a source gNB (src-gNB) 502 and WTRU traffic flows through a UPF (not shown). Radio Resource Control (RRC) reports (e.g., measurements) are sent (e.g., periodically) to the src-gNB 502. A (e.g., sequence for, execution of) a handover begins when the src-gNB 502 detects that a handover to a destination gNB (dest-gNB) 503 is to occur (e.g., is needed, required, etc.). The src-gNB 502 connects with the dest-gNB 503, for example, by transmitting a handover request and receiving a handover request acknowledgement, to begin the handover process. Once the tunnels have been moved to dest-gNB 503, which may be a handover trigger, the WTRU 501 performs the handover, connects to dest-gNB 503, and the SN_STATUS_TRANSFER message is sent to the dest-gNB 503. A path switch request is then made from the dest-gNB 503 to AMF504. Once acknowledged, the WTRU traffic can flow through the dest-gNB and on to the prescribed UPF.

A SMF interacts (e.g., is responsible for interacting) with a (e.g., decoupled) data plane, for example, by any of creating, updating, and removing PDU sessions and managing session context with the UPF. The AMF forwards session management requirements via a (e.g., reference point, interface, etc.) N11 to the SMF. The AMF uses a Network Repository Function (NRF) to determine which SMF (e.g., is best suited) to handle the connection request. An AMF and the (e.g., reference point, interface, etc.) N11 use a Service Based Interface (SBI) message bus, which employs RESTful API principles over HTTP.

Figure 6:
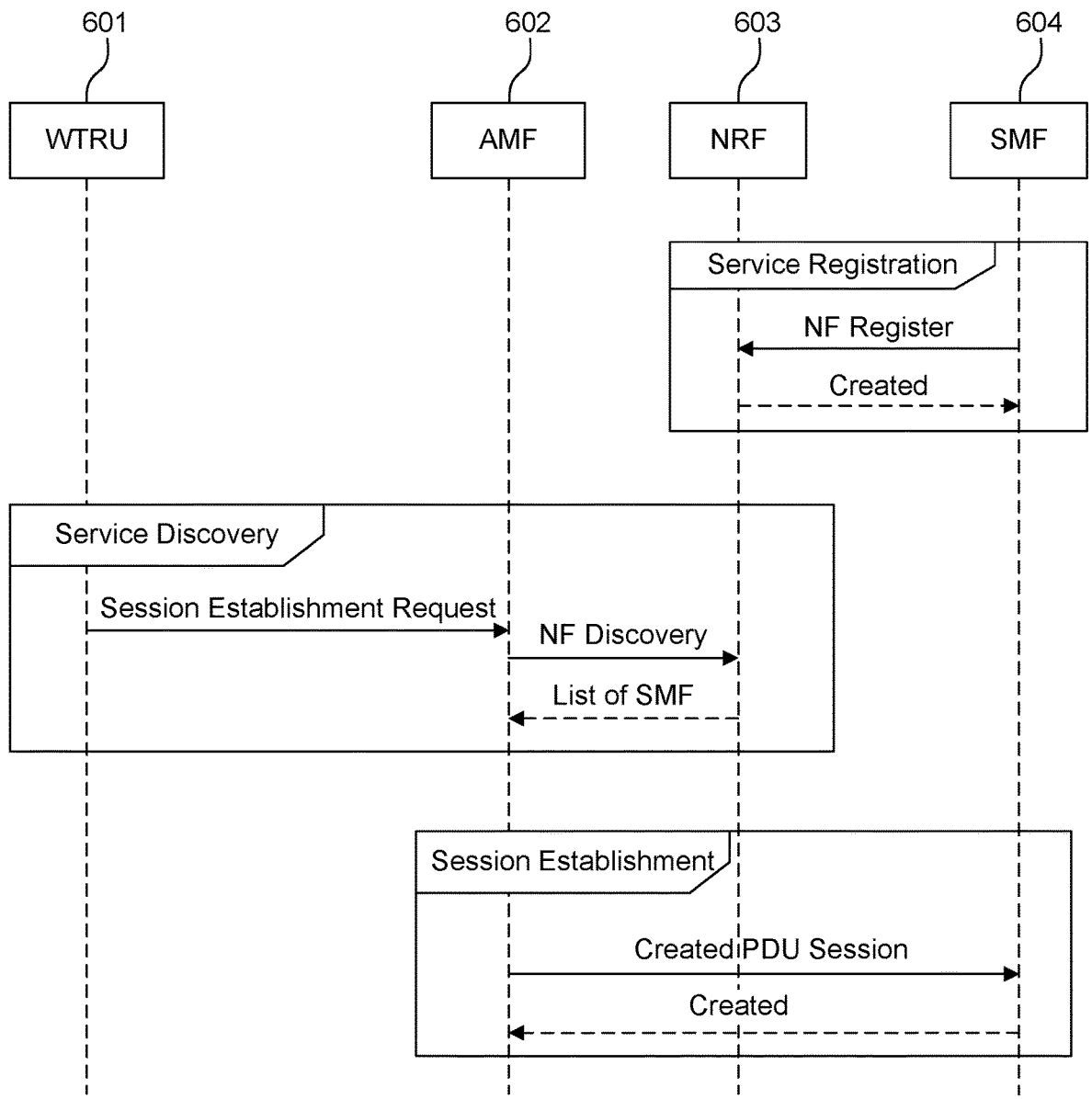
FIG. 6 is a diagram illustrating SMF registration and/or discovery, according to embodiments.

FIG. 6 is a diagram illustrating SMF registration and/or discovery, according to embodiments.

A SMF registration and/or discovery procedure, for example, as shown (e.g., as a summarized overview) in FIG. 6, includes use of a WTRU 601, an AMF 602, an NRF 603, an SMF 604, and SBI (e.g., a SBI message bus) and aligns with a SMF 604 registration and/or discovery procedure as defined by 3GPP. Referring to FIG. 6, messages received by the SMF 604 via (e.g., reference point, interface, etc.) S11 represent a trigger to add, modify or delete a PDU session across the UPF. The SMF 604 communicates with a UPF via (e.g., reference point, interface, etc.) N4, for example, using the Packet Forwarding Control Protocol (PFCP). Together, the SMF 604 and the AMF 602 decouple control plane functions from the user plane, and the SMF performs the role of any of a DHCP server and a IP Address Management (IPAM) system. The SMF and the UPF (e.g., respectively, together, both, separately, etc.) maintain a record of a PDU session, for example, by using a 24 bit PDU Session ID. The SMF sets configuration parameters in the UPF, for example, to define traffic steering parameters and to ensure (e.g., appropriate) routing of packets while guaranteeing the delivery of incoming packets, for example, using a DL data notification.

A UPF interconnects (e.g., is an interconnection point between) a mobile infrastructure (e.g., network) and a DN. A UPF identifies a user plane traffic flow based on information received from the SMF via a (e.g., reference point, interface, etc.) N4. The (e.g., reference point, interface, etc.) N4 employs PFCP (Packet Forwarding Control Protocol). PFCP sessions, established with the UPF, define how packets are any of: identified, for example, using a Packet Detection Rule (PDR); forwarded, for example, using Forwarding Action Rules (FARs); marked, for example using QoS Enforcement Rules (QERs); and reported, for example using Usage Reporting Rules (URRs).

Figure 7:
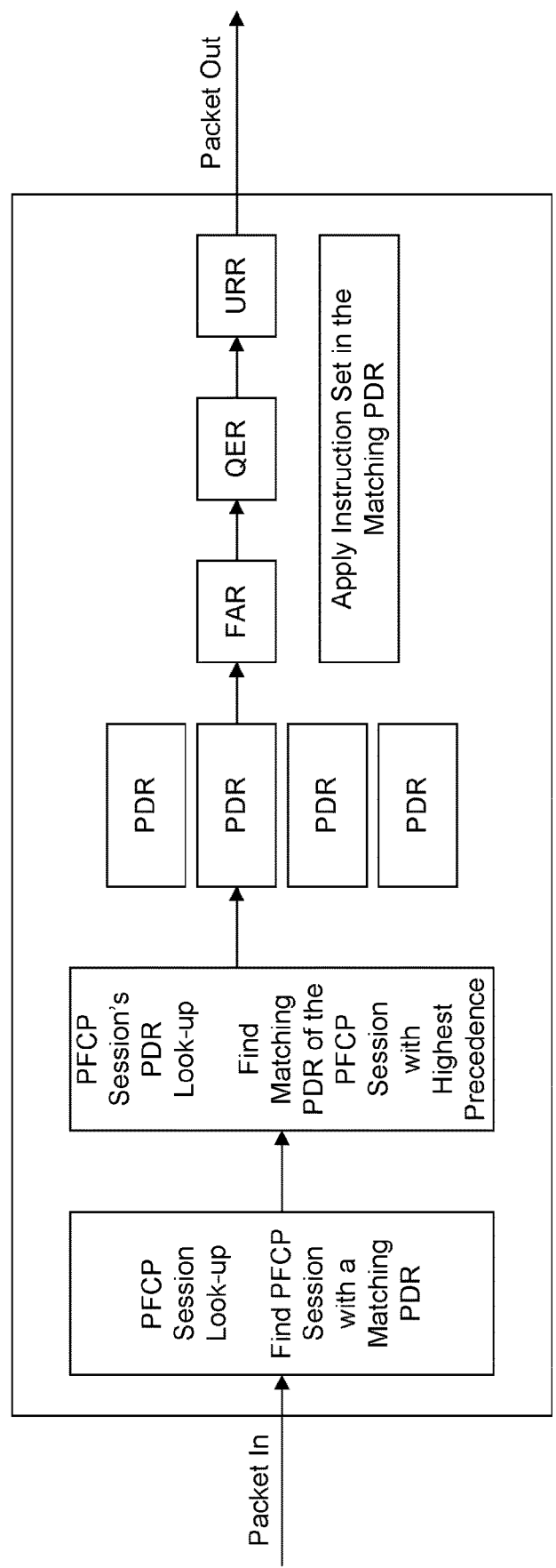
FIG. 7 is a diagram illustrating packet processing flow in a UPF, according to embodiments.

FIG. 7 is a diagram illustrating packet processing flow in a UPF, according to embodiments.

A FAR defines whether and how packets matching PDRs should be any of dropped, forwarded, buffered or duplicated. Referring to FIG. 7, a FAR includes (e.g., identifies) a trigger for first packet notification and includes packet encapsulation or header enrichment rules. A UPF (e.g., is capable to) routes uplink (UL) traffic flows of the same PFCP session (e.g., PDU session) to any number of (e.g., two or more) PDU sessions anchors, and routes the DL traffic flows from these PDU session anchors on a tunnel towards the WTRU. The SMF may insert PFCP rules during a PDU session establishment and/or modification and may remove PFCP rules during a PDU session modification.

Service-Based Architecture (SBA) provides a modular framework, for example, from which to deploy common applications using components of varying sources and suppliers. Multiple functions of a 5GC network are provided by Network Functions (NFs), such as, but not limited to, a Network Exposure Function (NEF), an Authentication Server Function (AUSF), a Policy Control Function (PCF). NFs are self-contained, independent and reusable services that expose functionality through a SBI, which, as noted above, employs a well-defined HTTP REST interface.

ETSI-MEC Architecture

Figure 8:
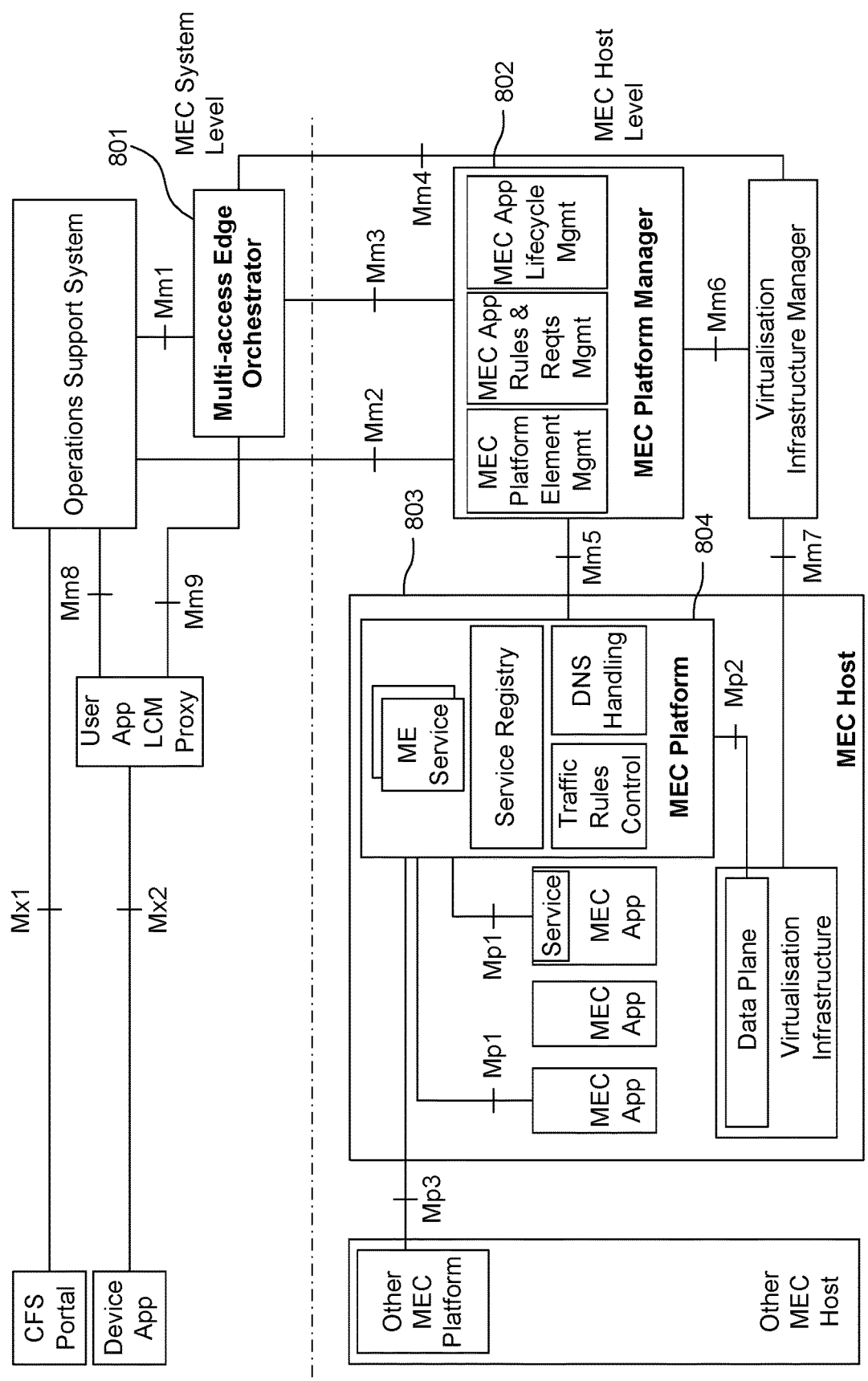
FIG. 8 is a diagram illustrating a multi-access edge system architecture, according to embodiments.

FIG. 8 is a diagram illustrating a multi-access edge system architecture, according to embodiments.

As described and discussed herein below, a multi-access edge system, according to embodiments, may be aligned with an architecture as proposed by ETSI-MEC. Referring to FIG. 8, main components of Multi-access edge system (e.g., reference) architecture and/or system include any of: a Multi-access Edge Orchestrator (MEO) 801, for example, at a system level; a MEC Platform Manager (MEPM) 802, for example, at a host level; and a MEC host 803 and a MEC Platform (MEP) 804, for example, at a host level. Such components interact together to coordinate the deployment of edge applications (e.g., a MEC app) on multiple MEC hosts.

A component of the MEP is the DNS handling function. The role of this component is to act as a DNS server for the MEC host. In the architecture shown in FIG. 8, device applications DNS requests for a FQDN are re-directed towards the MEP DNS server, which attempts to resolve the FQDN to a MEC app executing on the MEC host. If the DNS resolution attempt succeeds, the device application will communicate with the MEC app, achieving the initial edge-instance resolution. If the resolution attempt fails, the MEP DNS server reverts to the DNS recursive resolution mechanism (e.g., see discussion above).

Such an architecture and/or system, e.g., as proposed by ETSI-MEC, presents limitations. For example, in the presence of multiple edge tiers, the ETSI-MEC system becomes difficult to control with respect to where an edge-instance can be resolved. That is, the resolution depends on recursive DNS server configuration and limits the possibilities of edge-instance resolution. As another example, in a case of mobility events, the initial edge-instance resolution must be re-routed to a new edge instance on the network side. Further, ETSI remains vague on which component of the system is supposed to maintain the connection tracking information for a WTRU and how a new edge-instance is determined.

In a case of IP based mechanisms, for example, in a conventional DNS system, a WTRU (e.g., a client) discovers (e.g., hosted) services and exchanges data with hosted services. Such service discovery relies on the DNS, and such data exchange relies on various IP routing methodologies, algorithms and protocols to ensure bi-directional communication paths between a client and a service. However, such IP based mechanisms were (e.g., conventionally) designed and/or optimized according to a global "cloud-computing" paradigm and do not perform well when used in edge-computing environment for a variety of reasons. For example, DNS uses a WTRU-side DNS cache to reduce DNS induced latency and/or to minimize DNS server load. Cache plays a major role improving DNS responsiveness and performance, for example, by limiting the number of timely DNS resolution attempts. Cache was developed under the assumption that DNS is global. However, on the other hand, edge-networks are composed of a collection of localized DNS servers, each of which contains localized information about service availability. Accordingly, for example, in the edge-environment, the WTRU-side DNS cache prevents a mobile client from (e.g., re-) resolving a FQDN differently when it moves through the edge-network.

As another example of problems with IP based mechanisms, in a conventional DNS system, DNS servers define a time-to-live (TTL) parameter that represents the number of seconds for which a DNS entry is valid. The goal of this field was originally to indicate the frequency at which DNS entries are refreshed in the network and (e.g., therefore) indicates a time for which (e.g., for how long) a DNS entry should be cached. There may be a (e.g., tempting to use) case of a TTL value 0 preventing DNS caching, for example, to attempt to solve the problems associated with the WTRU-side DNS cache. In such a case, however, DNS servers interpret the zero value differently, and some interpret it as "never cache" while other as "never expire". Furthermore, not caching DNS entries is not a good solution for edge computing as it considerably slows down applications, for example, by constantly forcing full DNS resolution to happen. Accordingly, for example, use of a DNS TTL-zero is not currently supported by (e.g., conventional) DNS networks and constantly forcing full DNS resolution is inefficient and introduces latency.

As another example of problems with IP based mechanisms, in a conventional DNS system, a WTRU is configured with DNS server information (e.g., DNS server configuration) when the WTRU connects to a network, and such DNS server configuration (e.g., typically) remains static, for example, for as long as the WTRU remains connected to that network. Reconfiguring DNS is (e.g., typically) harmless due to the global scope of DNS, for example, because a FQDN (e.g., shall) always resolve to the same host or group providing that service. In the case of edge-networks, on the other hand, numerous instances of DNS servers (e.g., potentially one per edge-node and/or zone, as per ETSI-MEC reference architecture) are used. The scope of each DNS server is therefore localized, for example, because a given FQDN may resolve to different hosts depending on the DNS server used. Accordingly, for example, constantly (re-)configuring a mobile client DNS server as a WTRU moves through a network increases latency, for example, by requiring constant DNS cache invalidation and forcing full DNS resolution.

As another example of problems with IP based mechanisms, for example, in a conventional DNS system, an IP stack (e.g., always) routes a (e.g., given) destination IP address to the same service endpoint in the network, for example, regardless of the endpoint's QoS and/or location. In such a case, applications (e.g., must) implement over-the-top mechanisms to compensate for the network characteristics they get. In a case of edge-networks, any of QoS and location are fundamental aspects, and an edge-network (e.g., must) constantly routes application traffic to the best QoS and/or closest service instance, for example, without requiring an application intervention. Accordingly, for example, IP traffic routing methodologies do not account for any of location and QoS of the service, which is a core aspect (e.g., advantage, value, etc.) of edge-networking.

As another example of problems with IP based mechanisms, for example in a case of conventional ETSI-MEC systems, ETSI-MEC reference architecture defines a MEP (e.g., level) DNS server that (e.g., shall) handles DNS requests from mobile clients. This DNS server has knowledge of edge-application instances running on the local MEC host. A MEP DNS server is updated with edge-application IP addresses by the platform management agents at application deployment time. It is assumed that a MEC host is co-located with the point of access (PoA) and can intercept all mobile client DNS requests to be resolved by the MEP DNS server. If a local entry is not available, the MEP DNS server uses (e.g., then must rely on) the DNS server hierarchy which is limiting with respect to (e.g., possible) resolution options. If a local entry is available, the mobile client application is directed towards a local edge-application.

However, in the presence (e.g., event, occurrence, etc.) of a mobility event, an undefined entity must apply re-routing rules so that edge-traffic is routed to a new edge application instance. That is, the (e.g., conventional) ETSI-MEC reference architecture assumes a one-to-one relationship among POA, MEC Host, MEC Application. Further, the ETSI-MEC reference architecture assumes that DNS requests coming from a mobile client should be directed towards the MEC Host attached to the POA, where only local edge-applications are running. Accordingly, for example, the ETSI-MEC reference architecture does not allow for (e.g., limits, prohibits, inhibits, proscribes, etc., the ability of) resolving to more than one edge location, and the ETSI-MEC reference architecture also vaguely defined and complex to implement due to connection tracking. As seen from the above discussed examples, in a case of conventional DNS systems and IP based mechanisms, which are, for example, underlying and ubiquitous technologies of modern networking, they lack the features needed by the edge-computing environment.

According to embodiments, a mobile client may (e.g., any of successfully and reliably) discover and exchange data with any number of edge-services instances, for example, while retaining (e.g., fundamental) DNS and/or IP based technology found in conventional data networks and/or mobile devices and while remaining/being compatible with an (e.g., conventional) IP stack. According to embodiments, any of features, operations, elements, information, etc., of mobile networks and nodes may allow (e.g., ensure that) mobile clients (e.g., using DNS services) discover and communicate (e.g., reliably) with an (e.g., intended) edge application instance of a network. For example, according to embodiments, a mobile client may be (e.g., ensured) reliable discovery and/or communications with an (e.g., intended) edge application instance in a mobile network (e.g., 3GPP, Wi-Fi, multi-access, etc.) having any number of (e.g., a plurality of) instances of an edge-service available in any number of (e.g., diverse, different, etc.) edge locations.

According to embodiments, for example, to ensure that mobile clients may be reliably discover and/or communicate with a plurality of edge-service instances in a plurality of respective locations, a network may include any of: a client-side Edge Resolution Function (cERF); a network-side Edge Resolution Function (nERF); a network-side Edge Application Resolver (nEAR); and any of an Edge-Instance (EI) registry and EI record. According to embodiments, any of a cERF, nERF, nEAR, EI registry, and EI record may integrate with, supplement, be compatible with, make use of, etc., DNS and/or IP based technology, for example, the (e.g., conventional) DNS and/or IP based technology discussed above.

According to embodiments, a cERF may (e.g., add and/or have a capability of) identify(ing) edge-traffic, for example, of a mobile client. According to embodiments, a cERF may provide an (e.g., exact) edge application instance resolution, for example, by maintaining an EI registry. According to embodiments, a nERF may (e.g., add and/or have a capability of) identify(ing) edge-traffic, for example, of a mobile client. According to embodiments, a nERF may provide an exact edge application instance resolution by any of leveraging 5GC capabilities and maintaining an EI registry. According to embodiments, a nEAR may (e.g., add and/or have a capability of) maintain(ing) a mapping between the services offered at the edge and the multiple instances of these services. According to embodiments, any of an EI registry and an EI record may (e.g., add and/or have a capability of) maintain(ing) edge specific EI-records, for example, allowing for dynamically re-configurable edge-traffic routing for a mobile client (e.g., a WTRU).

Client-Side Edge Resolution Function (cERF)

According to embodiments, a WTRU (e.g., a mobile client) may include a cERF. That is, a cERF may be disposed in (e.g., executed by, instantiated in, realized in, performed by, etc.) a WTRU, for example, to enhance the resolution and routing capabilities of a WTRU by supplementing the DNS and routing systems included in the WTRU. According to embodiments, a cERF may interact (e.g., communicate, connect, register, etc.) with any of a nEAR (e.g., an edge application resolver function). According to embodiments, a cERF provides (e.g., performs, enables, etc.) dynamic edge-service instance selection, for example, for a WTRU's application sessions. According to embodiments, as a WTRU (e.g., a mobile client) moves across a network, edge-service instance selection may (e.g., must, should, etc.) happen at any (e.g., both of): a session initiation time and a session runtime (e.g., after a session has been initiated). According to embodiments, a cERF may (e.g., be responsible for) reconcile(ing) a global DNS vision and a localized edge view. According to embodiments, a nEAR may be an edge resolution enabler component. That is, according to embodiments, a nEAR may provide edge resolution features, and may be disposed at (e.g., reside in) an edge network. According to embodiments, a nEAR may have (e.g., include, perform, provide, interface with, etc.) a query API, for example, for providing (e.g., real-time) information about (e.g., a state of) an edge network.

Figure 9:
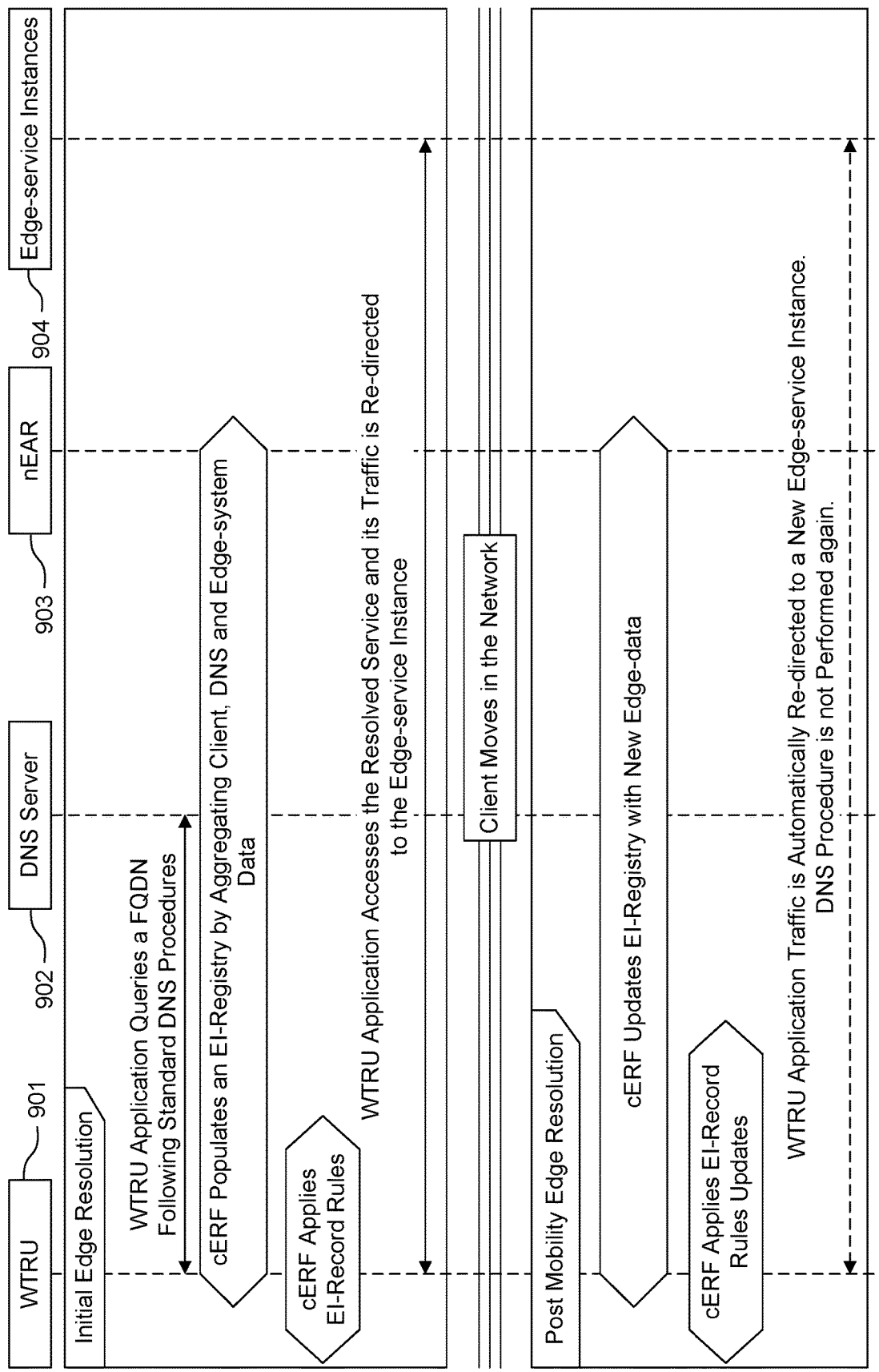
FIG. 9 is a diagram illustrating cERF procedures, according to embodiments.

FIG. 9 is a diagram illustrating cERF procedures, according to embodiments.

According to embodiments, a cERF, for example, executed and/or performed by a WTRU 901 may perform (e.g., cERF procedures, functions, features, etc., may include) at least an initial edge resolution and a post mobility edge resolution, for example, as shown in a high-level overview in FIG. 9. According to embodiments, for initial edge resolution, an application (e.g., executing on a WTRU 901) may initiate an (e.g., standard) DNS query (e.g., associated with DNS server 902) for a (e.g., given) FQDN, and a cERF (e.g., executed by/on the WTRU 901) detects the DNS query initiation (e.g., DNS attempt, DNS request, etc.). According to embodiments, a cERF may form an EI record (e.g., for an edge instance 904), for example, in response to the DNS query initiation, by aggregating information from any of the WTRU, a DNS request and/or response, and a nEAR 903. According to embodiments, a cERF may apply (e.g., execute, follow, etc.) the EI record rules, and, for example, as a result, egress traffic sent towards the FQDN IP may be redirected towards an edge-instance IP address.

According to embodiments, post-mobility edge resolution may occur (e.g., be triggered by) a (e.g., client, WTRU, device, etc.) mobility event, for example, in the network. According to embodiments, a cERF (e.g., WTRU 901) may detect a mobility event and may update EI records, for example, by querying a nEAR 903 of an associated network. According to embodiments, a cERF (e.g., WTRU 901) may apply (e.g., execute, follow, etc.) the (e.g., updated) EI record rules, and, for example, as a result, egress traffic towards a FQDN IP address may be (re-)directed to a (e.g., newly) resolved edge-instance 904, and a DNS procedure may not be (e.g., is not) performed again. According to embodiments, in a case where EI records may provide (e.g., allow for) a limit on a scope of an edge-instance (e.g., see discussion below), a complete set of edge-instances (e.g., present) in a network for a (e.g., given) FQDN may be received, for example, by the cERF. In such a case, the cERF may not (e.g., need to) contact the nEAR again, for example, when a mobility event occurs. In such a case, according to embodiments, the cERF may (e.g., just, locally) (re-)evaluate an applicable rule.

Initial Edge Resolution

In a case where an application (e.g., a mobile client, an application executed by a WTRU, etc.) may (e.g., want to, need to, etc.) access a network service, the application (e.g., only) knows the FQDN of the service, and it does not know if the service is hosted at the edge of the network or in the cloud. In such a case, in order to achieve connectivity with the service, the application (e.g., must) first resolves the FQDN to an IP address and then establishes a socket connection with that IP address. As noted in a case of conventional DNS procedures (e.g., as discussed above), the (e.g., mobile client) application, using a well-known software library and/or module, invokes a FQDN resolution function. In such a case, call-flow invokes the kernel APIs to trigger a query to the local DNS resolver. In such a case, since this is an initial resolution for the FQDN, a local DNS cache does not contain an entry and a DNS resolver triggers a request towards the configured DNS server. In such a case, a destination portion of DNS request 5-tuple has the following characteristics: (a) Destination IP: DNS server IP address; and (b) Destination port: 53, for example, as described with respect to conventional DNS procedures.

According to embodiments, a cERF may detect DNS attempts (e.g., a request towards a configured DNS server). That is, according to embodiments, a cERF may (e.g., need to) form a (e.g., valid) EI-record (e.g., collect EI record information) to populate the EI-registry, and to do so, the cERF may perform detection of DNS attempts to collect the EI-record information. According to embodiments, a mobile client (e.g., an application executed by a WTRU) may perform DNS detection using any of (e.g., techniques): an IP filter, a software tap, and a sniffer. However, the present disclosure is not limited thereto, and may perform DNS detection using any similar and/or suitable technique.

According to embodiments, an IP filter may perform (e.g., packet, traffic, flow, etc.) interception, for example, by capturing egress packets based on DNS 5-tuple information. According to embodiments, a software tap may perform (e.g., packet, traffic, flow, etc.) interception, for example, by using a software preloading technique (e.g., LD_PRE-LOAD), for example, and may insert a man-in-the-middle library to intercept (e.g., all) calls to the DNS resolver. According to embodiments, a sniffer may perform (e.g., packet, traffic, flow, etc.) observation, for example, by using DPI techniques to inspect the egress traffic flow. According to embodiments, any or both of interception and observation methods (e.g., approach) may be used, for example, independently, together/synchronously, respectively, etc. For example, (e.g., using, selecting, choosing, switching to, etc.) the interception approach might provide the benefit of finer timing control.

According to embodiments, there may be a case where a software tap technique/approach may use library pre-loading. Such a case may include (e.g., rely upon, involve, need, etc.) inserting an overriding (e.g., overwriting) name resolution function at the beginning of a function symbol table. According to embodiments, an overriding (e.g., overwriting) function signature may (e.g., must, perfectly) match a signature of the standard name resolution function. According to embodiments, in such a case, there may be an (e.g., a provided) opportunity to use (e.g., provide) any of an alternative implementation and pre/post-processing, for example, to an existing function. According to embodiments, in such a case, a function to be overridden (e.g., overwritten) may be a well-known name resolution function, such as, for example, getHostByName( ) from libc library.

Figure 10:
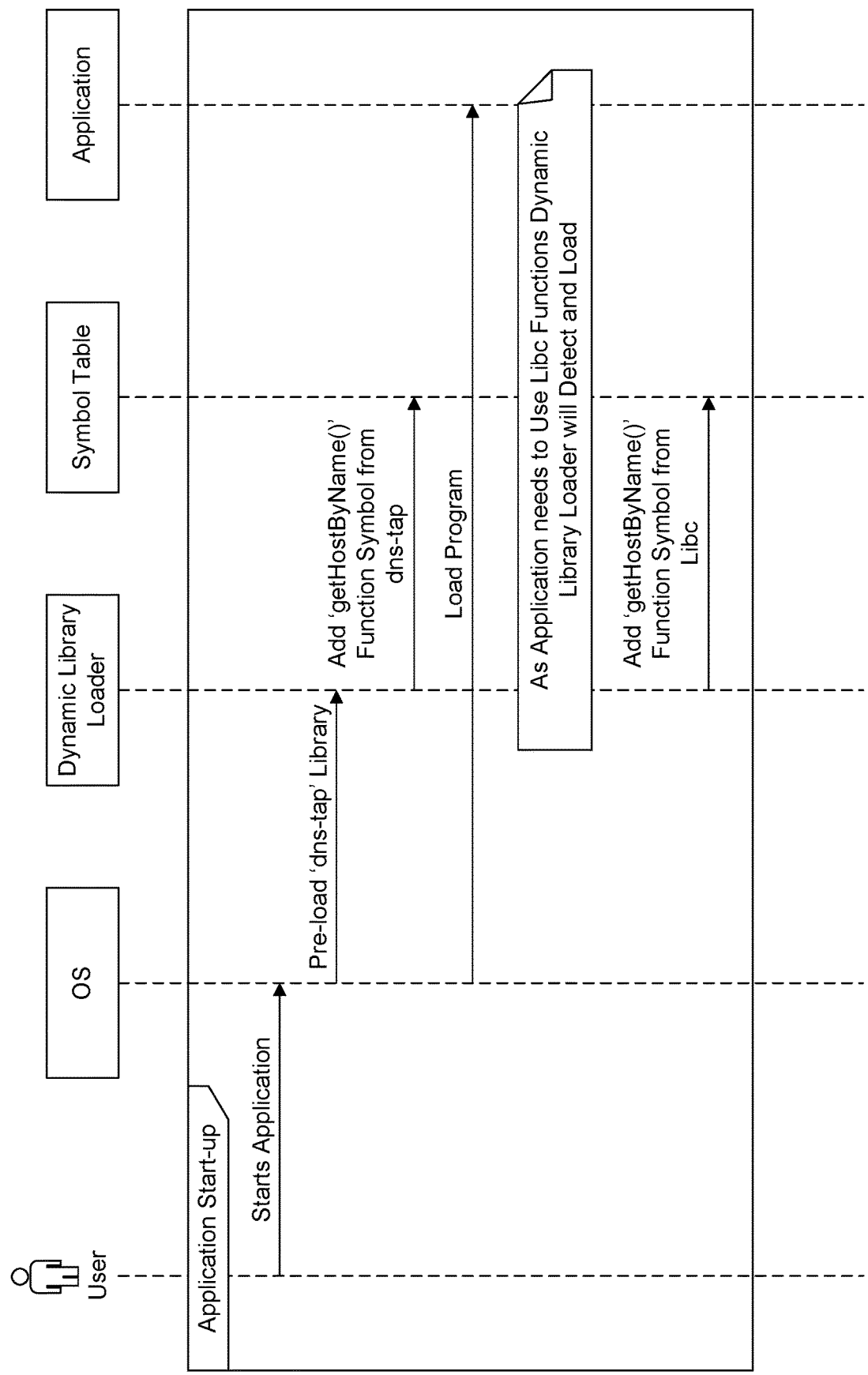
FIG. 10 is a diagram illustrating DNS request interception, according to embodiments.

FIG. 10 is a diagram illustrating DNS request interception, according to embodiments.

According to embodiments, referring to FIG. 10, such steps may be used (e.g., necessary) to override a getHostByName( )—libc function with (e.g., by) the getHostByName( )—dns-tap function. According to embodiments, an operating system (OS), for example, executed and/or used by a user and/or a WTRU, may pre-load a dns-tap library, for example, to add its own version of getHostByName( ) function to the symbol table. According to embodiments, pre-loading may be a global setting, for example, configured at an OS level and may (e.g., will) result in pre-loading the dns-tap library for all applications. According to embodiments, an OS may load the application (e.g., program) and may start the application execution, and for example, as the application executes, the OS may (e.g., need to) invoke a function from the libc library. According to embodiments, a dynamic library loader (DLL) may (e.g., then) load libc library, for example, to adds its own getHostByName( ) function to a symbol table. According to embodiments, for example, in view of the DNS request interception shown in FIG. 10, a symbol table may be as shown in Table 1.

TABLE 1

| function symbol table (beginning) |
| ... |
| getHostByName( ) (from dns-tap library) |
| ... |
| getHostByName( ) (from libc library) |
| ... |
| function symbol table (end) |

DNS Interception

Figure 11:
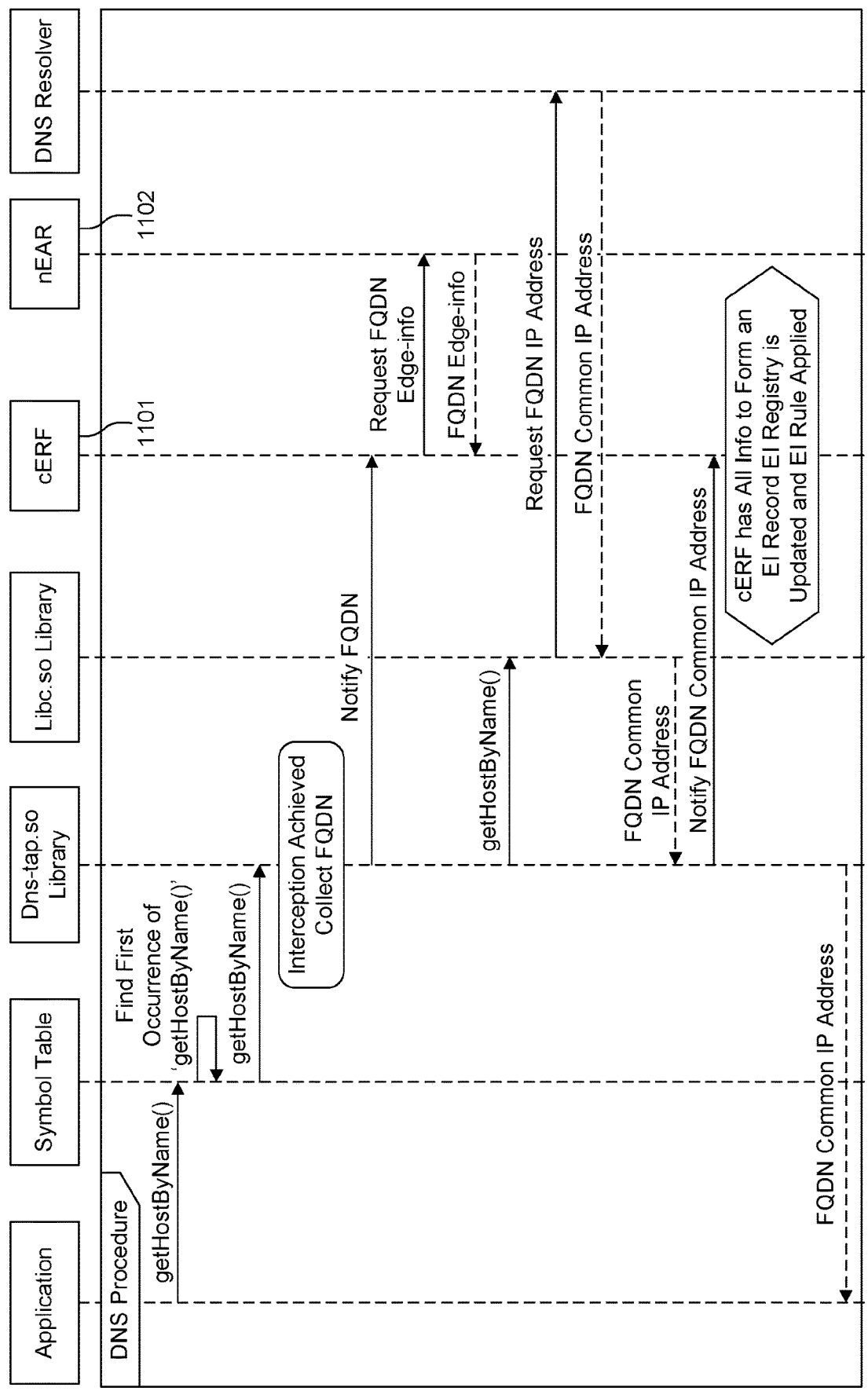
FIG. 11 is a diagram illustrating a nEAR FQDN inquiry, according to embodiments.

FIG. 11 is a diagram illustrating a nEAR FQDN inquiry, according to embodiments.

According to embodiments, in a case where an application (e.g., executing on a WTRU) when the application invokes getHostByName( ) function to resolve a FQDN, the dns-tap version (e.g., as described above) may invoked, for example, to perform (e.g., achieve) DNS interception. Referring to FIG. 11, the illustrated sequence shows DNS interception and how DNS interception is used by a cERF 1101 (e.g., associated with, executed by, performed by, etc., a WTRU) to query collect edge data from a nEAR 1102. According to embodiments, a getHostByName( )—dns-tap function may (e.g., mainly) perform any of (e.g., two actions): (1) notify a cERF 1101 of a FQDN, for example, so the cERF 1101 gathers edge-information about the FQDN from the nEAR 1102; and (2) invoke an original getHostByName( )—libc function on behalf of the application, for example, to let the normal DNS resolution sequence happens.

According to embodiments, for example, after the DNS resolution is completed, a cERF 1101 may be notified of the resolved FQDN IP address and the FQDN IP address may be returned to the application. According to embodiments, for example, as a result of the cERF 1101 being notified of the resolved FQDN IP address, a cERF 1101 may form a valid EI record. According to embodiments, a (e.g., valid) EI record may include (e.g., require) information from any of (e.g., different sources): a local mobile client, including information associated with any of a mobile client identifier, a network identifier, etc.; a DNS request/response, including information associated with any of a FQDN and a FQDN IP address; and a nEAR 1102, including information associated with EI data, including any of IP information and option information.

Edge Instance (EI) Rule Creation

According to embodiments, in a case of a (e.g., valid) EI record (e.g., upon a cERF forming a valid EI record, a cERF may update an EI registry, for example, with a newly formed record and the cERF may apply an EI rule. According to embodiments, EI records may include (e.g., indicate, contain, etc.) information (e.g., necessary) for appling IP forwarding rules. According to embodiments, IP forwarding may include forwarding (e.g., all) packets having a (e.g., specified, same, etc.) destination address, for example, to an (e.g., replacement) IP address. According to embodiments, such IP forwarding may (e.g., also) be known as Destination Network Address Translation (DNA), and such IP forwarding may transparent at a WTRU application level.

Figure 12:
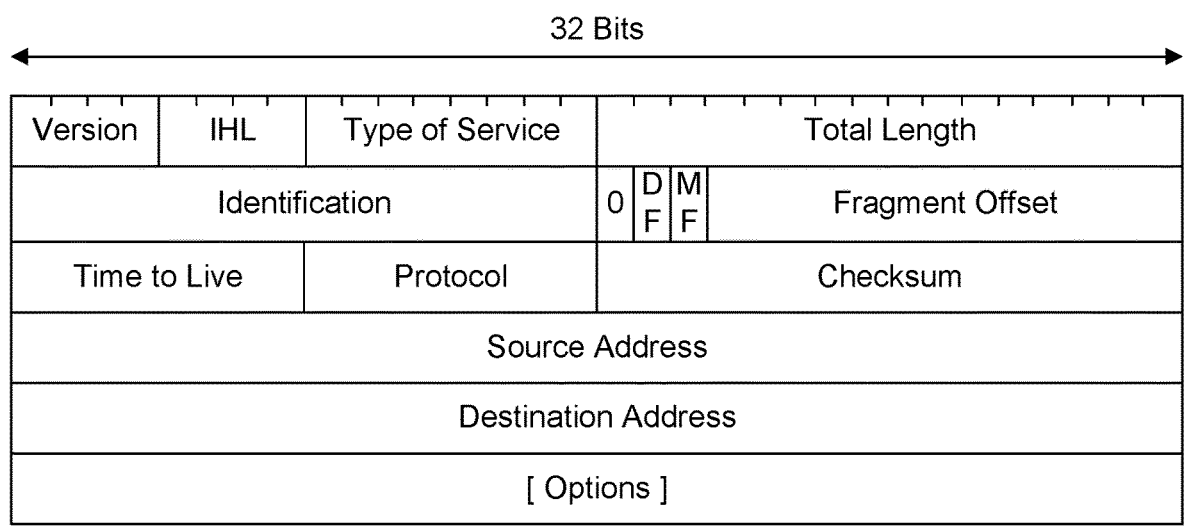
FIG. 12 is a diagram illustrating an IP header format, according to embodiments.

FIG. 12 is a diagram illustrating an IP header format, according to embodiments.

According to embodiments, a destination address of packets generated by the application may be (e.g., have, contain, point to, etc.) a resolved FQDN-COMMON-IP-ADDRESS, for example, as shown in the IP header format of FIG. 12. According to embodiments, for example, in a case of applying a DNAT rule, a destination address may be changed to EDGE-INSTANCE-IP-ADDRESS, for example, before a packet leaves a WTRU, for example, if the EDGE-INSTANCE-IP-ADDRESS was received from a nEAR. According to embodiments, an iptables tool may be used to apply (e.g., such) rules, for example, by using the syntax:

iptables-A PREROUTING-t nat-p tcp-d <FQDN-IP-AD-DRESS >-j DNAT-to-destination <EDGE-INSTANCE-IP-ADDRESS>.

Figure 13:
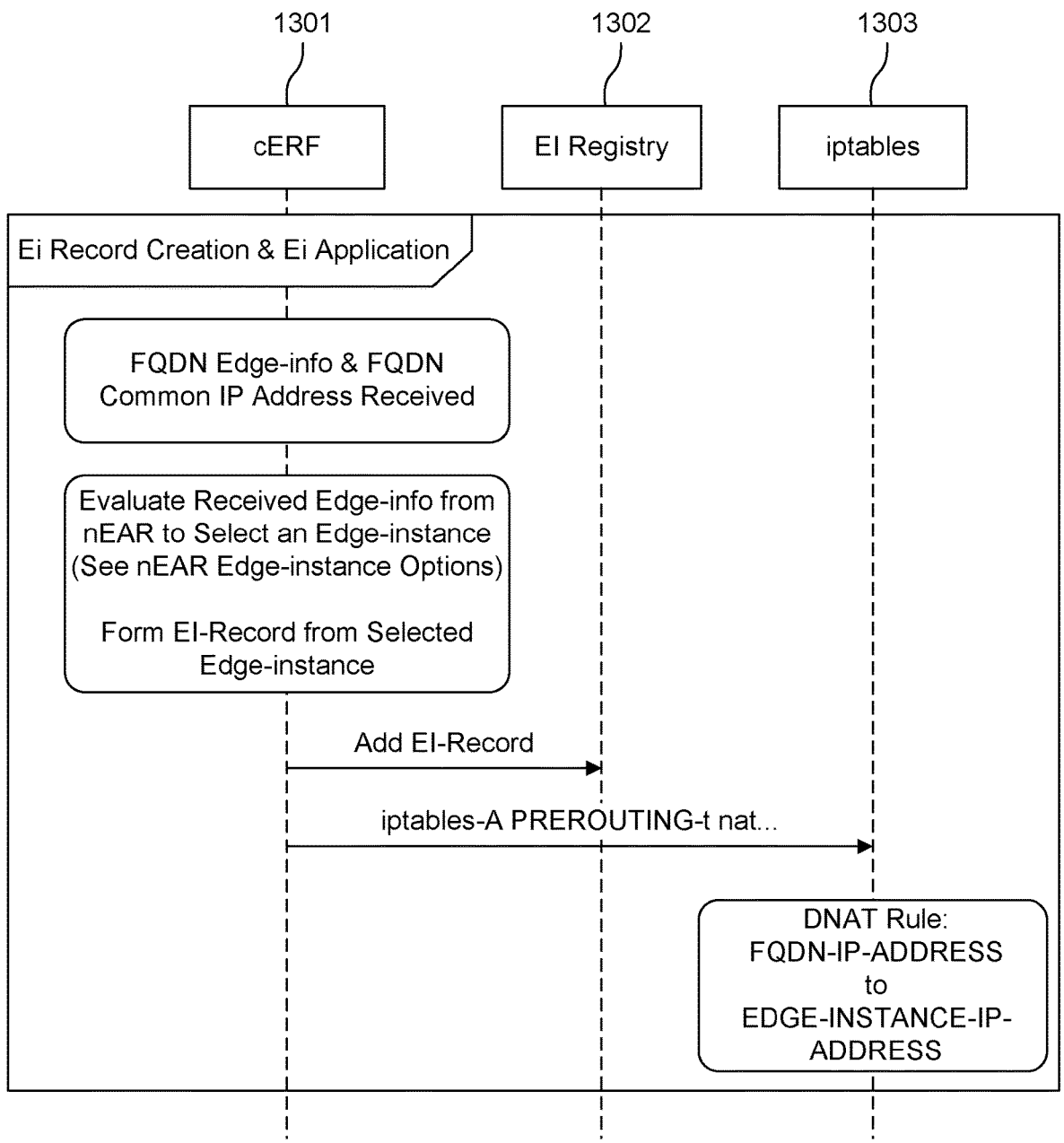
FIG. 13 is a diagram illustrating cERF EI rule application according to embodiments.

FIG. 13 is a diagram illustrating cERF EI rule application according to embodiments.

According to embodiments, a cERF rule application may occur after edge-info is received and FQDN common IP address is resolved. That is, the procedure shown in FIG. 13, may correspond to the bottom portion of FIG. 11. According to embodiments, a cERF 1301 may evaluate edge-info, for example, to select a valid edge-instance. According to embodiments, in a case of a single edge instance, the cERF 1301 may selects that singe edge instance. According to embodiments, in a case of a plurality of edge instances, the cERF may use the edge-instance options to select a (e.g., the most appropriate edge instance. According to embodiments, a cERF may form a (e.g., valid) EI record, for example, by combining the FQDN common IP address with the edge-instance information, and the cERF may add the EI record to an EI registry 1302. According to embodiments, (e.g., after updating an EI registry), a cERF may use the EI record, for example, to apply an iptables 1303 DNAT rule.

Edge Instance Access

Figure 14:
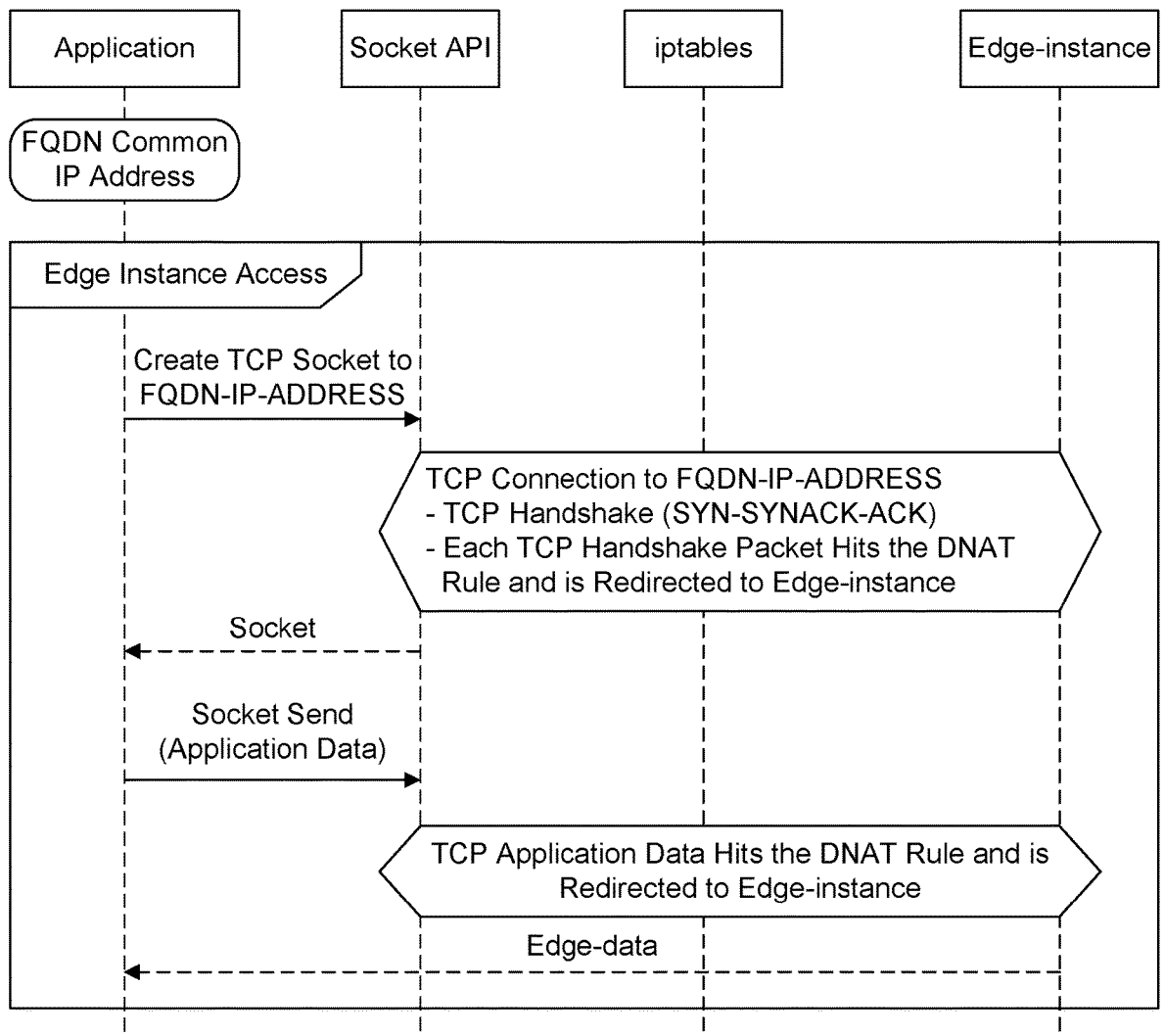
FIG. 14 is a diagram illustrating edge instance access, according to embodiments.

FIG. 14 is a diagram illustrating edge instance access, according to embodiments.

According to embodiments, an edge instance may be accessed (e.g., by an application executed on a WTRU) after a FQDN is resolved. According to embodiments, the edge instance access shown in FIG. 14 may occur (e.g., be started) if an FQDN common IP address is received (e.g., by an application), for example, after the last transaction of FIG. 11. According to embodiments, in a case of (e.g., there being) an FQDN-IP-ADDRES, the application may create a socket (e.g., via, using, etc., socket API) to communicate with the FQDN service. According to embodiments, a TCP socket creation may initiate a TCP connection handshake procedure (e.g., a TCP handshake). According to embodiments, a (e.g., each) packet of a TCP handshake may have a destination IP address FQDN-IP-ADDRESS which may trigger (e.g., satisfy, invoke, will hit, etc.) a DNAT rule (e.g., previously) set by the cERF. According to embodiments, an Iptables DNAT rule may redirect the packet towards the edge-instance and a connection may be established with an edge instance, for example, that is selected by the cERF. According to embodiments, further data exchanges between the application and the edge-instance will hit DNAT rule as well, for example, to achieve the same result.

Post Mobility Edge Resolution

According to embodiments, an EI record may be changed. For example, according to embodiments, in a case where a mobile client (e.g., a WTRU) moves in a network, an EI record that is already resolved may (e.g., need to) be changed. According to embodiments, a validity of an EI record (e.g., an EI record's validity) may include (e.g., cover) any of a portion of a network, an entire region, or any other type of area. According to embodiments, in a case where an EI record has a validity that includes an area, EI records may (e.g., still) be valid and may remain unchanged, for example, after a mobility event (e.g., in the area). However, even in such a case, according to embodiments, EI records may (e.g., need to) be (re-)evaluated on occurrence of mobility events. According to embodiments, a client (e.g., a mobile client, a WTRU, an application, etc.) may detect a mobility event and may update any of a EI registry and EI rules, for example, following a mobility event.

Mobility Event Detection

According to embodiments, a mobile client (e.g., a WTRU, an application) may perform (e.g., active) monitoring of a base station identifier (ID), for example, to detect a mobility event. According to embodiments, the base station ID may be an identifier that (e.g., uniquely) identifies a (e.g., each) base station included in (e.g., forming) a network, such as, for example, a 3GPP network cell ID (CID), or a WLAN network Basic Service Set ID (BSSID). According to embodiments, a mobile client connected to a network may retrieve a base station ID, and, for example, by monitoring (e.g., for) the base station ID using local APIs, the client may identify mobility events.

EI Registry and Rule Update

Figure 15:
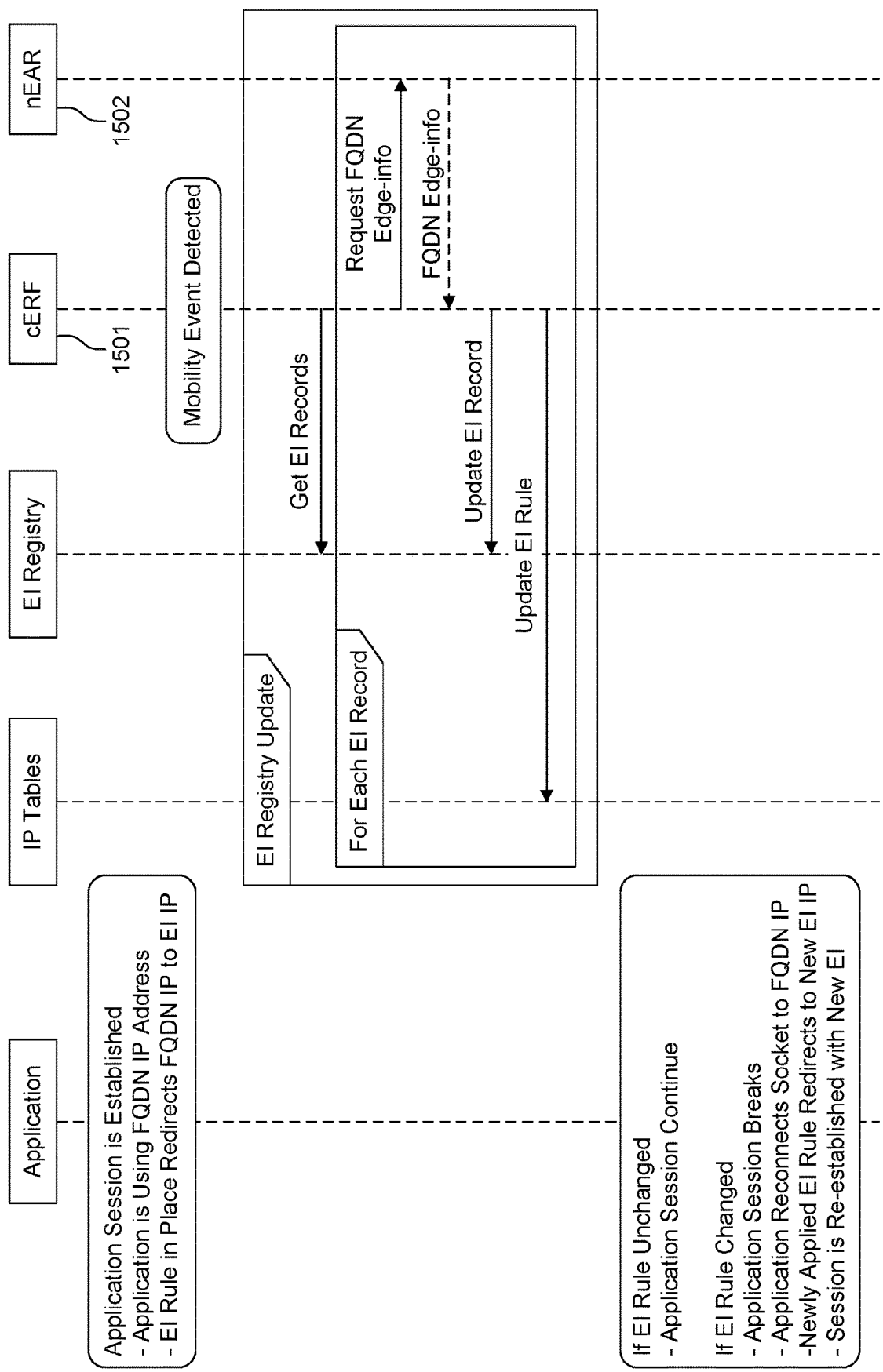
FIG. 15 is a diagram illustrating an EI registry update, according to embodiments.

FIG. 15 is a diagram illustrating an EI registry update, according to embodiments.

According to embodiments, a cERF 1501 may validate EI records present in an EI registry, for example, after a mobility event has been detected. According to embodiments, as illustrated in FIG. 15, EI registry rules may be updated after a mobility event is detected, and existing edge instance rules may be updated, for example, to reflect the new mobile device location. According to embodiments, there may be a case of an initial state (e.g. as shown in FIG. 15), wherein EI discovery may be complete. According to embodiments, in such a case, an application may have a session established and the session packets may be redirected to the EI IP address, for example, by the EI rule for that FQDN. According to embodiments, a cERF 1501 may detect a mobility event, and an EI registry update may begin, for example upon detecting the mobility event. According to embodiments, EI records may (e.g., must) be validated with a nEAR 1502, for example, to ensure the EI records' validity to the new PoA, for example, upon detecting the mobility event.

According to embodiments, a cERF may validate records, for example, by getting (e.g., receiving) the records from a local registry and querying the nEAR with the registry's FQDNs. According to embodiments, in a case where a cERF gets the FQDN edge information back, the cERF may determine and/or detect (e.g., if there is) a change and may update the EI registry and the corresponding EI rule. According to embodiments, in a case where the EI rule is unchanged, the application session may continue, and an (e.g., the application's, the WTRU's, etc.) active session may be uninterrupted. According to embodiments, in a case where the EI rule is changed, the application session may be broken. According to embodiments, in such a case, the application may (e.g., try to) reconnect using the original FQDN and hits the newly applied EI rule, for example, to (re-) direct packets to the new EI IP. According to embodiments, a session may be re-established with a new EI.

Network-side Edge Resolution Function (nERF)

According to embodiments, a nERF may be is used in an edge network having separation of a user plane features and control plane features, for example, an edge network associated with a 5GC network. According to embodiments, a nERF may (e.g., also) be used in (e.g., applied to) any type of edge network, such as, for example, any of 4G, WiFi, and $3^{rd}$ party edge networks, for example, in a case where such networks have capabilities similar to user/control plane traffic steering capabilities of 5GC networks. According to embodiments, use of a nERF may enhance resolution and routing capabilities of a mobile client device, for example, by supplementing the DNS and routing systems with any of a nERF located in a core (e.g., 5GC) network, an (e.g., radio) access network, and a nEAR (e.g., and/or any other similar/ suitable edge application resolver function). According to embodiments, a nERF may be located (e.g., instantiated, executed, included, deployed, performed, operated, etc.) in any of (e.g., radio, wireless, etc.) access network (AN) entities (e.g., RAN entities, a base station, a relay, etc.) and core network (CN) entities (e.g., 5GC entities), for example, referring to FIG. 4.

According to embodiments, a nERF may enable (e.g., provide, perform, etc.) dynamic edge-service instance selection for mobile devices. According to embodiments, for example, as a mobile device moves across the network, edge-service instance selection may (e.g., must) happen both at a session initiation time and at a session runtime (e.g., after a PDU session has been initiated). According to embodiments, nERF may reconcile (e.g., is responsible for reconciliating) a DNS global vision and the edge-localized view. According to embodiments, a nEAR may be an edge resolution enabler component, for example, that resides in an edge network. According to embodiments, a nEAR may include a query API, for example, for providing real-time information about a state of the edge network.

Figure 16A:
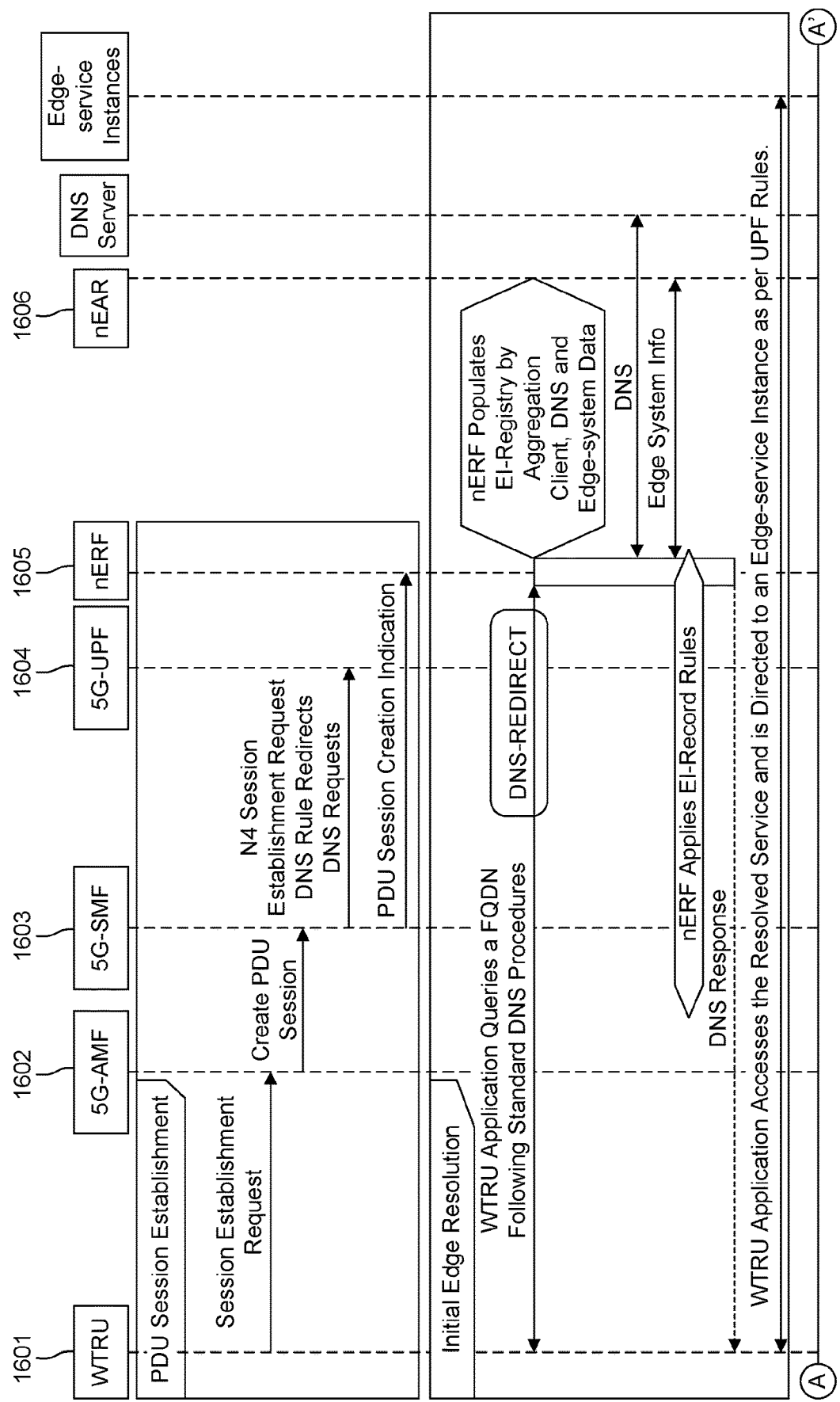
FIG. 16A and FIG. 16B are a diagram illustrating a high-level overview of nERF procedures, according to embodiments.
Figure 16B:
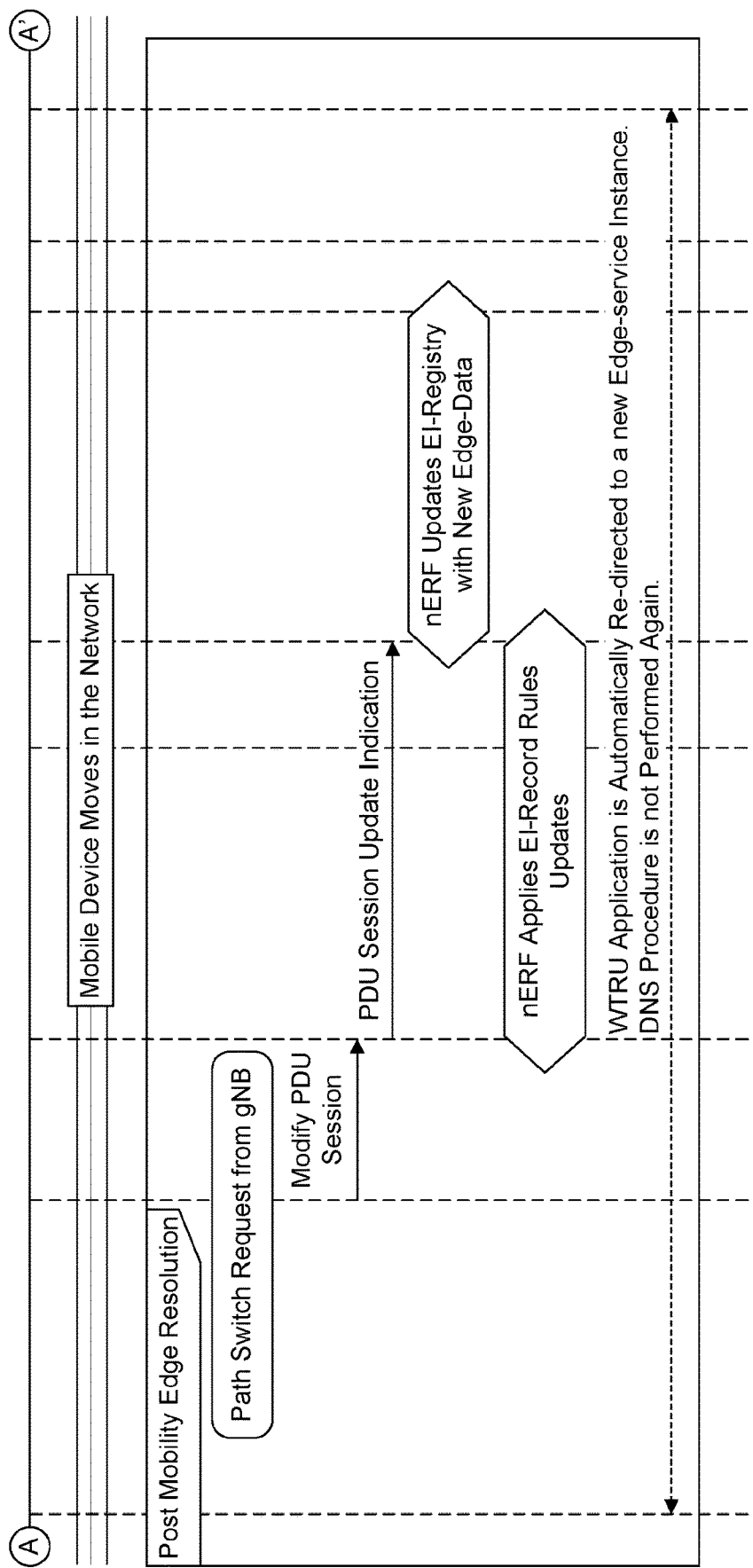

FIG. 16A and FIG. 16B are a diagram illustrating a high-level overview of nERF procedures, according to embodiments.

According to embodiments, a PDU session may be established, for example, as shown in FIG. 16A and FIG. 16B. According to embodiments, in a case of PDU session establishment, a WTRU 1601 may (e.g., initiate the PDU session establishment procedure) by sending (e.g., transmitting) a session establishment request. According to embodiments, session establishment may be performed (e.g., handled) by an AMF 1602, for example, by requesting a SMF 1603 to establish a PDU session. According to embodiments, an AMF may provide, for example, to a SMF in (e.g., using, via, etc.) a PDU Session Create Context Request (e.g., message), any of a WTRU location and access type. According to embodiments, such information (e.g., a WTRU location and/or access type) along with WTRU subscriber data may indicate (e.g., may be used by an SMF to determine) that a PDU Session establishment request is for an edge network. On the other hand, according to embodiments, a WTRU may provide (e.g., certain) identifiers and/or flags to indicate (e.g., help the SMF determine) whether a PDU Session Establishment is intended for an edge network. For example, a WTRU may provide a (e.g., specific) DNN, a slice differentiator (e.g., within a S-NSSAI) and/or a PDU Session ID, a part of an ID space (e.g., corresponding to any of a edge network or DNAI.

According to embodiments, a SMF 1603, for example, using the above discussed features, may (e.g., decide to) insert any of an uplink classifier or a branching point to divert traffic toward a EAS, for example, that is closer to a UPF supporting certain functions. According to embodiments, a SMF 1603, for example, using a PFCP, may configure a UPF 1604 with (e.g., new) Packet Detection Rules (PDR), for example, to divert a DNS request to a suitable nERF 1605. According to embodiments, a SMF may create rules for the PDU, for example, by using a PFCP protocol. According to embodiments, as part of the PDU rules, a specific rule may be created to forward DNS requests to a nERF 1605. According to embodiments, the SMF may (e.g., also) indicate a PDU session creation to a nERF, for example, by providing a WTR identifier such as, for example, a general public subscription identifier (GPSI) that may be used by a nERF to perform WTRU specific EAS instance selection.

According to embodiments, in a case of initial edge resolution, an application (e.g., running on a WTRU) may initiate a (e.g., standard, conventional, etc.) DNS query for a given FQDN. According to embodiments, a DNS forwarding UPF rule may be established at a PDU session establishment time, for example, to forward the DNS request to the nERF 1605, and the nERF may form an EI record by aggregating information from any of a mobile client, a DNS request/response, and a nEAR 1606. According to embodiments, a nERF may apply the EI record rule, for example, by requesting the SMF to apply edge-specific traffic forwarding rules in the UPF. That is, according to embodiments, a nERF may act as (e.g., be, operate as, etc.) an AF that influences WTRU application traffic by routing such to a specific DNAI. According to embodiments, in a case of applying the EI record rule, egress traffic sent towards FQDN IP may be redirected towards the edge-instance IP.

According to embodiments, in a case of post mobility edge resolution, such may be triggered (e.g., may start upon) a mobility event (e.g., of a client, a WTRU, an application, etc.) in a network. According to embodiments, an AMF may be informed by the destination gNB of a path switch request. According to embodiments, an AMF may have (e.g., instruct, command, require, etc.) the SMF to modify the existing PDU session, and/or, the AMF may (e.g., also) provide the SMF with information indicating a WTRU location, for example, through a Nsmf_PDUSession_UpdateSMContext message. According to embodiments, the SMF may notify the nERF about any of the PDU session update and a WTRU location change, for example, so that the nERF 1605 may update EI records by any of using the received information and querying the nEAR 1606. According to embodiments, the nERF may apply the updated rules, and, for example, as a result, egress traffic towards FQDN IP may be re-directed to the newly resolved edge instance, and a DNS procedure may not be performed again.

PDU Session Establishment

According to embodiments, a PDU session establishment may follow a procedure established by 3GPP. According to embodiments, in a case of a nERF, that is, in a nERF enabled deployment, as part of the PDU rules provisioning, the UPF may (e.g., be instructed to) apply a DNS packet detection and forwarding rule. According to embodiments, in such a case, a PDR information element (IE) of a rule may identify DNS requests, for example, by detecting any of (e.g., indicators): that is, in a nERF enabled deployment, a SMF may (e.g., must) perform (e.g., any of) two tasks: (1) apply DNS packet detection and forwarding rules in the UPF, for example, so that DNS requests are forwarded to the nERF; and (2) indicate a WTRU identity to the nERF. According to embodiments, a SMF may learn that edge support (e.g., nERF) may be used (e.g., is needed), for example, via a variety of different operations and/or mechanisms. For example, according to embodiments, as part of the PDU rules provisioning request Nsmf_PDUSession_CreateSMContext (e.g., as described by 3GPP 23.502, clause 4.3.2.2). According to embodiments, an edge service request may originate from a WTRU indicating any of a slice differentiator (SD) (e.g., in a S-NSSAI) or a (e.g., specific) DNN. According to embodiments, for example, in a case of assuming that a pool of PDU session IDs are reserved for edge computing, a SMF may learn (e.g., determine) that nERF support is needed, for example, by combining user subscription information with the PDU session ID indicated by the AMF. According to embodiments, for example, in a case where no information is provided by a WTRUE, a SMF may determine that nERF support is needed, for example, using default parameters of the user (e.g., WTRU) subscription.

According to embodiments, any of DNS packet detection and forwarding rules may be applied by a SMF (e.g., as described by 3GPP 23.502, clause 4.3.2.2, step 10a), and the any of DNS packet detection and forwarding rules may include any of the following elements: a DNS protocol, a destination IP address of a DNS server, and a destination port of the DNS server (e.g., 53). According to embodiments, a FAR information element of the rule may (e.g., instruct the UPF to) forward (FORW) packets and/or (e.g., alternatively) duplicate (DUPL) packets. According to embodiments, a FAR may include (e.g., contain) Forwarding Parameters, for example, including Redirect Information as defined by 3GPP, for example, to indicate a redirect server address corresponding to the nERF address.

According to embodiments, a WTRU identity, for example, a GPSI, may be provided to a nERF. According to embodiments, a GPSI may be used by the nERF, for example, to subscribe to WTRU events in order to learn (e.g., determine, receive information indicating) a PDU session status. According to embodiments, (e.g., information indicating and/or associated with) PDU session status may provide a WTRU user plane (UP) IP address, which may be (e.g., later) used to correlate DNS requests with a WTRU. According to embodiments, a WTRU identity may be used (e.g., needed) in (e.g., some, certain, etc.) edge application deployment types, for example, when a one-on-one relationship exists between a WTRU and an edge application instance or, for example, when an application access is limited to a group of WTRUs. According to embodiments, a nERF may receive (e.g., all) DNS requests issued (e.g., sent, transmitted, etc.) by a WTRU, and may tie (e.g., map, store, correlate, determine, associate, etc.) such requests to a (e.g., specific) WTRU. For example, as a result of any of: (1) applying any of the DNS packet detection and forwarding rules, and (2) being provided with WTRU identities, the nERF may receive all DNS requests sent from a WTRU.

Initial Edge Resolution

According to embodiments, a mobile client application may (e.g., want to) access a network service by resolving a FQDN of a service, for example, by performing a DNS query. According to embodiments, (e.g., in a typical case), a FQDN may be a known (e.g., a well-known) FQDN for the requested service. On the other hand, according to embodiments, for example, according to (e.g., depending on) implementation, an application may be able to select from a list of (e.g., location specific) FQDNs, for example, based on any of a TA code (e.g., TAI) or geo-coordinates. According to embodiments, (e.g., conventional, standard, etc.) DNS procedures, for example, as described above, may include a mobile client application, using a well-known software library/module, invoking a FQDN resolution function, and a call-flow ends up invoking the kernel APIs to trigger a query to the local DNS resolver. In a case of an initial resolution for the FQDN, a WTRU DNS cache may not contain an entry and a DNS request may be triggered towards the configured DNS server. According to embodiments, the destination portion of DNS request 5-tuple may have the characteristics: Destination IP: DNS server IP address; and Destination port: 53. According to embodiments, a nERF may (e.g., need to) intercept a DNS attempt, for example, to form a valid EI-Record for the FQDN.

DNS Interception and EI Rule Application

Figure 17:
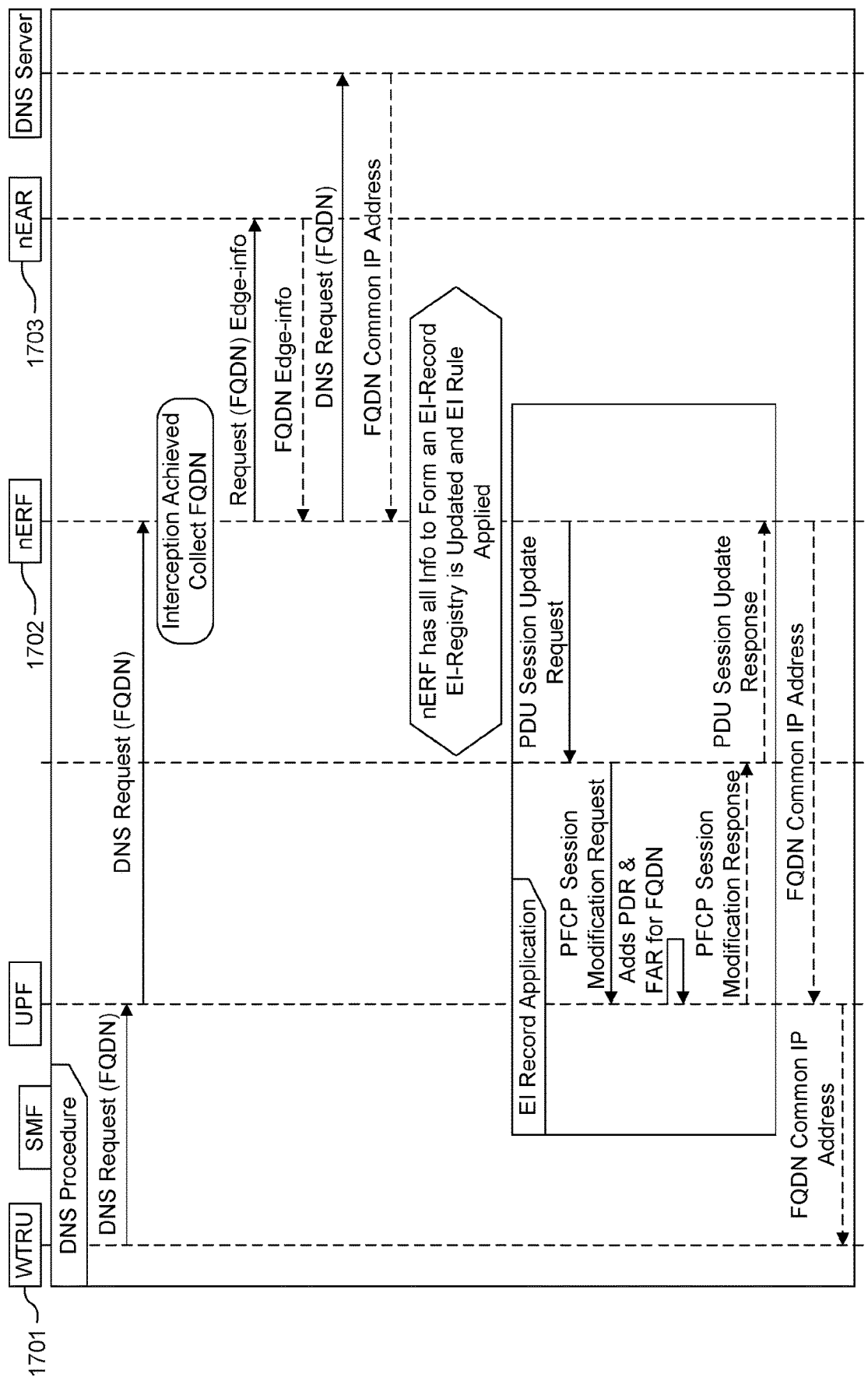
FIG. 17 is a diagram illustrating a nERF FQDN interception and a nEAR FQDN query, according to embodiments.

FIG. 17 is a diagram illustrating a nERF FQDN interception and a nEAR FQDN query, according to embodiments.

According to embodiments, DNS request interception may be (e.g., mostly) realized by (e.g., according to) the UPF forwarding rule applied at PDU session establishment. According to embodiments, a DNS request sent from a WTRU 1701 may be received (e.g., may reach) a UPF so as to be forwarded to a nERF 1702 by the provisioned DNS forwarding rule in the UPF, and in such a case, a nERF 1702 may terminates the original DNS request. According to embodiments, a nERF 1702, for example, acting as a proxy to a DNS server, may query a nEAR 1703 using the intercepted FQDN. According to embodiments, the query may be to gather edge-information associated with an (e.g., any number of) edge-instance(s) that a mobile client (e.g., WTRU) may use. According to embodiments, a nERF may (e.g., also be a) proxy (e.g. for) the original DNS request to the DNS server to resolve the FQDN common IP address. According to embodiments, a nERF may form a (e.g., valid) EI record, for example, after the DNS resolution is complete and the nERF collects information (e.g., needed, necessary, etc.) to form a (e.g., valid) EI record. According to embodiments, a (e.g., valid) EI record may have (e.g., need, require, etc.) information from any number of (e.g., different) sources, including, for example, a DNS request/response and a nEAR 1703. With respect to a DNS request/response, the information may be any of a FQDN and a FQDN IP address, and with respect to a nEAR, the information may be EI data, including any of IP and options information.

According to embodiments, a nERF may apply an EI rule, for example, by requesting a PDU session update from (e.g., sending a PDU session update request to) the SMF as shown in the EI record application procedure of FIG. 17. According to embodiments, a SMF, for example, in a case where the PDU session update request has been received, may instruct the UPF to insert an uplink classifier (UL-CL), for example, for (e.g., identifying) a (e.g., specific) flow. According to embodiments, a UL-CL may be configured with any of PDR and FAR rules according to any of: a PDR detects (e.g., all) packets with destination IP address obtained by the FQDN DNS resolution, and a FAR forwards detected packets towards the edge-instance IP address obtained in the edge information from a nEAR. According to embodiments, in a case where a UPF rule (e.g., upon/after a UPF rule) is in place, a nERF may provide (e.g., return, proxy back, etc.) the DNS response to the WTRU. According to embodiments, a WTRU may access the service using the provided common FQDN IP address and the UPF may redirect traffic towards the edge-instance, for example, after the nERF provides the DNS response to the WTRU.

According to embodiments, inserting (e.g., including/providing information indicating) a UL-CL may be done (e.g., is necessary) for any of a variety of reasons, such as, for example, any of the two following reasons. According to embodiments, inserting a UL-CL may provide an opportunity to influence WTRU traffic towards a new edge application instance, for example, after a mobility event. Such may be done (e.g., achieved) by modifying a FAR portion of a UL-CL. According to embodiments, inserting a UL-CL may prevent a WTRU from re-attempting DNS edge-application resolution, and for example, avoiding any DNS cache present in a path. According to embodiments, a UL-CL may (e.g., continues to) use an initially resolved edge application IP address, and, in such a case, a network may (e.g., takes care of) re-direct(ing) traffic towards an (e.g., appropriate) edge application instance.

Post-Mobility Edge Resolution

According to embodiments, an EI record may be changed. For example, in a case where a WTRU (e.g., a mobile client) moves in a network, an (e.g., resolved) EI record may need to be changed. According to embodiments, EI records validity may be for (e.g., correspond to, cover, etc.) any of a portion of a network, an entire region, or any suitable area, network(s) and/or locations. According to embodiments, in the case where the WTRU moves in the network, such that a mobility event occurs, the EI records may (e.g., still) be valid and may be (e.g., remain) unchanged after the mobility event. According to embodiments, EI records may (e.g., need to) be re-evaluated, for example, after a mobility event. That is, according to embodiments, for example, after a WTRU moves in a network, there may be any of detecting a mobility event and updating any of an EI registry and rules.

Figure 18:
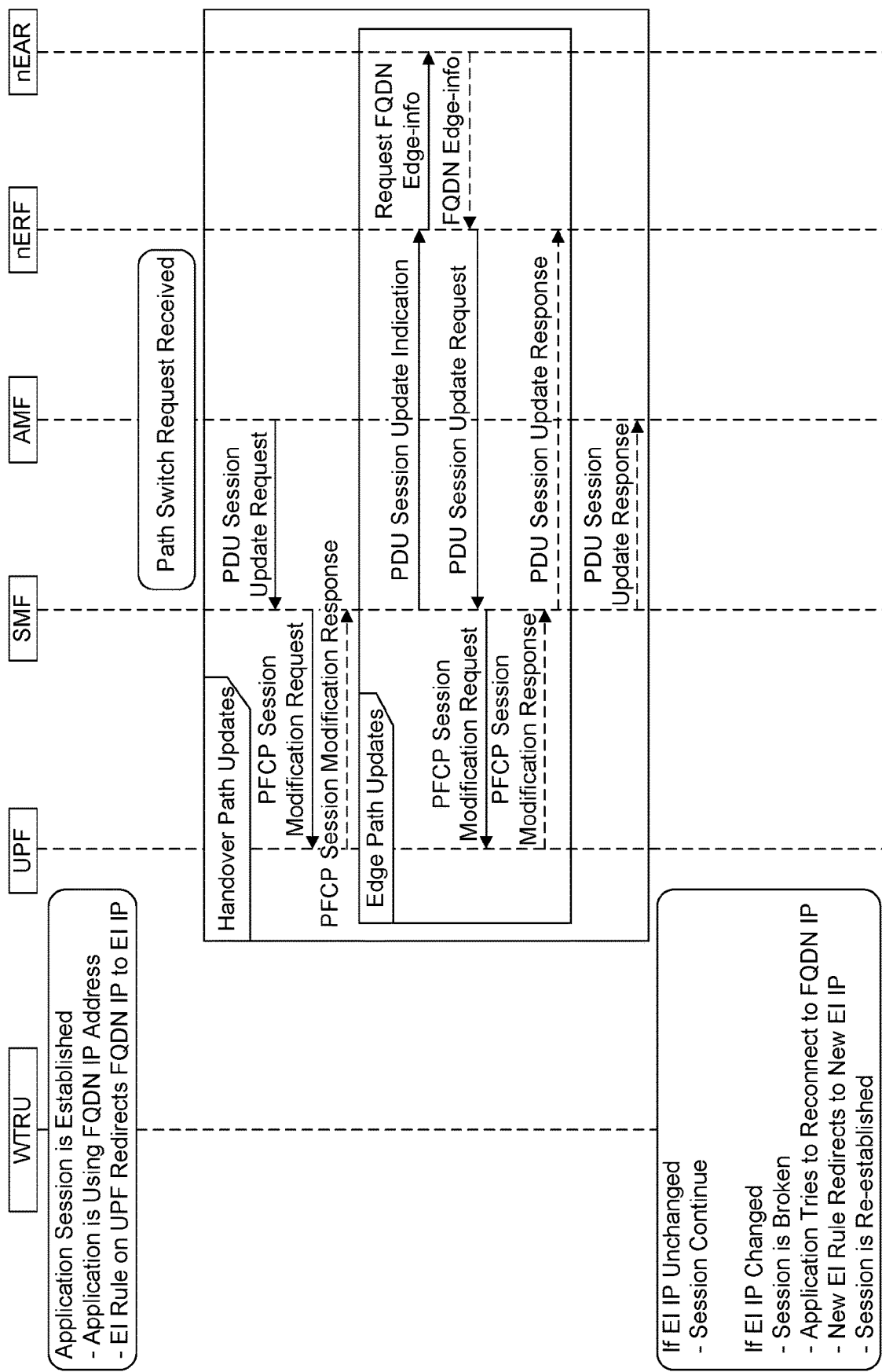
FIG. 18 is a diagram illustrating updating of a nERF EI registry and/or rules, according to embodiments.

FIG. 18 is a diagram illustrating updating of a nERF EI registry and/or rules, according to embodiments.

According to embodiments, an AMF may detect (e.g., achieve detection of) a mobility event, for example, from the network side. According to embodiments, an AMF may be informed that a handover is (e.g., has been) completed, for example, by receiving a Path Switch Request message from a target base station (e.g., gNB). Referring to FIG. 18, a procedure following a WTRU mobility event is shown. According to embodiments, a UPF rules update may happen, for example, following a WTRU handover, in two phases. According to embodiments, (e.g., as a first phase), a handover path may update to existing UPF rules to provide (e.g., perform, take care of, etc.) traffic routing changes to reach the new gNB. According to embodiments, (e.g., as a second phase), an edge path may update to existing UPF EI rules, for example, to reflect any edge instance changes. According to embodiments, as shown in FIG. 18, an edge path update group is shown inside the handover path update group, however, an edge path update may be a separated group happening independently before or after the handover path update.

According to embodiments, for example, to further assist nERF selection of a best edge application instance, a SMF may provide the nERF with WTRU location information, for example, as included in a Nsmf_PDUSession_UpdateSM-Context received from an AMF. According to embodiments, such information may be provided to the nERF via (e.g., using, included in, etc.) a PDU Session Update indication, for example, as shown in FIG. 18.

Network-side Edge Application Resolver (nEAR)

According to embodiments, a nEAR may be an edge resolution enabler function. According to embodiments, a nEAR may be a function of (e.g., provided by) a system that has knowledge of (e.g., information on) deployed edge instances. According to embodiments, a nEAR may be closely related to an edge orchestrator and (e.g., therefore) may be implemented as part of the edge orchestrator. However, embodiments are not limited thereto, and a nEAR may (e.g., also) be an independent function that collects information from the orchestrator. According to embodiments, a nEAR may collect information for (e.g., each) edge instances (e.g., present, instantiated, etc.) in an edge network. According to embodiments, a nEAR may collect, for example, for each edge instance, information associated with any of edge instance IP addresses, an edge-instance FQDN, edge instance clients, and edge instance options.

According to embodiments, in the case of edge-instance IP addresses, each instance may have a unique IP address, an IP address may be used to communicate with the edge instance. Further, in such a case, any of an edge system orchestrator and some other (e.g., alternative) edge platform manager component of the system may provide the IP address of the edge-instance. According to embodiments, in the case of an edge-instance FQDN, multiple instances may share the same FQDN, and an FQDN may be common to (e.g., all) edge instances that implement a service. In such a case, a FQDN that is common may be considered the same as a well-known FQDN queried by the mobile client application. According to embodiments, an edge application registry used by the edge orchestrator may have a FQDN defined as application meta-data (e.g., via pre-deployment). According to embodiments, for example as an alternative to pre-deployment, any of an edge system orchestrator or an edge platform manager component may provide this FQDN (e.g., at deployment time).

According to embodiments, in the case of edge-instance clients, such associated information may be related to (e.g., depend on) an edge application model, and may indicate any of a single mobile client, a group of mobile clients or all mobile clients. According to embodiments, an edge application registry may be used by the edge orchestrator and may have a client specifier as application meta-data. According to embodiments, for example as an alternative to the edge application registry, any of the edge system orchestrator or the edge platform manager component may provide this information. According to embodiments, a WTRU profile may (e.g., also) indicate if a WTRU is authorized to access an edge-instance. According to embodiments, as discussed above, an edge-instance may have (e.g., include) options, for example, to improve usability of the edge instance. According to embodiments, any of the following (e.g., edge instance) options may be supported: a time to live (TTL)—a duration for the edge instance; a geolocation—any of a geographic location where the edge-instance may be located or a geographic area from which a mobile client may access an edge-instance; a network location—network locations from which an edge-instance may be accessed; a latency—as measured from the edge-instance; a link speed—a capability at the edge-instance; a CPU/GPU load—CPU/GPU capabilities at the edge-instance; and a storage size—an amount of storage available at the edge-instance.

Edge Instance (EI) Registry and/or Records

FIG. 19 is a diagram illustrating an EI record, according to embodiments.

According to embodiments, any of a cERF and a nERF may (e.g., must) maintain an EI registry composed of multiple EI records. According to embodiments, EI records may aggregate (e.g., may be formed by aggregating) information from any of a mobile client, a DNS system/infrastructure, and an edge infrastructure. According to embodiments, a EI record may include the content (e.g., field names) shown in FIG. 19, including any of a client ID, a network ID, a FQDN, a FQDN IP, an EI data array, and an EI data object. According to embodiments, a client ID may be a unique client identifier that identifies the client on a corresponding network. According to embodiments, a client ID may be used for (e.g., when) interacting with a nEAR, and, for example, the nEAR may use the client ID to provide instance specific EI data.

According to embodiments, a network ID may be an identifier of the network for which the EI-Record is valid. According to embodiments, in multi-RAT devices, the network ID may be used to identify the network to which an EI rule applies. According to embodiments, a FQDN and a FQDN IP are respectively the common domain name of the service and its corresponding IP address, for example, as configured in a DNS server. According to embodiments, (e.g., all) IP addresses returned by the DNS query of a given FQDN may be used. According to embodiments, the FQDN IP address may be an anchor IP address that the mobile client application will use, and, for example, (e.g., all) packets that have this destination IP address (e.g., the FQDN IP address) may be re-directed towards the EI-IP address. According to embodiments, an EI data array may be a collection of EI data objects, for example, that (e.g., each) identify an edge instance that can be used, and for example, minimally an EI data array may contain one entry. According to embodiments, an EI data object may be an object that (e.g., minimally) contains an IP address of an (e.g., one) edge instance. According to embodiments, EI data may (e.g., also) be extended with optional information, for example, that may help define a scope of applicability and/or supplement the selection process.

FIG. 20 is a diagram illustrating Edge Instance (EI) data, according to embodiments.

According to embodiments, as shown in FIG. 20, an EI data object may include a plurality of elements (e.g., data). According to embodiments, EI data may (e.g., must) contain any of an (e.g., at least one) EI IP address and any number of optional fields, for example, that may assist the cERF in making an edge instance selection. According to embodiments, an EI IP address may be the IP address to use for (e.g., to reach) a specific EI instance. According to embodiments, for example, in response to a request for EI data from a nEAR, the nEAR may report a single or multiple EI instances. According to embodiments, in case of a single EI data object being indicated by the nEAR, that instance may (e.g., must, shall, etc.) be used to formulate an edge routing rule.

According to embodiments, in a case of a plurality of EI data objects being available for a given service, the optional fields present in the EI Data Object may be used to support the cERF/nERF EI selection. According to embodiments, the optional fields may include any of a TTL, a geolocation, a network location, a latency, a link speed, a CPU/GPU load, a storage size, and an EI port. According to embodiments, in a case of a TTL, the TTL may be used to specify the validity duration of an EI record. According to embodiments, for example, upon TTL expiry (e.g., the TTL is elapsed), the EI record rule may be removed, the EI record deleted, and the EI may not be reachable (e.g., anymore). According to embodiments, in a case of a geolocation, the geolocation may be used in a geolocation enabled system, for example, to indicate the geolocation of the EI to allow selection of the EI physically closest to the mobile client. According to embodiments, a geolocation may (e.g., also, alternatively, etc.) indicate an area from which a mobile client may access an EI. According to embodiments, in such a case, the indication of the area may be used for selecting an EI located in a mall/office (e.g., when a mobile client/WTRU is in physical vicinity to such) and/or may be used to limit an EI record to a physical region.

According to embodiments, a network location may be used to limit the validity of an EI to certain network locations. For example, an EI record may be valid only for a list of PoAs of a network. According to embodiments, a latency (e.g., measurement of latency) may be provided and used as a benchmark to select between multiple EI records. According to embodiments, a link speed may indicate the link speed capability at the EI, for example, so that an EI with better throughput characteristics may be selected. According to embodiments, a CPU/GPU load may indicate CPU/GPU capabilities of an EI, for example, to guide EI selection. According to embodiments, in a case of a storage size, such may indicate how much storage is available at the EI, for example, to guide EI selection. According to embodiments, an EI port may be (e.g., specify, indicate, etc.) a port number at which an EI listens (e.g., monitors, sniffs, intercepts, etc.) for incoming IP traffic.

According to embodiments, a cERF may use (e.g., utilize) information including any of a client ID and a network ID available on a WTRU (e.g., a mobile client). According to embodiments, a client ID may identify a client on a (e.g., corresponding) edge network, and may be any of an IMEI, a SUPI, an IP address, or any other similar and/or suitable client identifier. According to embodiments, for example, for mobile clients that may simultaneously be connected to multiple edge networks, a network may indicate (e.g., may be needed to know) which edge network the EI record is related. According to embodiments, a FQDN may be available at DNS request interception (e.g., see FIGS. 9 and 10). According to embodiments, an EI data array may be obtained from a nEAR (e.g., see FIG. 11). According to embodiments, a FQDN IP may be obtained from a DNS query (e.g., see FIG. 11).

According to embodiments, a nERF may use any of the following information: a client ID available from a SMF PDU session creation indication (e.g., see FIG. 16A and FIG. 16B); a FQDN available at DNS request interception (e.g., see FIG. 17); an EI data array obtained from a nEAR (e.g., see FIG. 17); and a FQDN IP obtained from a DNS query (e.g., see FIG. 17). According to embodiments, in a case of a nERF, a network ID may not be required, for example, in a case where resolution happens in the network, because multiple edge networks is not a (e.g., valid) use case for a nERF.

ERF Usage and Edge-Enabled Home Gateways

According to embodiments, an Edge Resolution Function (ERF) may reside on a network device. For example, as discussed above, a cERF may reside on a client device, such as a WTRU, and a nERF may reside on a network, for example, on a 5G network device such as a base station. According to embodiments, a network Edge Application Resolver (nEAR), for example, as discussed above, may provide information about available edge application instances and may help in resolving the appropriate edge application instance. According to embodiments, for example, as discussed above, any of a cERF and a nERF may rely on (e.g., use, communicate with, engage with, etc.) a nEAR.

According to embodiments, there may be a use case including an edge-enabled gateway, For example, there may be a use case in addition to and/or including the use cases discussed above, and the use case may include an edge-enabled gateway. According to embodiments, for example, in a case where 5G technology is used and/or deployed in a home environment, edge-computing, including an edge-enabled gateway, may be used in such a home environment. According to embodiments, for example, in the above described case of 5G technology in a home environment including an edge-enabled gateway, an in-home central processing unit (e.g. an edge node) may be used for (e.g., necessary for, applied to, enable, etc.) use cases such as mixed-reality interactive gaming, immersive tele-conferencing, or robotics use cases. According to embodiments, an edge node, for example, the in-home central processing unit, may be integrated into a (e.g., hyperconverged) node, such as a home gateway device providing any of processing, networking and, storage to other home devices.

According to embodiments, for example, in a case of an in-home edge environment, edge resolution problems, for example, as described above, may apply and may use (e.g., need, require) above described functions, which may be adapted to the in-home edge environment. According to embodiments, home gateway deployments may include any of (1) a home-gateway as a private domain; and (2) a home gateway as a compute extension of the MNO network. According to embodiments, in the case of a private domain, a private home gateway deployment model may relate to any of a homeowner or enterprise that acquires, configures and manages the equipment privately.

Figure 21:
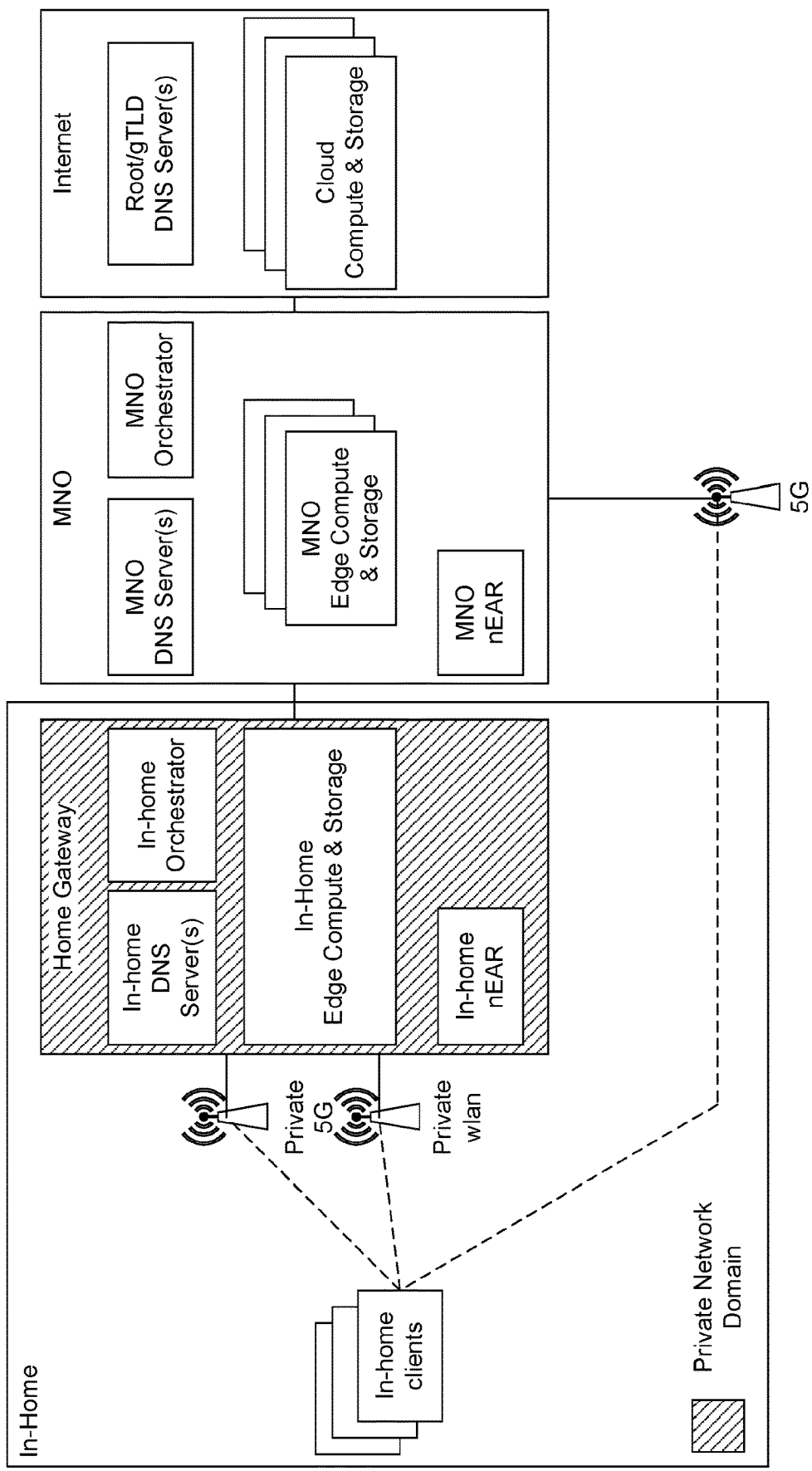
FIG. 21 is a diagram illustrating a private home gateway deployment model, according to embodiments.

FIG. 21 is a diagram illustrating a private home gateway deployment model, according to embodiments.

According to embodiments, there may be a case where a mobile network operator (MNO) network is used as a service, and the MNO network may offer edge computing capabilities, however, the MNO may not have visibility on edge computing happening in the private home gateway equipment. According to embodiments, in such a case, a private home-gateway may offer (e.g., various) wired and/or wireless connectivity options, while cellular connectivity is however provided by the MNO macro-network. According to embodiments, FIG. 21 illustrates such a private home-gateway.

Figure 25:
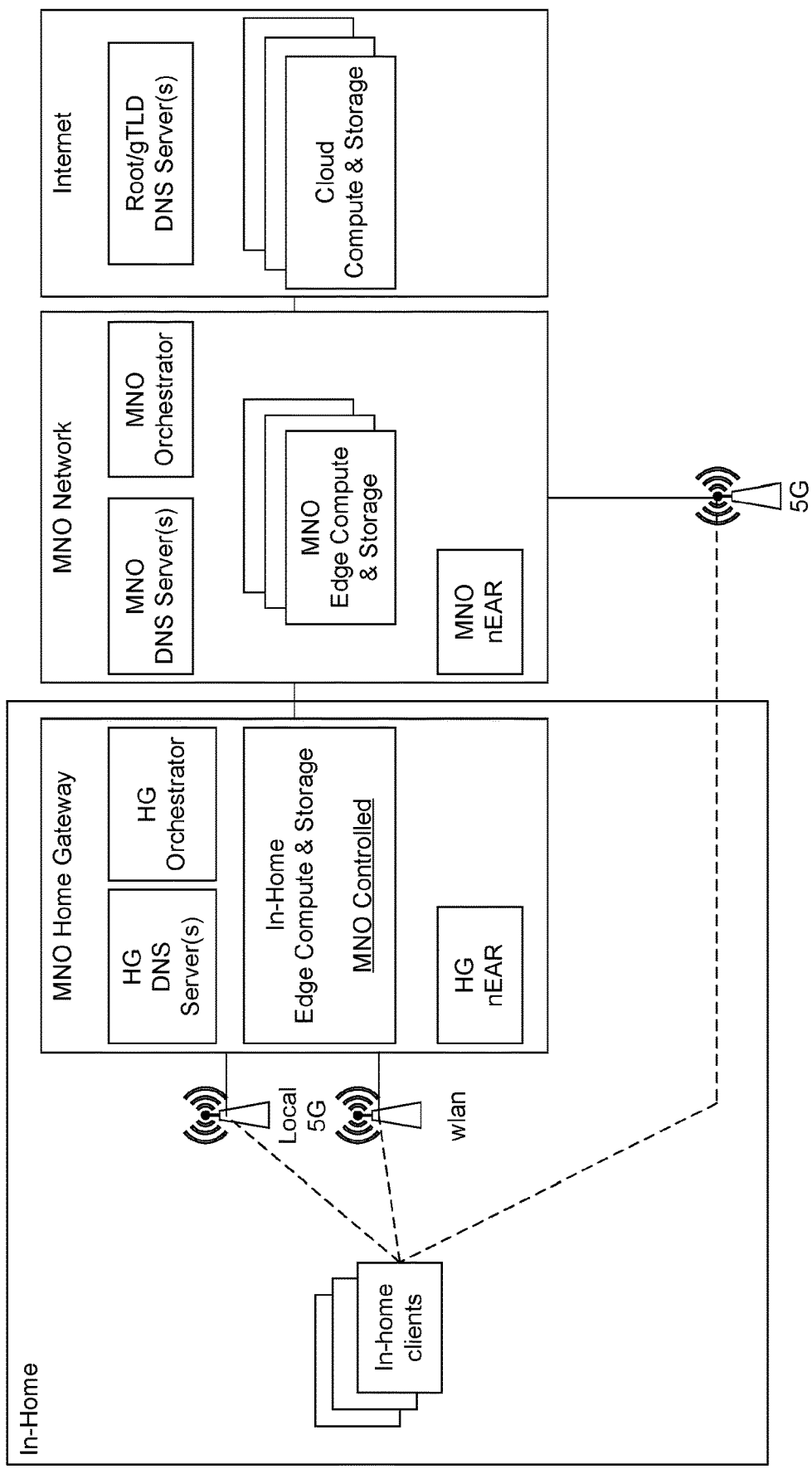
FIG. 25 is a diagram illustrating an MNO home gateway, according to embodiments.

According to embodiments, for example, in a case of a compute extension of the MNO network, a home gateway deployment model may relate to a MNO providing, configuring and managing the home gateway equipment. According to embodiments, a home gateway may be an extension of the MNO network (e.g., inside a home) and may offer edge computing capabilities. An MNO may have full visibility and control over edge computing happening inside the home. According to embodiments, a MNO home gateway may provide any of wired and wireless connectivity options; however, cellular connectivity may be provided by any of the home gateway or the MNO macro-network. According to embodiments, FIG. 25 illustrates such a compute extension of an MNO network.

Figure 22:
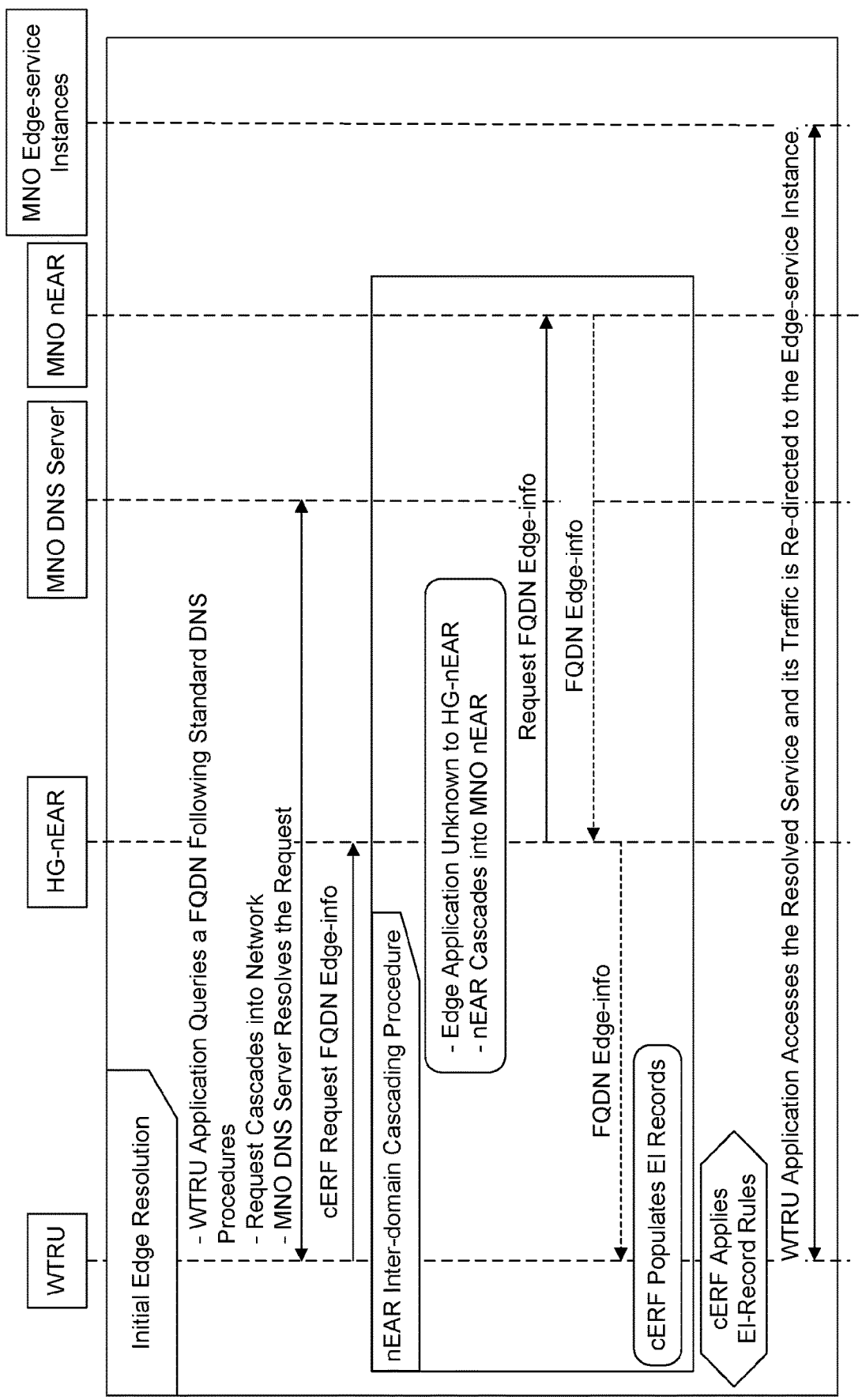
FIG. 22 is a diagram illustrating a nEAR request cascading procedure, according to embodiments.

According to embodiments, a home gateway may be a (e.g., home) private domain. For example, as shown in FIG. 22, a deployment may be for (e.g., representative of) a homeowner owning and managing the home-gateway. In such a case, the MNO domain may have limited and/or no visibility or control for any of: (1) edge applications executing in homeowner domain and (2) network connectivity inside the home. According to embodiments, resolving an edge application instance (e.g., running, executing, etc.) in a home private domain may use (e.g., rely on) DNS as described above. According to embodiments, a home gateway may use (e.g., require) any of (e.g., both) a DNS server and nEAR, for example, that have configuration knowledge of the home gateway private domain (e.g., see above). According to embodiments, the use cases discussed below may not be covered by solutions discussed above.

According to embodiments, a first use case for a home private domain may be an in-home device connected to an in-home connectivity point accessing (e.g., that needs to access) an edge application running on the MNO edge-compute using a cERF like approach. According to embodiments, a second use case for a home private domain may be an in-home device connected to an in-home connectivity point accessing (e.g., that needs to access) an edge application running in the in-home edge-compute using a nERF like approach. According to embodiments, a third use case for a home private domain may be an in-home device connected to an in-home connectivity point accessing (e.g., that needs to access) an edge application running on the MNO edge-compute using a nERF like approach. According to embodiments, other home private domain use cases, including various combinations of connectivity, edge-compute location, and client/network side ERF, have been considered; however, such use cases may be (e.g., already) covered by solutions discussed above.

FIG. 22 is a diagram illustrating a nEAR request cascading procedure, according to embodiments.

According to embodiments, for example, in the first use case noted above, an in-home device may be connected to an in-home connectivity point that needs to access an edge application running on the MNO edge-compute using a cERF like approach. According to embodiments, in such a use case, cERF processing may be (e.g., remain) the same as described above. In such a use case, a Home Gateway nEAR (HG-nEAR) may not (e.g., be able to) provide an edge application resolution, for example, since the target edge application runs and is managed in the MNO domain. According to embodiments, for example, in such a use case, a HG-nEAR may (e.g., need to) cascade incoming requests, for example, such as incoming requests that the HG-nEAR may not (e.g., cannot) resolve to the operator network. According to embodiments, in such a case, the HG-nEAR may forward a request to an MNO nEAR, for example, to attempt edge application resolution. According to embodiments, the embodiment of FIG. 21 may be considered as an update to that of FIG. 8. According to embodiments, an MNO nEAR may cascade requests towards other tiers of edge computing domains, for example, by adopting the same strategy as a HG-nEAR. According to embodiments, a FQDN edge-info request may be exchanged between a HG-nEAR and an MNO-nEAR, and may (e.g., also) be augmented by the HG-nEAR, for example, to include WTRU information allowing the MNO nEAR to respond directly to the cERF.

Figure 23A:
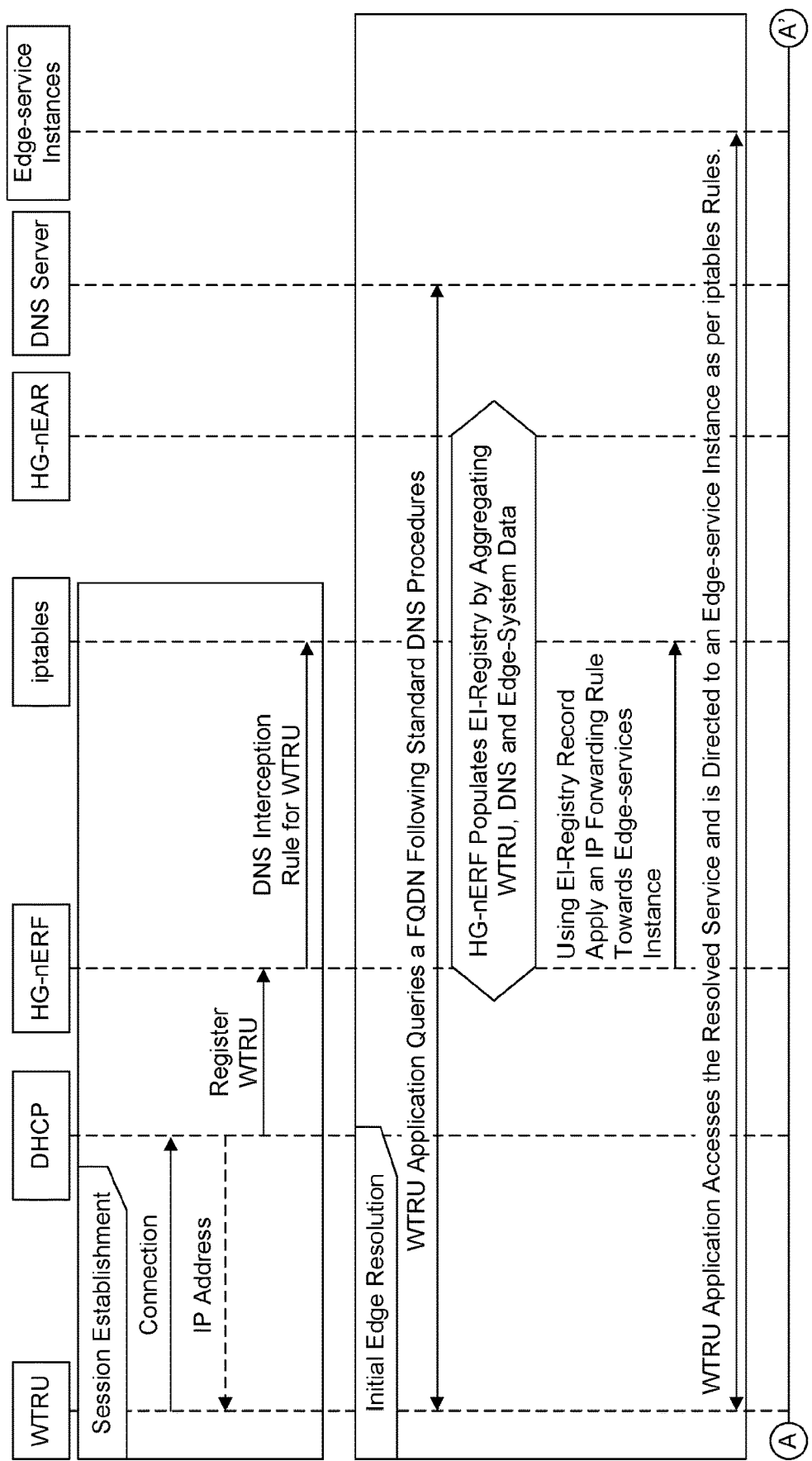
FIG. 23A and FIG. 23B are a diagram illustrating an HG-nERF approach, according to embodiments.
Figure 23B:
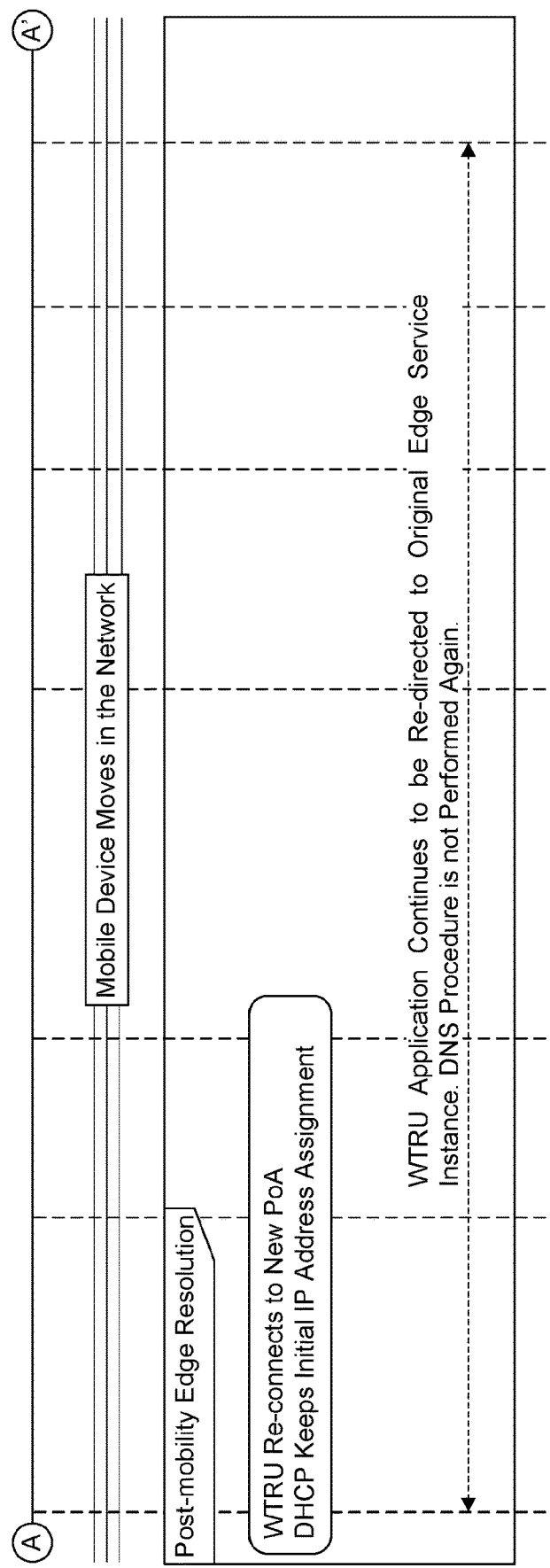

FIG. 23A and FIG. 23B are a diagram illustrating an HG-nERF approach, according to embodiments.

According to embodiments, for example, in the first use case noted above, an in-home device may be connected to an in-home connectivity point that needs to access an edge application running in the in-home edge-compute using a nERF like approach. According to embodiments, such a use case may be considered similar to a nERF use case described above, for example, in a case where a home gateway having internal capabilities similar to those of an MNO network (e.g. Session Management Function, User Plane Function, Access and Mobility Management Function). However, home gateways may not have the same capabilities or architecture as the MNO network.

According to embodiments, in the second use case, a home gateway resources (e.g., edge-compute, ERF, nEAR, etc.) may be co-located. In a case of co-located home gateway resources, a Home Gateway specific nERF function (HG-nERF) may be defined. According to embodiments, the HG-nERF may implement nERF like functionality, for example, differently than as discussed above. According to embodiments, the below discussed sequences for any of session establishment, initial edge resolution, and post-mobility edge resolution, may provide an outline to a HG-nERF approach, for example, as illustrated in FIG. 23A and FIG. 23B.

According to embodiments, in a case of session establishment, such session may start with a WTRU connecting to a home gateway point of connectivity. According to embodiments, for example, as part of a connection configuration sequence (e.g., procedure) a home gateway DHCP may assign a local network IP address to a WTRU. According to embodiments, a home gateway may use the (e.g., newly connected/assigned) IP address of the WTRU, for example, to register the (e.g., new) WTRU to a HG-nERF, and to creates a corresponding IP filtering rule to intercept the WTRU's DNS requests. According to embodiments, in a case of initial edge resolution, such may start with an initial edge resolution a WTRU application initiating a standard DNS query for a given FQDN. According to embodiments, a DNS interception rule may forward a DNS request to the HG-nERF, for example, which forms an EI-Record by aggregating information from any of the wireless client, the DNS request/response, and the HG-nEAR. According to embodiments, a HG-nERF may apply a EI-Record rule (e.g., an IP filtering rule) to redirect edge WTRU traffic. According to embodiments (e.g., as a result of the EI-Record rule, egress traffic coming from a WTRU IP address sent towards a FQDN IP may be redirected towards the edge-instance IP.

According to embodiments, in a case of post-mobility edge resolution, such may start with a client mobility event in an in-home network, and, for example, at WTRU may retain a same IP address. According to embodiments, for example, due to such IP address retention by the WTRU, a HG-nERF may (e.g., does) not need to do anything and IP filtering rules may (e.g., do) not need to be updated. According to embodiments, for example, in such a case of IP address retention, egress traffic towards a FQDN IP may continue to be re-directed to an initial edge-instance, and for example, a DNS procedure may not be performed again. According to embodiments, in a case of support for multiple instances of a same application running in the home gateway, a HG-nEAR functionality may (e.g., does) not differ from nEAR functionality (e.g., see above). According to embodiments, an HG-nEAR may use the HG-Orchestrator knowledge of existing edge-applications, for example, by using a WTRU (e.g., unique) identifier (e.g., a WTRU name, a MAC address, an IP address, etc.) to resolve to a correct edge application instance.

According to embodiments, there may be a case where more than one WTRU (e.g., two WTRUs) are included (e.g., participate) in a game, such as an edge-game. In such a case, according to embodiments, an HG-Orchestrator may be informed that a first WTRU wants to play an edge-game, and the HG-Orchestrator may instantiate edge-game-instance #1. According to embodiments, the HG-Orchestrator may keep information indication (e.g., store in its registry) that edge-game-instance #1 is for the first WTRU. According to embodiments, the first WTRU may send a DNS request to discover edge-game-instance #1, and a DNS may provide back a generic-edge-game IP, which may be a fixed IP address corresponding to (e.g., that acts as an umbrella for) all real edge-game instances. According to embodiments, the above described procedures and/or operations may be used to resolve edge-game-instance IP address.

In further detail, according to embodiments, an HG-nEAR may use information from an HG-Orchestrator to know that edge-game instance #1 has been allocated to WTRU, and the HG-nEAR may return the edge-game-instance #1 IP address to HG-nERF. According to embodiments, the HG-nERF may apply a rule to redirect packets coming from the first WTRU towards the generic-edge-game IP to the edge-game-instance #1 IP address. According to embodiments, in a case where (e.g., when) a second WTRU wants to play the same game, the above procedure may be executed with the difference that the HG-Orchestrator has associated a new edge-game-instance #2 with the second WTRU. According to embodiments, a resulting rule may be applied by the HG-nERF in order to redirect packets coming from the second WTRU towards the generic-edge-game IP to the edge-game-instance #2 IP address.

Figure 24:
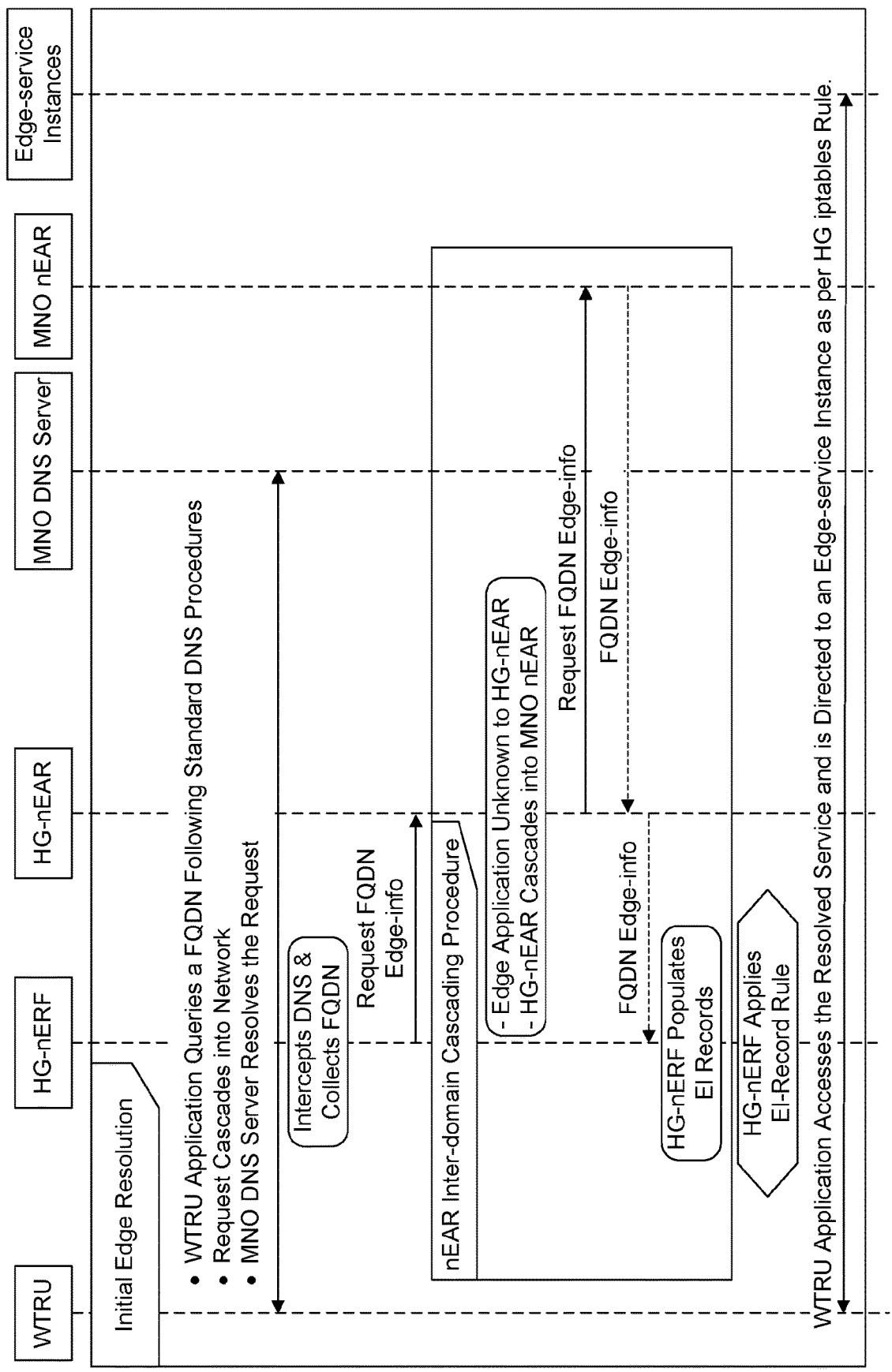
FIG. 24 is a diagram illustrating HG-nERF cascading procedure, according to embodiments.

FIG. 24 is a diagram illustrating HG-nERF cascading procedure, according to embodiments.

According to embodiments, in the third use case described above (e.g., for a home private domain), an in-home device may be connected to an in-home connectivity point that needs to access an edge application running on the MNO edge-compute using a nERF like approach. According to embodiments, this use case may illustrate how to combine a nEAR request cascading feature (e.g., the first use case described above) and a HG-nERF ((e.g., the second use case described above) may be combined to allow this third use case. According to embodiments, FIG. 24 illustrates an HG-nEAR cascading procedure as part of initial edge resolution using the HG-nERF approach.

FIG. 25 is a diagram illustrating an MNO home gateway, according to embodiments.

According to embodiments, a home gateway may be (e.g., may serve as, may be instantiated as, etc.) a compute extension of the MNO network. Referring to FIG. 25, an MNO home-gateway as a compute extension of the MNO network is shown, wherein the MNO home-gateway may contain its own DNS server, orchestrator, and nEAR function. According to embodiments, however, such elements included in the MNO home-gateway may be optional and may represent extensions of the MNO DNS server, orchestrator and nEAR. According to embodiments, in such a case, it may be assumed that MNO instances (e.g., for the DNS server, orchestrator, nEAR function, etc.) may be used. According to embodiments, in a case of using a cERF in a home environment, the procedures described above may be sufficient because a home gateway may be (e.g., considered as) another tier of MNO edge computing, for example, that is managed by the MNO infrastructure. According to embodiments, in the case of using a nERF in a home environment: (1) mechanisms described above may be sufficient when the client is connected to a 5G macro network point of connection, and (2) the second use case may be sufficient when the client (e.g., the WTRU) is connected to an in-home (e.g., 5G, WLAN, etc.) point of connection.

Application of nEAR in ETSI MEC

According to embodiments, ETSI MEC reference architecture, for example, as described above, may allow applications to create and update DNS rules in the MEC Platform, and, for example, MEC applications may use a Mp1 interface to update DNS rules. According to embodiments, a MEC platform may rely on DNS mechanisms to resolve and direct application traffic. According to embodiments, a DNS mechanism may work if a single instance of the MEC application is running on the platform. However, DNS mechanisms may not be optimal, for example, when multiple instances of a same MEC Application is instantiated and running. That is, because of problems with DNS, a MEC platform may not handle WTRU mobility and/or application mobility optimally.

A nEAR has been introduced in a context of a 5G network. According to embodiments, (e.g., use of) a nEAR may solve problems in an ETSI MEC platform environment. According to embodiments, a nEAR may: (1) direct traffic to a correct instance, for example, from among a plurality of instances of a MEC application; and (2) (e.g., optimally) hande WTRU mobility, for example, when a WTRU changes a point of attachment and switches traffic towards a new MEC Host. According to embodiments, a nEAR function may be part of a MEC Platform. According to embodiments, a nEAR function may (e.g., be used to) resolve an edge-instance, for example, based on DNS requests coming from a WTRU.

Figure 26:
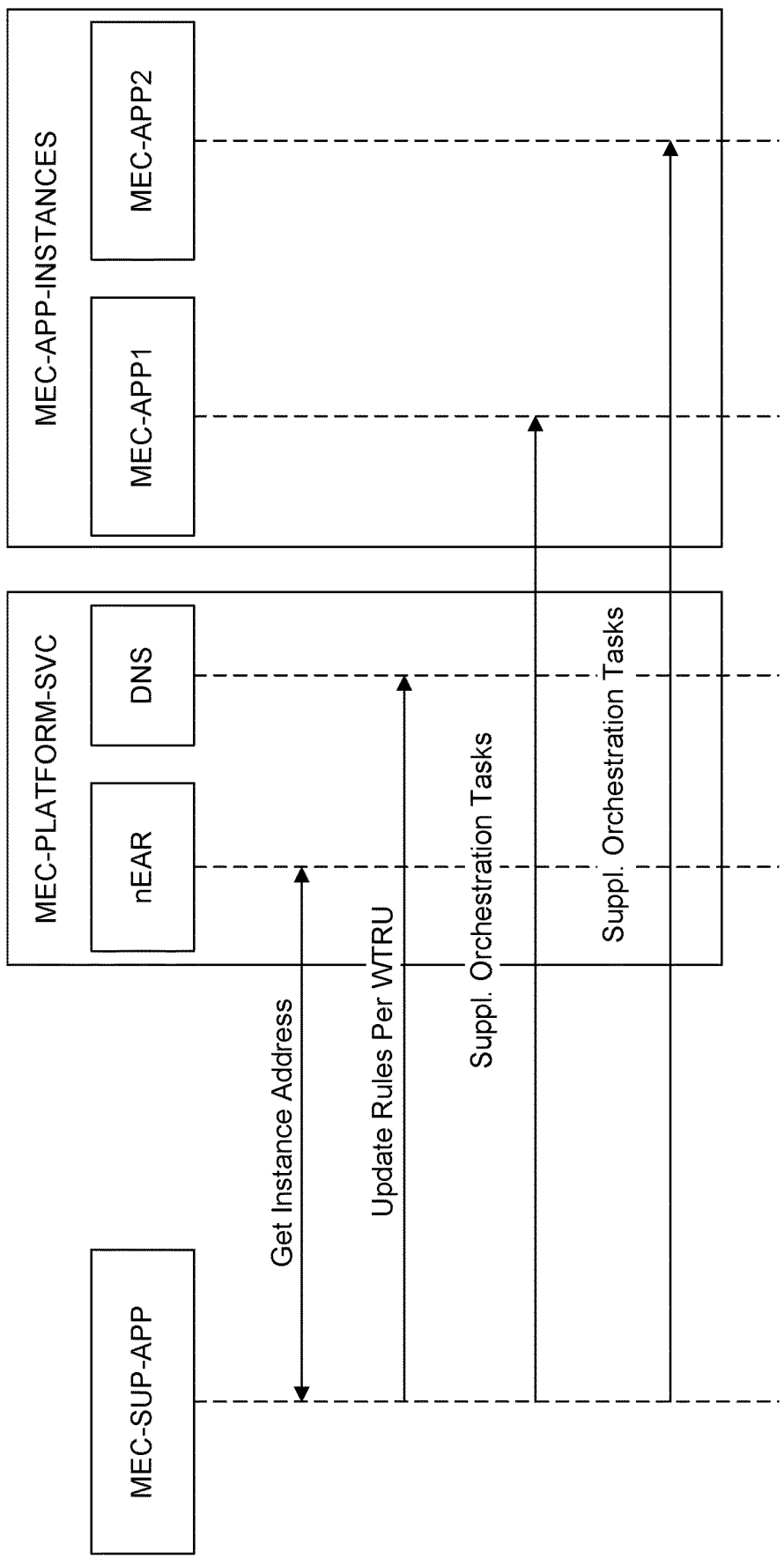
FIG. 26 is a diagram illustrating use of a nEAR by MEC applications, according to embodiments.

FIG. 26 is a diagram illustrating use of a nEAR by MEC applications, according to embodiments.

According to embodiments, there may be a case where a nEAR may be used by MEC applications, for example, to supplement orchestration on the MEC Host and influence WTRU traffic routing. The method is described below. According to embodiments, in such a case, more than one instances of a MEC Application (MEC-APP1, MEC-APP2, etc.) may be instantiated in a MEC host or multiple MEC hosts in a given location, and a nEAR may be deployed as part of MEC platform services. According to embodiments, a nEAR may maintain a mapping of a (e.g., updated) list of edge application instances to IP address. According to embodiments, an application provider may deploy a helper (e.g., support) application, such as a MEC_SUP application, to support MEC application instances. According to embodiments, MEC_SUP may send a query (e.g., get instance address) to a nEAR, for example, over MP1, to obtain a list of MEC_APP instance and/or IP addresses running on the MEC Host. According to embodiments, a MEC_SUP may use MP1 to update a MEC Host DNS rules table for each WTRU and/or a group of WTRUs (e.g., (UE1, ip_address_1), (UE2, ip_address_2). According to embodiments, a MEC_SUP may perform supplemental orchestration support tasks using the instance address. According to embodiments, an Application Mobility Service in ETSI MEC may query a nEAR, for example, to obtain the instance address of a MEC APP in the target area where the WTRU may move. According to embodiments, using that instance as a target host, the Application Mobility Service may start mobility preparation steps.

Edge Resolution Function for DNS Steering

According to embodiments, (e.g., as discussed above), an edge resolution function may be used to steer user traffic, for example, towards an edge application. According to embodiments, an edge resolution function (e.g., any of a nERF and a cERF), may rely on an Edge Application Resolver function (e.g., as discussed above), for example, to determine an appropriate edge instance based on any of a user location or other performance criteria. According to embodiments, a combination of ERF and nEAR may be used to perform initial edge application discovery as well as perform actions (e.g., operations, features, cover, etc.) for post mobility needs.

According to embodiments, (e.g., as discussed herein) DNS request steering may be done (e.g., demonstrated) using any of ERF and/or nEAR functions. According to embodiments, initial DNS request steering may be used (e.g., needed) when DNS knowledge is distributed in (e.g., at, throughout, etc.) edge sites, for example, instead of being centralized. According to embodiments, ETSI-MEC architecture (e.g., as discussed above) may be (e.g., represent) a distributed network architecture, for example, where each MEC Host contains a local DNS server providing DNS records for edge applications present on a edge host. According to embodiments (e.g., as discussed herein), in a distributed edge DNS server scheme, a DNS server may be (e.g., become) equivalent to an edge application (e.g., as discussed herein regarding any of a cERF, a nERF, and a nEAR) may be used to resolve a edge DNS server, for example, that is used.

cERF for DNS Steering

Figure 27:
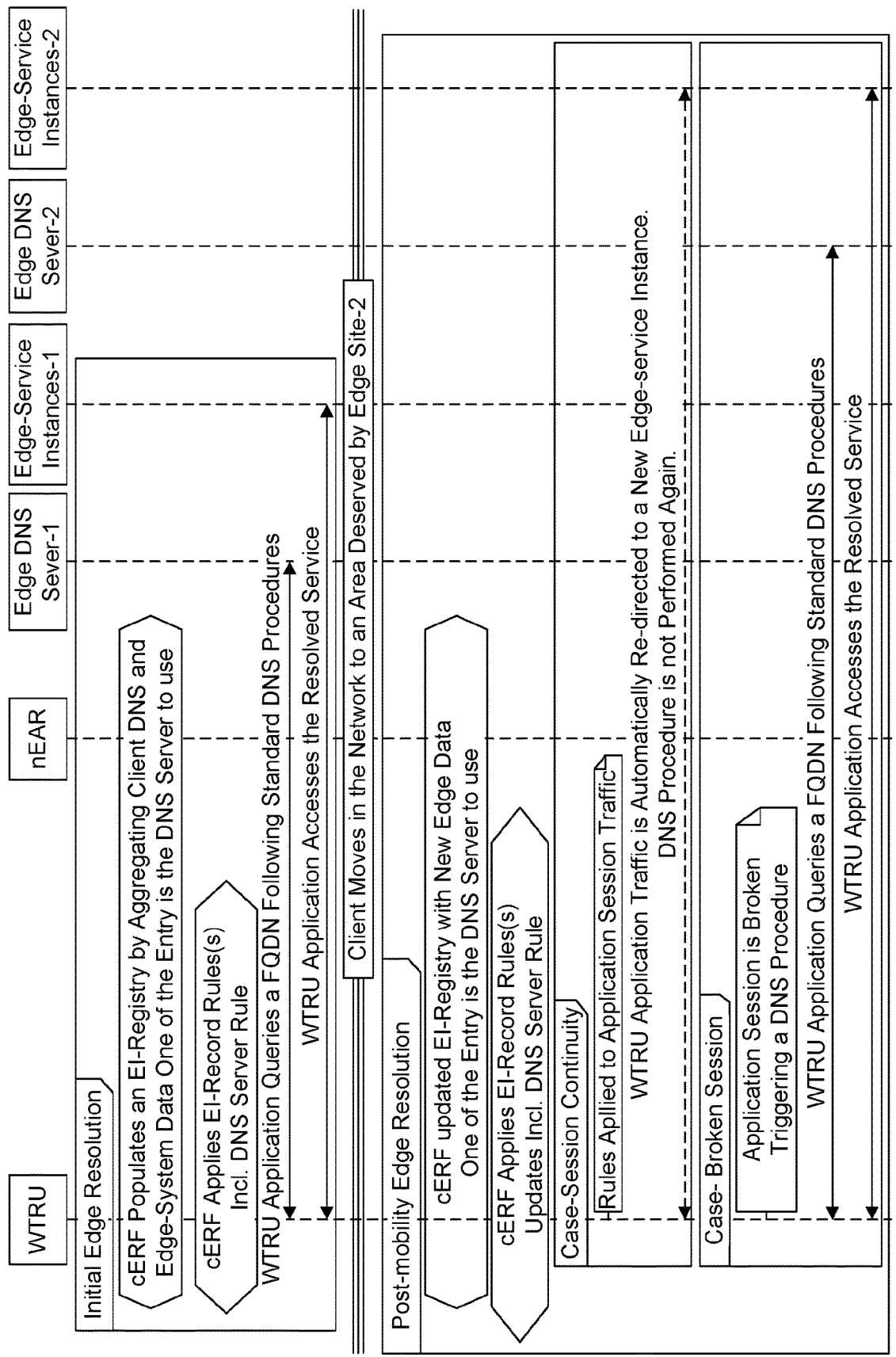
FIG. 27 is a diagram illustrating a high-level overview of cERF for DNS steering procedures for (1) initial edge resolution and (2) post mobility resolution, according to embodiments.

FIG. 27 is a diagram illustrating a high-level overview of cERF for DNS steering procedures for (1) initial edge resolution and (2) post mobility resolution, according to embodiments.

According to embodiments, a procedure for initial edge resolution may be (e.g., remains the same) as discussed above, and initial transaction with a nEAR may be performed earlier (e.g., than as discussed above), for example, to provision a (e.g., proper) edge DNS server before a first DNS request is issued (e.g., sent) by a WTRU. According to embodiments, a procedure for post-mobility edge resolution may be (e.g., remains the same) as discussed above, and a broken session use case is discussed hereinbelow, for example, to discuss and describe transactions following broken sessions caused by mobility.

According to embodiments, in a case of initial edge resolution, such may start with a WTRU getting data connectivity, and a cERF may query a nEAR, for example, to obtain an IP address of a DNS server serving the WTRU. According to embodiments, a cERF may (e.g., then) apply an EI-record rule, for example, for the DNS server and/or a cERF may update the DNS server entry in the system. According to embodiments, a WTRU application may initiate a (e.g., standard) DNS query for a (e.g., given) FQDN. According to embodiments, (e.g., as a result of the WTRU application initiating a standard DNS query) the WTRU application may receive FQDN resolution from a localized edge DNS server.

According to embodiments, in a case of post-mobility edge resolution, such may start with a client mobility event, for example, in a network. According to embodiments, a cERF may detect a mobility event and may update EI-records, for example, including those associated with the DNS server, by querying the nEAR. According to embodiments, a cERF may apply updated rules. According to embodiments, rules may be applied to application session traffic, for example, such that user traffic is re-directed, for example, to provide session continuity. According to embodiments, application sessions may be broken, and in such a case, the application may trigger a DNS resolution sequence, which may be fulfilled by a new DNS server.

According to embodiments, any of cERF and nEAR functions may be (e.g., remain the same) as discussed above, and, in a case of distributing DNS servers at the edge, such may be equivalent to an edge application and may be resolved using (e.g., same) mechanisms discussed herein. In such a case, functionality provided by (e.g., a pair of) a cERF and a nEAR may be that of (e.g., similar to, acting as, etc.) a DNS server resolver. According to embodiments, for example, at an implementation level, in a case where a DNS server configuration affects (e.g., plays a special role on) a WTRU, a cERF may (e.g., it may be beneficial to) update a DNS server IP address directly in the system, for example, rather than applying an EI-record rule. According to embodiments, it may (e.g., also) be beneficial that cERF invalidates cached DNS entries, for example, upon a DNS server change. According to embodiments, both solutions discussed above may be considered equivalent, for example, because they rely on the same concepts and yield the same results.

nERF for DNS Steering

Figure 28A:
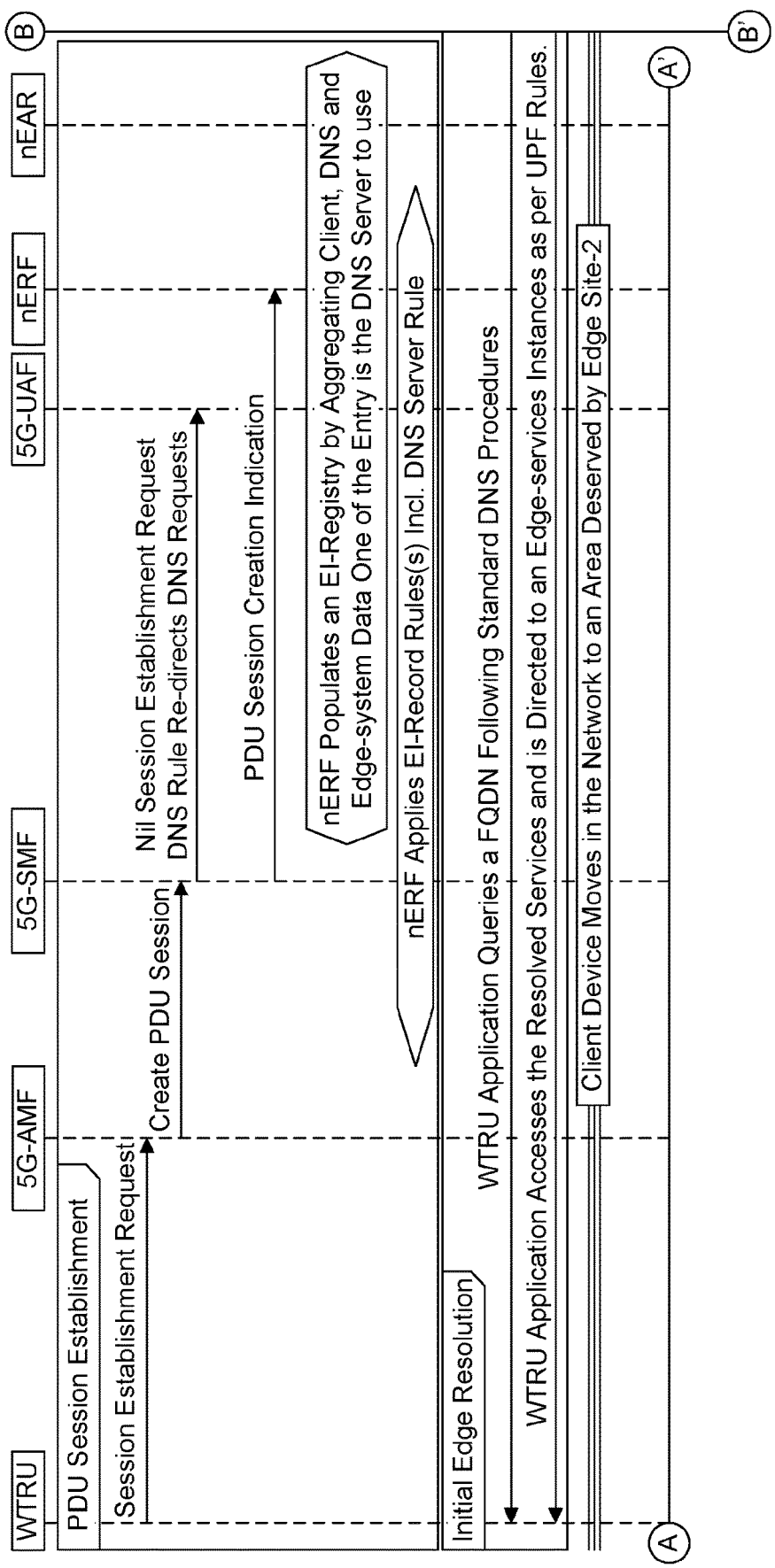
FIG. 28A, FIG. 28B, and FIG. 28C are a diagram illustrating a high-level overview of nERF for DNS steering procedures for (1) PDU session establishment, (2) initial edge resolution and (3) post mobility resolution, according to embodiments.
Figure 28B:
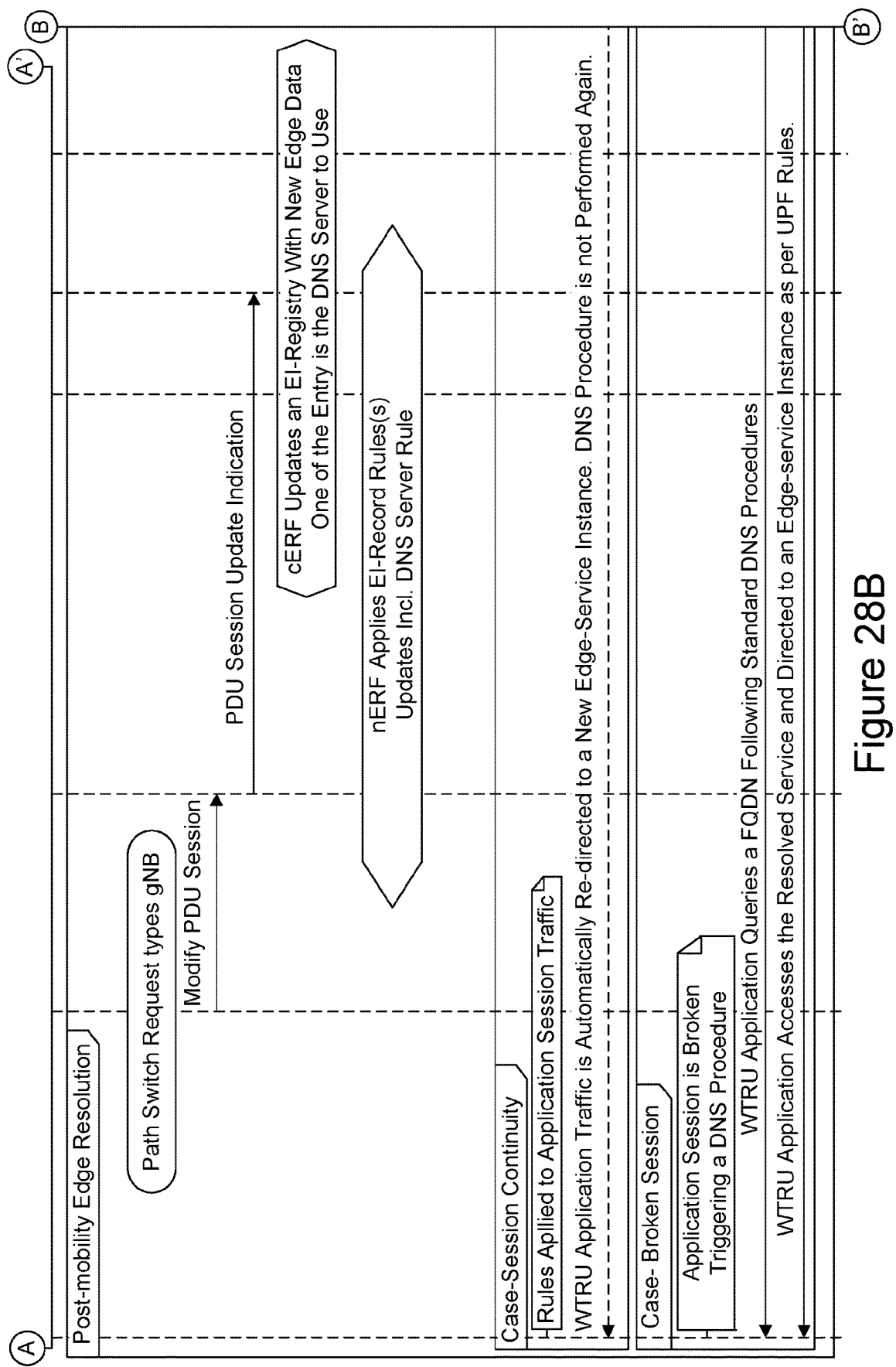
Figure 28C:
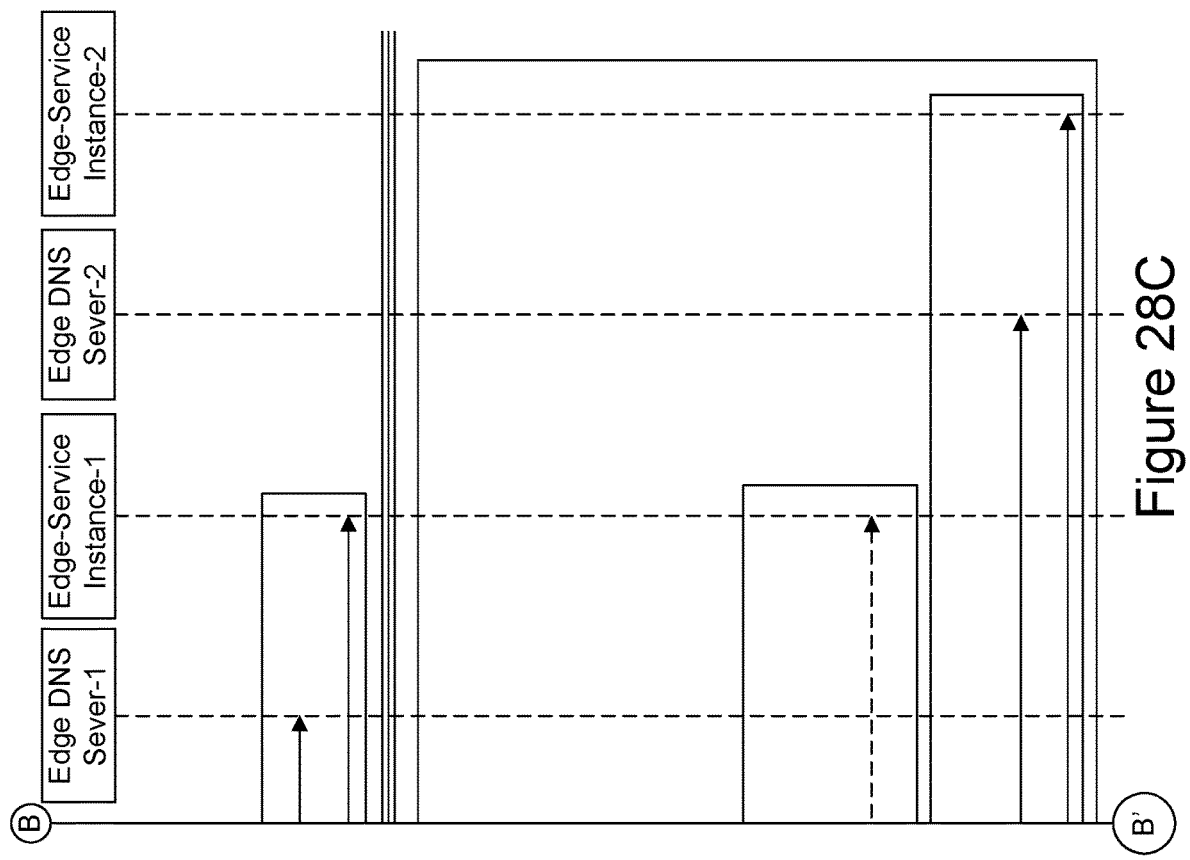

FIG. 28A, FIG. 28B, and FIG. 28C are a diagram illustrating a high-level overview of nERF for DNS steering procedures for (1) PDU session establishment, (2) initial edge resolution and (3) post mobility resolution, according to embodiments.

According to embodiments, a procedure for PDU session establishment and initial edge resolution may be (e.g., remains the same) as discussed above, and an initial transaction between a nERF and a nEAR may be performed earlier, for example, to provision (e.g., proper) edge DNS server rules before a first DNS request is issued by a WTRU. According to embodiments, a procedure for post-mobility edge resolution may be (e.g., remains the same) as discussed above, and a broken session use case discussed herein may include transactions following (e.g., occurring after, detection of, etc.) broken sessions caused by mobility.

According to embodiments, referring to FIG. 28A, FIG. 28B, and FIG. 28C, nERF and nEAR functions may be (e.g., remain the same) as discussed above. According to embodiments, in a case of distributing (e.g., distributed) DNS servers at the edge, such may be (e.g., become) equivalent to an edge application and may be resolved using (e.g., the same) mechanisms discussed above. According to embodiments, in such a case, functionality provided by a nERF/nEAR pair may be (e.g., that of, act as, etc.) that of a DNS Server Resolver. According to embodiments, for example, at an implementation level, because (e.g., a special role that) a DNS server configuration may affect a WTRU, (e.g., it may be beneficial that) a nERF may update the DNS server IP address of the WTRU. According to embodiments, mechanisms to perform (e.g., such) configuration updates may already exist and may be out of scope of the discussion herein.

According to embodiments, in a case of demonstrating edge-instance resolution with a cERF, procedures (e.g., as discussed above) for initial resolution demonstrate any of: (1) DNS request may be intercepted on a mobile client to retrieve a FQDN; (2) a FQDN may be used to retrieve edge-instance data from a (e.g., network) nEAR; (3) DNS responses may be intercepted on a mobile client, for example, to retrieve the FQDN IP address; (4) any of a FQDN, a FQDN IP address, and edge-instance data may be used to form a valid EI-record using the nEAR; and (5) EI-records may be used to formulate an EI DNAT rule, for example, that re-directs mobile client traffic to the appropriate edge-instance.

According to embodiments, in a case of demonstrating edge-instance resolution with a cERF procedures for post mobility resolution demonstrate any of: (1) mobility events may be detected on a WTRU (e.g., a mobile client); (2) a cERF may update EI records (e.g., already) present in a registry using a (e.g., network) nEAR; and (3) updated EI records may be used to update the EI DNAT rules already present. According to embodiments, cERF procedures may be defined in a non-intrusive manner, for example, to preserve backward compatibility of applications and DNS.

According to embodiments, in a case of demonstrating edge-instance resolution with a nERF procedures for a PDU session establishment demonstrate that a DNS forwarding rule may be installed in a UPF of WTRUs, for example, to forward DNS requests to the nERF. According to embodiments, in a case of demonstrating edge-instance resolution with a nERF procedures for initial resolution demonstrate any of: (1) DNS requests may be intercepted and terminated at the nERF, for example, to extract a FQDN; (2) a FQDN may be used to retrieve edge-instance data from a network nEAR; (3) DNS resolution may be performed by the nERF; (4) a DNS response may be received, for example, to retrieve the FQDN IP address; (5) any of a FQDN, a FQDN IP address, and an edge-instance data may be used to form a (e.g., valid) EI record using a nEAR; (6) EI records may be used to send a PDU session update request to the SMF; and (7) a SMF may instruct a UPF, for example, to create PDR/FAR rules to forward FQDN IP traffic to the edge-instance.

According to embodiments, in a case of demonstrating edge-instance resolution with a nERF procedures for post mobility resolution demonstrate any of: (1) mobility event detection may be performed by an AMF; (2) an AMF may send a PDU session update request to a SMF; (3) a SMF may indicate a PDU session change to a nERF; (4) a nERF may update EI records (e.g., already) present in the registry using the network nEAR; (5) updated EI records may be used to send a PDU session update request to a SMF; and (6) a SMF may instruct a UPF to update PDR/FAR rules to forward FQDN IP traffic to the new edge-instance.

According to embodiments, nERF procedures (e.g., as discussed herein) may be defined in a non-intrusive manner, for example, to preserve backward compatibility of applications and DNS. According to embodiments, a nEAR may aggregate any of the following information: EI IP addresses; a EI FQDN; EI clients; and EI options, including any of a TTL, a network location, a latency, a link speed, a CPU/GPU load, and a storage size. According to embodiments, an EI record may aggregate any of the following information: client ID; a network ID; a FQDN; a FQDN IP; an EI data array, including any of a EI IP, a TTL, a geolocation, a network location, a latency, a link speed, a CPU load, a GPU load, and a storage size.

According to embodiments, for defining (e.g., use of) any of a cERF, nERF, and nEAR, in a home gateway context: (1) a cERF may be compatible with a HG environment managed privately or by a MNO; (2) HG nEAR requests may need to cascade in the MNO nEAR if edge-application local resolution is not possible; (3) a HG-nERF may be defined as a nERF replacement in the HG if MNO capabilities, such as AMF/SMF/UPF, are not available at the HG; and (4) a HG-nERF may be compatible with a HG environment managed privately or by a MNO.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU), the method comprising:
   determining that an application being executed on the WTRU is requesting a service;
   sending an edge instance discovery request message to discover edge instance (EI) information associated with the service based on the application requesting the service;
   receiving a response comprising the EI information for one or more EIs associated with the service, wherein the EI information comprises a respective Internet Protocol (IP) address and respective information for assisting with EI selection for each of the one or more Hs;
   storing EI records for each of the one or more EIs associated with the service in an edge registry at the WTRU, each EI record comprising the respective IP address and the respective information for assisting with EI selection for one of the one or more Hs; and
   selecting an EI for the application based on the edge registry.

2. The method of claim 1, wherein the request for the service by the application being executed on the WTRU comprises a fully qualified domain name (FQDN) associated with the EI associated with the service.

3. The method of claim 2, further comprising, managing, by the WTRU, a domain name server (DNS) request for an IP address associated with the FQDN.

4. The method of claim 1, wherein the information for assisting with EI selection comprises at least one of geographic location information associated with an EI, latency information associated with an EI, a duration of an EI, a link speed associated with an EI, an amount of storage available at an EI, a location of a network, or central processing unit (CPU)/graphics processing unit (GPU) capabilities of an EI.

5. The method of claim 1, wherein an EI record of the stored EI records further comprises respective information associated with at least one of a client identifier, a network identifier, a domain name server (DNS) request, a DNS response, a fully qualified domain name (FQDN), and FQDN IP address, or a network-side edge application resolver.

6. The method of claim 1, wherein selecting an EI for the application based on the edge registry is based on at least one of latency associated with an EI, a link speed associated with an EI, geographic location information associated with an EI, a location of a network, central processing unit (CPU)/graphics processing unit (GPU) capabilities of an EI, or an amount of storage available at an EI.

7. The method of claim 1, further comprising:
   detecting, by the WTRU, a mobility event associated with the WTRU; and
   responsive to detecting the mobility event, updating the edge registry by updating at least one of the stored EI records in the edge registry.

8. The method of claim 7, wherein the edge registry is updated based on information received by the WTRU in response to querying a network-side edge application resolver.

9. The method of claim 1, further comprising:
   detecting, by the WTRU, a mobility event associated with the WTRU; and
   responsive to detecting the mobility event, selecting a new EI for the application based on the edge registry.

10. The method of claim 9, wherein the new EI is selected based on one or more of having an equivalent or lower expected latency than the originally selected EI, having an equivalent or higher expected link speed than the originally selected EI, or having an equivalent or closer geographical location to the WTRU than the originally selected EI.

11. The method of claim 9, wherein the WTRU provides the application with an IP address for the new EI using a preconfigured address for a service associated with the application.

12. A wireless transmit/receive unit (WTRU) comprising at least one of a transmitter, a receiver, a memory, and a processor, the WTRU configured to:
   determine that an application being executed on the WTRU is requesting a service;
   send an edge instance discovery request message to discover edge instance (EI) information associated with the service based on the application requesting the service;

receive a response comprising the EI information for one or more EIs associated with the service, wherein the EI information comprises a respective Internet Protocol (IP) address and respective information for assisting with EI selection for each of the one or more Hs;

store EI records for each of the one or more EIs associated with the service in an edge registry at the WTRU, each EI record comprising the respective IP address and the respective information for assisting with EI selection for one or the one or more Hs; and select an EI for the application based on the edge registry.

13. The WTRU of claim 12, wherein the information for assisting with EI selection comprises at least one of geographic location information associated with an EI, latency information associated with an EI, a duration of a EI, a link speed associated with an EI, an amount of storage available at an EI, a location of a network, or central processing unit (CPU)/graphics processing unit (GPU) capabilities of an EI.

14. The WTRU of claim 12, wherein selection an EI for the application based on the edge registry is based on at least one of latency associated with an EI, a link speed associated with an EI, geographic location information associated with an EI, a location of a network, central processing unit (CPU)/graphics processing unit (GPU) capabilities of an EI, or an amount of storage available at an EI.

15. The WTRU of claim 12, further configured to:
   detect, by the WTRU, a mobility event associated with the WTRU; and
   responsive to detecting the mobility event, select a new EI for the application based on the edge registry.

* * * * *

UNITED STATES PATENT AND TRADEMARK OFFICE
CERTIFICATE OF CORRECTION

| | | |
|---|---|---|
| PATENT NO. | : 11,765,126 B2 | |
| APPLICATION NO. | : 17/638058 | |
| DATED | : September 19, 2023 | |
| INVENTOR(S) | : Michel Roy et al. | |

It is certified that error appears in the above-identified patent and that said Letters Patent is hereby corrected as shown below:

In the Claims

In Claim 1: Column 47, Line 64, delete "Hs" and insert --EIs--.

In Claim 1: Column 48, Line 2, delete "Hs" and insert --EIs--.

In Claim 12: Column 49, Line 5, delete "Hs" and insert --EIs--.

In Claim 12: Column 49, Line 10, delete "Hs" and insert --EIs--.

Signed and Sealed this
Seventh Day of November, 2023

Katherine Kelly Vidal
*Director of the United States Patent and Trademark Office*